United States Patent Office 3,328,410
Patented June 27, 1967

3,328,410
NAPHTHINDOLIZINEDIONE AND BENZO-
NAPHTHINDOLIZINEDIONE PIGMENTS
Eric Richard Inman, Oldhall, Paisley, Hugh Macdonald
Smith, Bearsden, Glasgow, and Ian Alexander Macpherson, Paisley, Scotland, assignors to J. R. Geigy A.G.,
Basel, Switzerland
No Drawing. Filed Mar. 17, 1965, Ser. No. 440,623
Claims priority, application Great Britain, Sept. 21, 1963,
37,214/63; Dec. 10, 1963, 48,621/63; Apr. 13, 1964,
15,105/64; Apr. 16, 1964, 15,733/64; May 6, 1964,
18,750/64; Nov. 7, 1964, 45,475/64, 45,476/64; Feb.
1, 1965, 4,212/65, 4,213/65, 4,214/65; Feb. 9, 1965,
5,509/65, 5,510/65
71 Claims. (Cl. 260—287)

This is a continuation-in-part application of our copending application Ser. No. 417,508, filed Dec. 12, 1964, which is in turn a continuation-in-part of our application Ser. No. 397,646, filed Sept. 18, 1964, both now abandoned.

This application relates to heterocyclic organic coloring matters, and in particular to naphthindolizinedionecarboxyarylamide pigments and to processes for the production thereof.

According to a first aspect of the present invention, there are provided naphth-[2,3-b-]indolizine-6,11-dione-12-carboxyarylamide pigments falling under the formula

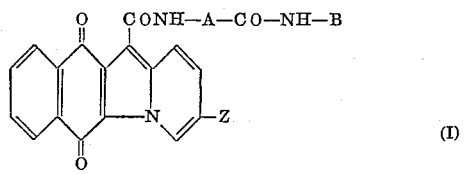

(I)

wherein

A is an arylene, and more particularly a phenyl residue unsubstituted or substituted with one or several, preferably not more than 2 halogen atoms, or with lower alkyl, lower alkoxy, aryloxy, especially phenoxy, or halogen-substituted aryloxy, especially chloro- or bromo-phenoxy groups;

B is a phenyl group substituted with one or several, preferably not more than three, of the following substituents, or an α-naphthyl or β-naphthyl group unsubstituted or substituted with one or more of the following substituents, namely, halogen, especially chlorine or bromine, lower alkyl, lower alkoxy, trifluoromethyl, cyano lower alkanoyl aroyl, especially benzoyl or naphthoyl, lower alkanoylamino, lower alkoxy-carbonylamino, lower alkyl-substituted carbamyl, lower alkyl-substituted sulfamyl, lower alkyl-sulfonyl-amino, lower alkyl-sulfonyl, aryl-sulfonyl, especially phenylsulfonyl groups; and Z represents hydrogen or lower alkyl.

Compounds of the structure as shown in Formula I but containing a nitro group as substituent in ring B usually fail in light fastness, especially in ink.

Throughout the specification and claims the term "lower" signifies a substituent group containing not more than five carbon atoms.

Where the phenyl, α-naphthyl or β-naphthyl group B is substituted with one or more of the above substituents, the halogen is preferably chlorine or bromine; and the lower alkyl group may be, for example, ethyl, n-propyl or n-butyl, but preferably methyl; the lower alkoxy group, methoxy, ethoxy, n-propoxy or isopropoxy; the aryloxy group, phenoxy; the halogen-substituted aryloxy group, halogen-substituted phenoxy; the lower alkanoyl group, acetyl; the aroyl group, benzoyl; the lower alkyl-substituted carbamyl group, N,N-diethyl-carbamyl; the lower alkyl-substituted sulfamyl group, N,N-diethyl-sulfamyl; the lower alkyl sulfonyl group, methyl-sulfonyl; and the aryl-sulfonyl group, phenyl-sulfonyl. If the group Z is a lower alkyl group, this is preferably a methyl group.

The name of the parent compound, naphth-[2,3-b-]indolizine, and the system of numbering adopted in this specification are those given in Patterson's "Ring Index" (2nd Edition, p. 605, No. 4520).

12-carboxyarylamide substituted naphthindolizinediones (phthaloyl pyrrocoline carboxamides) have been used as disperse dyestuffs in particular for the dyeing of Dacron and the like polyester textile fibers and also for acetate rayon textile fiber materials.

However, they lack the necessary fastness properties required for satisfactory use as pigments.

Only those 12-carboxyphenylamide-substituted naphthindolizinediones which bear at the N-phenyl substituent in p-position to the —CO—NH bridge a nitro group and a further substituent, namely, chlorine, lower alkyl, lower alkoxy or nitro in ortho-position at the same phenyl substituent, have been proposed as red pigments of a light fastness superior to that of the best then-known red pigments.

However, we have found that these pigments, particularly when incorporated in polyvinylchloride, lead to products which lack fastness to migration, and when used in stoving lacquers, they leave to be desired with regard to fastness to over-lacquering; moreover, their fastness to such organic solvents as trichloroethylene and toluene is very unsatisfactory.

In contrast thereto, the novel pigments falling under Formula I, and particularly those of the formula

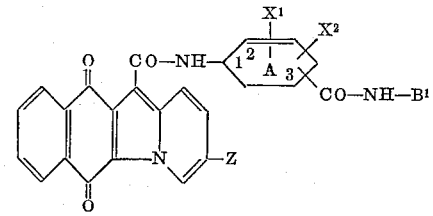

(IA)

wherein

B¹ represents one of the radicals of the formula

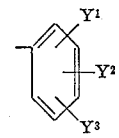

or naphthyl substituted with from one to three substituents Q; and wherein each of $X^1$ and $X^2$ represents one of the following: hydrogen, chlorine, bromine, fluorine, lower alkyl, lower alkoxy, phenoxy, chlorophenoxy or bromophenoxy, $Y^1$ represents halogen, lower alkyl, lower alkoxy, trifluoromethyl, cyano, lower alkanoyl, benzoyl, naphthoyl,
lower alkyl-substituted carbamyl, lower alkyl-substituted sulfamyl, lower alkyl-sulfonyl or phenyl-sulfonyl;

$Y^2$ represents hydrogen, halogen or lower alkyl;

$Y^3$ represents hydrogen, halogen, lower alkyl, lower alkoxy, trifluoromethyl or nitro;

each of Q represents hydrogen, halogen, lower alkoxy or lower alkyl; and

Z represents hydrogen or methyl, are of shades ranging from orange-red to violet, depending on the nature of the naphth-[2,3-b-]indolizine-6,11-dione-12-carboxyarylamide molecule and the conditioning technique employed, and are suitable, for example, for use in the pigmentation of paints, lacquers, printing inks, rubber, synthetic polymeric materials, paper and textile materials, and the pigmented products obtained therewith are distinguished from the known naphthindolizine-type dye-stuffs and pigments by their superior fastness properties, especially to light cross-lacquering, migration and heat, and resistance to organic solvents such as trichloroethylene, toluene, Cellosolve, methyl ethylketone and the like.

Of especially good fastness properties are pigmented products of the above-described type in which the pigment is of a chemical structure falling under Formula IA, in which the grouping —CO—NH—$B^1$ is linked to the phenyl ring A in 5-position, and phenyl ring A and phenyl $B^1$ bear together a total of from 3 to 5 substituents from among those defined hereinbefore, at least two of which substituents are halogen, and preferably chlorine or bromine atoms, one of said halogen atoms occupying the 2-position of ring A, and particularly good results are obtained with those of the thus defined pigments in which the p-position of ring $B^1$ is free from lower alkyl or lower alkoxy.

Similarly good results are obtained with pigments falling under Formula IA in which $B^1$ is an unsubstituted or substituted naphthyl radical as defined above, linked to phenyl ring A in 5-position, and in which the 2-position of the phenyl ring A is occupied by chlorine or bromine.

Pigmented products of the above type of optimal fastness properties are obtained with those pigments according to the invention, which fall under the formula

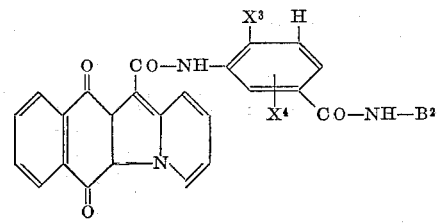

(IB)

wherein
$X^3$ represents chlorine, bromine or phenoxy,
$X^4$ represents chlorine, bromine, hydrogen or phenoxy and
$B^2$ represents one of the following radicals: dichlorophenyl, trichlorophenyl, dibromophenyl, tribromophenyl, 2-methyl-4-chlorophenyl, 2-methyl-5-chlorophenyl, 4-methoxyphenyl, naphthyl-(1), or 5,8-dichloronaphthyl-(1).

The present invention also provides a process of producing a compound of Formula I, which comprises reacting a naphth-[2,3-b-]indolizine-6,11 - dione - 12 - carboxylic acid halide having the formula

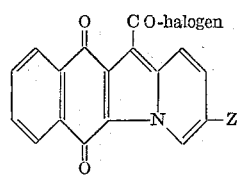

(II)

with a substituted o-, m-, or p-aminobenzanilide or substituted 2-, 3-, or 4-amino-N-(1- or 2-naphthyl) benzamide of the formula $$H_2N.A.CO.NH.B \qquad (III)$$

wherein A, B, and Z have the same meaning as in Formula I.

If the compound of Formula III used in the process is a substituted o-, m- or p-aminobenzanilide, the product is a naphth-[2,3-b-]indolizine-6,11-dione-12-carboxyarylamide having the Formula I, wherein A, B and Z have the previous significance, the grouping B being a substituted phenyl grouping. If the compound of Formula III used in the process is a substituted 2-, 3- or 4-amino-N-(1- or 2-naphthyl)benzamide, the product is a compound having the Formula I wherein A, B, and Z have the previous significance, the grouping B being a substituted or unsubstituted α-naphthyl or β-naphthyl grouping.

This process of the invention may conveniently be carried out by heating the reactants together in a substantially anhydrous organic liquid substantially inert under the conditions of the reaction, for example, nitrobenzene, monochlorobenzene or o-dichlorobenzene, optionally in the presence of an acid-binding agent, isolating the product by filtration and washing; and if desired, drying the product. The acid-binding agent may be, for example, pyridine, anhydrous sodium acetate or an excess over the stoichiometric equivalent of the aminobenzanilide or benzamide reactant.

Aminobenzanilides or amino-N-(1- or 2-naphthyl) benzamides for use in this process of the invention may conveniently be obtained by condensing an appropriately substituted nitrobenzoic acid with a suitable arylamine. The reactants may be heated together in a substantially anhydrous organic liquid medium inert under the conditions of the reaction, for example nitrobenzene, monochlorobenzene or o-dichlorobenzene, and in the presence of a conventional condensing agent, and subsequent reduction of the condensation product. The condensing agent may be, for example, phosphorus trichloride, and the subsequent reduction may be made under Béchamp conditions.

The present invention also provides a second process of producing a compound of Formula I, which comprises condensing a naphth-[2,3-b-]indolizine-6,11-dione-12-carboxylic acid having the formula

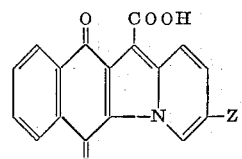

(IV)

with a substituted o-, m- or p-aminobenzanilide or substituted 2-, 3- or 4-amino-N-(1- or 2-naphthyl) benzamide of Formula III. The condensation may be carried out by a conventional method, for example by using phosphorus trichloride as condensing agent.

Examples of aminobenzanilides which may be used in the first and second processes of the invention include 4'-chloro-2',5'dimethoxy-3-aminobenzanilide; 4-chloro-2'-methoxy-5'-methyl-3-aminobenzanilide; 4-chloro-2'-methoxy-5'-chloro-3-aminobenzanilide; 4,4'-dichloro-3-aminobenzanilide; 2',3,5'-trichloro-4-aminobenzanilide; 2,4-dibromo-4'-methoxy-3-aminobenzanilide; 2',5'-dimethoxy-4' - cyano - 4-aminobenzanilide; 2',4-dimethyl-4'-trifluoromethyl-3-aminobenzanilide; 3'-acetyl-4-aminobenzanilide; 4' - methyl - 2 - aminobenzanilide; 4'-fluoro-4-methoxy-3-aminobenzanilide; 2',4,5' - triethoxy - 4' - chloro-3-aminobenzanilide; 4' - iodo - 4 - chloro-3-aminobenzanilide; and 2',4,4',5',6-pentachloro-3-aminobenzanilide.

Examples of amino-N-(1- or 2-naphthyl)benzamides which may be used in the first and second processes of the invention include 3-amino-4-chloro-N-(1-naphthyl)benzamide; 3 - amino - 4 - chloro-N-(2-naphthyl)benzamide; 3 - amino - 4 - chloro-N-[1-(5,8-dichloronaphthyl)]benzamide; 3 - amino - 4 - chloro - N - [1 - (4 - chloronaphthyl) ] benzamide; 2 - amino - N - [1 - (4 - methyl - naphthyl)]benzamide; 3 - amino - 4 - methoxy-N-[1-(4-fluoronaphthyl)]benzamide; 3 - amino - 4 - chloro - N - [1-(4-iodonaphthyl)]benzamide; and 3 - amino - 4 - chloro - N - [2-(4 - iodonaphthyl)]benzamide; 2 - amino - N - [1-naphthyl]benzamide; 4 - amino - N - [1-naphthyl]benzamide and 4 - methoxy - 3 - amino - N-[1-(5',8'-dichloro) naphthyl]benzamide.

The naphth-[2,3-b-]indolizine-6,11-dione-12-carboxylic acids used in the second process of the invention may advantageously be prepared from the corresponding carboxylic acid esters by hydrolysis to the free acid. The corresponding 12-carboxylic acid halides, used in the first process of the invention, may be prepared from the 12-carboxylic acids by treatment with an acid halogenating agent in known manner, as described, for example, in U.S. patent specification No. 2,877,230. The carboxylic acid esters are themselves the products of the condensation of a 1,4-naphthoquinone dihalide, and alkyl acetoacetate, and pyridine or β-picoline, a reaction which is described for example by Pratt, Luckenbaugh and Erickson in the Journal of Organic Chemistry, volume 19, pp. 176–182, 1954. The halogen of the halide used as reactant is preferably chlorine or bromine, and 2,3-dichloro-1,4-naphthoquinone is particularly suitable for this condensation.

The carboxylic acid esters can also be prepared by reaction of 2,3-dihalo-1,4-naphthoquinone with an α-substituted 1-methyl-pyridinium salt as described by Jenny in Oesterreichische Chem. Zeitung (1963, volume 64, at page 295), or by reaction of an alkyl acetoacetate with 2-methoxy 1,4-naphthoquinone-3-pyridinium methosulfate as described by VanAllen and Reynolds in J. Org. Chem. (1963, volume 28, pages 1022 to 1025).

The invention also provides a third process of producing a compound of Formula I, which comprises reacting a naphth - [2,3 - b - ]indolizine - 6,11 - dione - 12 - carboxylic acid halide having the Formula II with an aminobenzoic acid having the formula $$H_2N.A.COOH \qquad (V)$$

treating the resulting carboxyarylamide having the formula

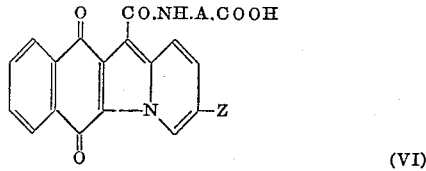

(VI)

with an acid halogenating reagent, for example thionyl chloride, to produce a 12-carboxyarylamide acid halide having the formula:

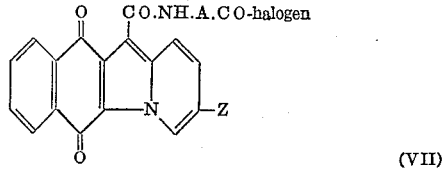

(VII)

and reacting this 12-carboxyarylamide acid halide with an arylamine having the formula $$H_2N—B \qquad (VIII)$$

to produce the desired naphth-[2,3-b-]indolizine-6,11-dione-12-carboxyarylamide, wherein A, B and Z have the same significance as in Formula I.

Alternatively the carboxyarylamide VI may be directly condensed with the arylamine VIII, preferably in the presence of a condensing agent, to produce the desired compound; the condensing agent may be, for example, phosphorus trichloride.

The reaction of the 12-carboxylic acid halide II with the aminobenzoic acid V, and that of the 12-carboxyarylamide acid halide VII (carboxyarylamide VI) with the arylamine VIII, may conveniently be carried out by the same method of heating the reactants together in a substantially anhydrous organic solvent which is substantially inert under the conditions of the reaction, for example monochlorobenzene or o-dichlorobenzene. If desired, an acid-binding agent may be present, for example pyridine, anhydrous sodium acetate or an excess over the stoichiometric equivalent of the aminobenzoic acid or arylamine reactant. The naphth-[2,3-b-]indolizine-6,11-dione-12-carboxyarylamide produced may be isolated, for example, by filtration and washing, and dried.

Examples of aminobenzoic acids of Formula V which may be used in the first stage of this third process of the invention include anthranilic acid, m-aminobenzoic acid, p-aminobenzoic acid and 3,5-dichloroanthranilic acid. Examples of arylamines of Formula VIII which may be used in the subsequent stage or stages include o-, m-, p-chlor aniline; o-, m- and p-toluidines; o-, m- and p-anisidines; o-, m- and p-phenetidines; m-4-xylidine; 1- and 2-naphthylamines 2,3-and 2,6-dimethyl-1-naphthylamines; 2- and 4-ethoxy-1-naphthylamines; 2- and 7-ethyl-1-naphthylamines; 2- and 4-methoxy-1-naphthylamines; 2-, 3- and 4-methyl-1-naphthylamines; 3,6- and 3,7-dimethyl-2-naphthylamines; 1,4-diethoxy-2-naphthylamine; 1-ethoxy-2-naphthylamine; 8-ethyl-2-naphthylamine; 3- and 5-methoxy-2-naphthylamines; 1- and 8-methyl-2-naphthylamines; and their halo- and nitro-derivatives.

The present invention also comprises a fourth process of producing a compound of Formula I, which comprises reacting an acetoacetylaminobenzanilide, or acetoacetylamino-N-(1- or 2-naphthyl) benzamide having the formula

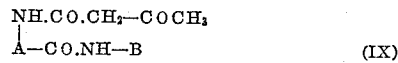

(IX)

with a 1,4-naphthoquinone compound and with a pyridine compound having the formula

(X)

wherein A, B and Z have the same significance as in Formula I.

The 1,4-naphthoquinone compound is preferably a 2,3-dichloro-1,4-naphthoquinone or other 2,3-dihalo-1,4-naphthoquinone, and the pyridine compound may be, for example, pyridine or β-picoline. The reaction may be effected in a solvent which is substantially inert under the conditions of the reaction, such as ethanol, Cellosolve or methyl Cellosolve or an excess over the stoichiometric quantity of the pyridine compound of Formula X may be used as reaction solvent. The product may be separated by filtration; it is often contaminated with varying amounts of 12-acetylnaphthindolizinedione, which may be removed by extraction with a solvent, for example with chloroform.

The acetoacetylaminobenzanilides and acetoacetylamino-N-(1- or 2-naphthyl-)benzamides of Formula IX may be prepared by known methods, for example by reacting the corresponding aminobenzanilide, or amino-N-(1- or 2-naphthyl-)benzamide respectively, with an alkyl acetoacetate or with diketene, as described in volume XI, part 2, pages 19 to 22 of Houben Weyl: "Methoden der Organischen Chemie" (fourth edition).

The invention also provides a process of producing a pigment which comprises conditioning a naphth-[2,3-b-]indolizine-6,11-dione-12-carboxyarylamide compound of Formula I. A known conditioning technique may be used, for example, by grinding with calcium chloride, sodium chloride or other organic or inorganic salt, with or without the addition of dimethylaniline, xylene or other organic solvent; or by heating with nitrobenzene, α-chloronaphthalene or other high boiling organic solvent. The compound of Formula I may also be dispersed in water if desired, for example, by means of pebble milling in the presence of a dispersing agent which may be of the anionic, cationic or nonionic type.

The invention is further illustrated by the following non-limitative examples. Parts and percentages shown therein are expressed by weight.

EXAMPLE 1

69.5 parts of 3′,4′,5′-trichloro-2-aminobenzanilide, suspended in 1300 parts of o-dichlorobenzene, were added to a stirred solution of 61.9 parts of naphth-[2,3-b-]indolizine-6,11-dione-12-carboxylic acid chloride in 4550 parts of o-dichlorobenzene at 100° C. After heating under reflux for six hours, the mixture was cooled to room temperature, filtered, and thoroughly washed with alcohol and water before drying.

97 parts of bright red needle-shaped crystals, having melting point above 300° C. were obtained. The product could be crystallized if desired from nitrobenzene, and had the following formula:

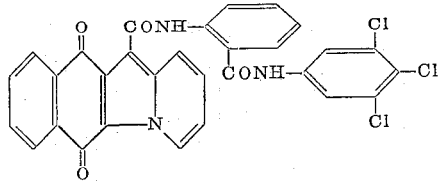

The pigment was prepared in a finely divided state by milling with anhydrous sodium acetate in the presence of small amounts of xylene, which on incorporation into a printing ink produced red prints on paper having good fastness to light. Polyvinyl chloride foils were also colored bright red shades having good fastness to light and to pigment migration. Incorporation into a stoving lacquer gave a red coloration having good fastness to light and to over-lacquering.

EXAMPLE 2

Using the procedure described in Example 1, and substituting 60.6 parts of 3'-chloro-2-aminobenzanilide for the 3',4',5'-trichloro-2-aminobenzanilide, 81.9 parts of deep red plate-shaped crystals, having melting point at 298° to 300° C. were obtained. The product could be crystallized if desired from nitrobenzene, and had the following formula:

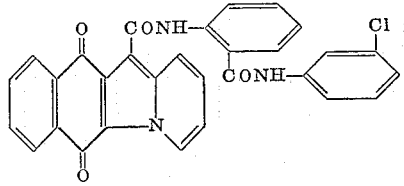

The resulting red pigment had similarly good properties when incorporated into printing ink, polyvinyl chloride, and stoving lacquer.

EXAMPLE 3

59 parts of 3,4,5-trichloroaniline were added to a stirred suspension of 64.3 parts of the acid chloride of naphthindolizine-dione-12-carboxy(2'-carboxy) anilide in 3900 parts of o-dichlorobenzene. After refluxing for 17 hours, the mixture was cooled to room temperature, filtered, and thoroughly washed with alcohol and water before drying. 80 parts of a red powder were thus isolated, crystallizing from nitrobenzene as bright red needle shaped crystals having melting point above 300° C., identical to the product obtained in Example 1.

EXAMPLE 4

Using the procedure described in Example 3, and substituting 38.3 parts of m-chloroaniline for the 3,4,5-trichloroaniline, 52 parts of a red crystalline powder were obtained, crystallizing from nitrobenzene as deep red plate-shaped crystals, having melting point at 298° to 300° C., identical to the product of Example 2.

EXAMPLE 5

38.1 parts of 2',4,4',5',6 - pentachloro - 3 - aminobenzanilide, suspended in 650 parts of o-dichlorobenzene, were added to a solution of 28.0 parts of naphth-[2,3-b-]-indolizine-6,11-dione-12-carboxylic acid chloride in 2275 parts of o-dichlorobenzene at 100° C. After refluxing the bright red suspension for 6 hours, it was cooled to 80° C. before filtering, thoroughly washing with o-dichlorobenzene, methanol and water, and oven drying.

60.0 parts of brick-red needles, having melting point above 300° C. were obtained, which could be crystallized if desired from nitrobenzene and had the following formula:

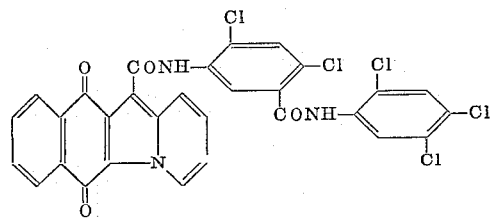

The resulting orange-red pigment had outstanding solvent resistance, and on incorporation into a printing ink produced red prints on paper having excellent fastness to light. Polyvinyl chloride foils were also colored bright red shades having excellent fastness to light and to pigment migration. Incorporation into a stoving lacquer gave a red coloration having excellent fastness to light and to over-lacquering.

In the same manner, as described in Example 5, the compounds of the following formula, in which R has the meaning given below, which are pigments of similar properties as that of Example 5, are produced using instead of the pentachloro-3-aminobenzanilide used in the said example, an equivalent amount of the correspondingly substituted benzanilide:

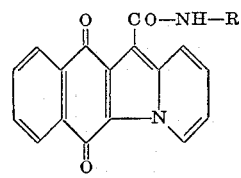

R being (a) 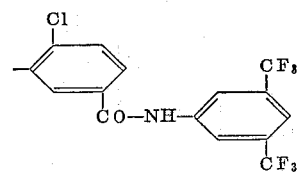

(b) 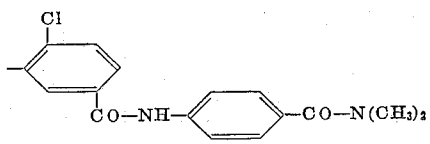

(c) 

(d) 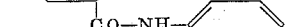

(e) 

(f) 

(g) 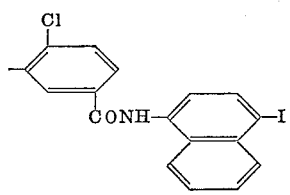

(h) 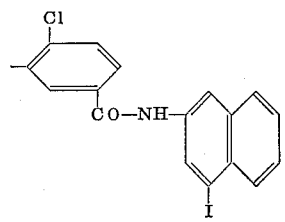

point above 300° C., were obtained which could be recrystallized from nitrobenzene, and had the formula

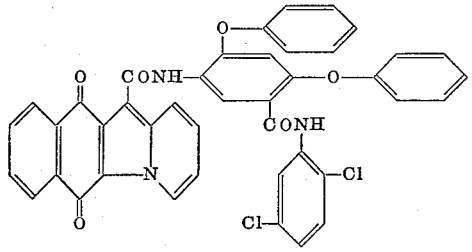

The resulting red pigment had good solvent fastness, and on incorporation into a printing ink produced red prints on paper having good fastness to light. Polyvinyl chloride foils were also colored red shades having a good fastness to light, while incorporation into a stoving lacquer gave a red coloration having good fastness to light and to over-lacquering.

Similar pigments of the formulas (a) 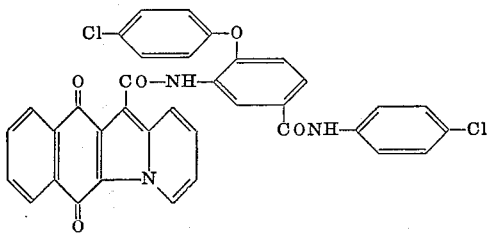

In the following Table I are listed further products having similar tinctorial properties obtained in the manner described above. The aminobenzanilides used, instead of 2′,4,4′,5′,6-pentachloro-3-aminobenzanilide, are shown in Column I. Column II lists the color of the resulting printing ink, while Columns III and IV show the color in polyvinyl chloride and stoving lacquer, respectively. Column V shows the formulas of the pigments.

EXAMPLES 6 AND 7

TABLE I

| Ex. No. | I | II | III | IV | V |
|---|---|---|---|---|---|
| 6 | (structure with Br, Cl, CONH) | Red | Scarlet | Red | 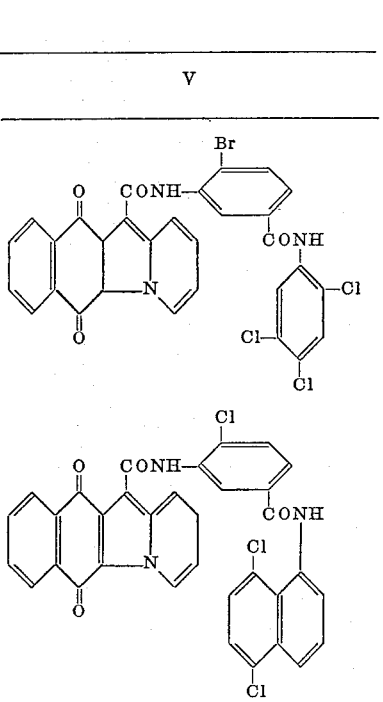 |
| 7 | (structure with Cl, CONH, Cl, Cl) | Red | Bluish-red | Bluish-red | |

EXAMPLE 8

77.0 parts of 2′,5′-dichloro-4,6-diphenoxy-3-aminobenzanilide, suspended in 975 parts of o-dichlorobenzene, were added to a solution of 46.5 parts of naphth-[2,3-b-]indolizine-6,11-dione-12-carboxylic acid chloride in 3575 parts of o-dichlorobenzene at 100° C. After refluxing for six hours, the red suspension was cooled to room temperature, filtered, and thoroughly washed with o-dichlorobenzene, alcohol, and water before drying.

110 parts of red needle-shaped crystals, having melting (b) 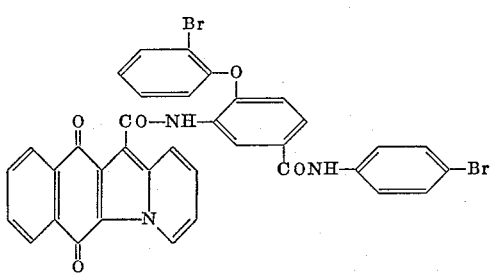

TABLE II

| Ex. No. | I | II | III | IV | V |
|---|---|---|---|---|---|
| 9 | 4-chloro-2-amino-N-(p-tolyl)benzamide | Brick red | Red | Dark red | (structure with pyridine-fused anthraquinone, CONH-phenyl-Cl-CONH-p-tolyl) |
| 10 | 4-chloro-2-amino-N-(p-methoxyphenyl)benzamide | Brick red | Scarlet | Scarlet | (structure with pyridine-fused anthraquinone, CONH-phenyl-Cl-CONH-p-methoxyphenyl) |
| 11 | 4-chloro-2-amino-N-(2,5-dimethoxyphenyl)benzamide | Red | Red | Red | (structure with pyridine-fused anthraquinone, CONH-phenyl-Cl-CONH-2,5-dimethoxyphenyl) |

TABLE II.—Continued
| Ex. No. | I | II | III | IV | V |
|---|---|---|---|---|---|
| 12 | 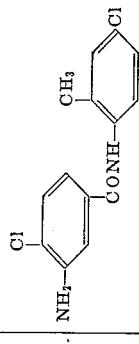 | Red | Red | Red | 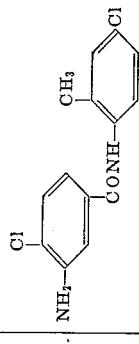 |
| 13 | 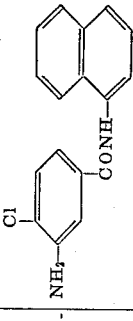 | Brick red | Orange | Brick red | 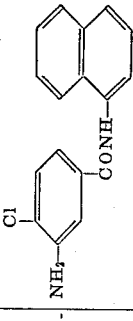 |
| 14 | 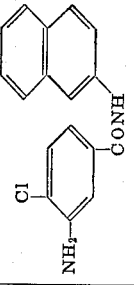 | Red | Red | Red | 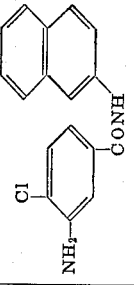 |

TABLE II—Continued

| Ex. No. | I | II | III | IV | V |
|---|---|---|---|---|---|
| 15 | (2,4-dichloro-6-methyl aniline derivative) | Red | Scarlet | Scarlet | (anthraquinone acridone bis-amide with 2,4-dichloro-6-methylanilide) |
| 16 | (3,4,6-trichloroaniline derivative) | Red | Orange | Red | (anthraquinone acridone bis-amide with 3,4,6-trichloroanilide) |
| 17 | (2,4-dichloro-6-methoxyaniline derivative) | Violet | Red | Maroon | (anthraquinone acridone bis-amide with 2,4-dichloro-6-methoxyanilide) |

TABLE II.—Continued

| Ex No. | I | II | III | IV | V |
|---|---|---|---|---|---|
| 18 | (structure) | Red | Orange red | Red | (structure) |
| 19 | (structure) | Bluish-red | Crimson | Red | (structure) |
| 20 | (structure) | Red | Red | Red | (structure) |
| 21 | (structure) | Vermilion | Red | Red | (structure) | are obtained by repeating Example 8, but using in lieu of the benzanilide used therein an equivalent amount of the corresponding benzanilides.

In the above Table II are listed further products having similar tinctorial properties obtained in the manner described above. The aminobenzanilides used, instead of 2′,5′-dichloro-4,6-diphenoxy-3-aminobenzanilide, are shown in Column I. Column II lists the color of the resulting printing ink, while Columns III and IV show the color in polyvinyl chloride and stoving lacquer, respectively. Column V shows the formulas of the pigments.

EXAMPLE 22

25.5 parts of m-chloraniline were added to a stirred suspension of 42.85 parts of the acid chloride of naphth-[2,3-b-] indolizine-6,11-dione-12-carboxy-(4′-carboxy)-anilide in 2600 parts of o-dichlorobenzene. After heating under reflux for 17 hours, the mixture was cooled to room temperature, filtered, and thoroughly washed with alcohol and water before drying.

45.2 parts of violet needle-shaped crystals having melting point above 300° C. were obtained, which could be crystallized if desired from dimethylformamide, and had the formula

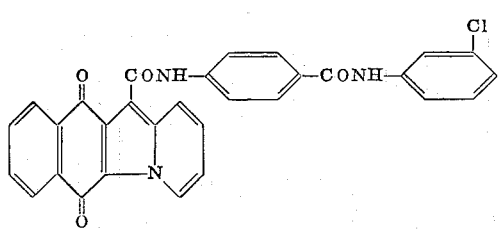

The product dyed cotton from an alkaline hydrosulfite vat red shades of good fastness to washing, chlorine, and light.

EXAMPLE 23

Using the procedure described in Example 22, and substituting 41.35 parts of 2-methoxy-4-sulfondiethylamidoaniline for the m-chloraniline, and using the corresponding carboxy anilide, 58.5 parts of red needle-shaped crystals, having melting point above 300° C., were obtained.

The product could be crystallized from nitrobenzene, and had the following formula

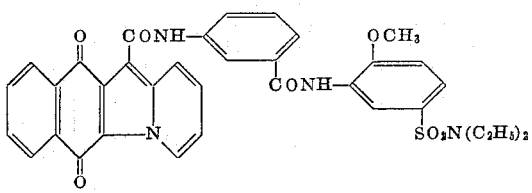

The resulting pigment gave a strong red print on paper, of high lightfastness, when incorporated into printing ink, and colored polyvinyl chloride foils red shades of good lightfastness. Incorporated into stoving lacquer, red colorations of good fastness to light and overlacquering were obtained.

EXAMPLE 24

41.2 parts of 2′,4′-dimethyl-4-chloro-3-amino-benzanilide were suspended in 650 parts of o-dichlorobenzene at 100° C. and added to a solution of 23.2 parts of naphth-[2,3-b-]indolizine-6,11-dione-12-carboxylic acid chloride in 3250 parts of o-dichlorobenzene at 100° C. After refluxing the deep red mixture for six hours, it was cooled to room temperature, filtered and thoroughly washed with alcohol and water before drying.

36.3 parts of red needle-shaped crystals having melting point at 287° to 289° C. were obtained, which could be crystallized if desired from nitrobenzene, and had the formula

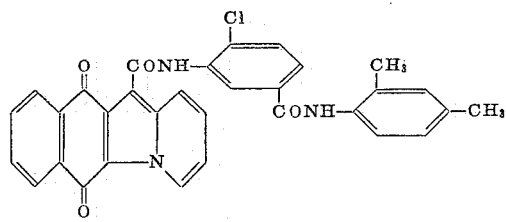

The resulting pigment gave red prints of good lightfastness when applied as an ink to paper. If the pigment was dispersed by known techniques until its particle size was 1 micron or less, for example, by pebble milling with a dilute solution of sodium dinaphthylmethane sulfonate, and the dispersion incorporated into viscose dope, a bright red fiber with good fastness properties resulted. Polyvinyl chloride foils were also colored red shades having a good fastness to light, while incorporation into stoving lacquer gave red colorations having good fastness to light and to overlacquering.

EXAMPLE 25

35.85 parts of the acetoacetyl derivative of 2′,4′-dimethyl-4-chloro-3-aminobenzanilide were added to a suspension of 23.9 parts of 2,3-dichloro-1,4-naphthoquinone in 500 parts of methyl Cellosolve, followed by 16 parts of pyridine. The dark reaction mixture was refluxed for 4 hours, cooled to room temperature and filtered.

15.5 parts of a red powder were obtained. Elimination of 12-acetylnaphthindolizinedione by solvent extraction, followed by crystallization of the residue from o-dichlorobenzene, gave red needle-shaped crystals having melting point at 286° to 288° C. identical to the product obtained in Example 25.

EXAMPLE 26

45.3 parts of 2′,4′-dimethyl-4-chloro-3-aminobenzanilide, suspended in 625 parts of o-dichlorobenzene, were added to a stirred solution of 45.5 parts of 3-methyl-naphth-[2,3-b-]indolizine-6,11-dione-12-carboxylic acid chloride in 3250 parts of o-dichlorobenzene at 100° C.

After heating under reflux for 6 hours, the mixture was cooled to room temperature, filtered, and washed thoroughly with alcohol and water before drying.

59.5 parts of red needle-shaped crystals having melting point at 273° to 274° C. were obtained. The product had the following formula:

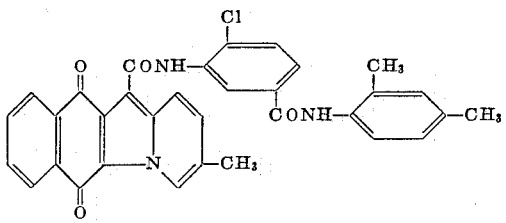

The resulting pigment gave red prints of good lightfastness when applied as an ink to paper, a red foil of good lightfastness when incorporated into polyvinyl chloride, and a red coloration of good lightfastness and overlacquering fastness when incorporated into stoving lacquer.

EXAMPLE 27

The procedure of Example 3 was carried out using 59 parts of 2-chloro-5-aminobenzotrifluoride in place of the 3,4,5-trichloroaniline.

75 parts of bright red, needle-shaped crystals having melting point above 300° C. were obtained, which could be recrystallized if desired from nitrobenzene. The product had the following formula:

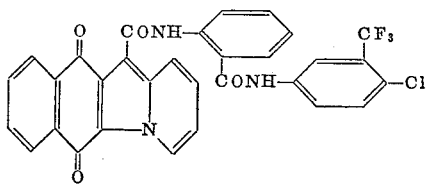

The resulting pigment gave prints of good fastness to light when applied as an ink to paper.

EXAMPLE 28

51.1 parts of 2,4,5-trichloraniline were added to a stirred suspension of 64.7 parts of the acid chloride of naphth - [2,3 - b - ]indolizine - 6,11 - dione - 12 - carboxy-(2'-carboxy-4',6'-dichloro)aniline in 2600 parts o-dichlorobenzene. After refluxing for 20 hours, the mixture was cooled to room temperature and thoroughly washed with alcohol and water before drying.

70 parts of brick red powder having melting point above 300° C. were obtained, which could be crystallized, if desired, from dimethyl-formamide. The product had the following formula:

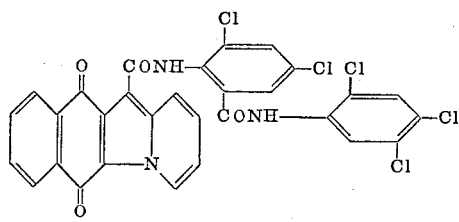

The resulting pigment gave orange-red prints of good fastness to light when applied as an ink to paper.

In Examples 3, 22, 23, 27 and 28 mention is made of acid chlorides of carboxylic acid derivatives of naphth-[2,3-b-]indolizine - 6,11 - dione - 12 - carboxyanilide. The preparation of these compounds is illustrated below.

Example I 155 parts of naphth-[2,3-b-]indolizine-6,11-dione-12-carboxylic acid chloride were dissolved in 3250 parts of o-dichlorobenzene at 100° C. with stirring. 75.5 parts of m-aminobenzoic acid dissolved in 650 parts of o-dichlorobenzene at 100° C. were added to the dark red solution and the mixture was gradually heated to reflux temperature over one hour, during which time hydrogen chloride was evolved. After refluxing for 6 hours and cooling to room temperature, the product was filtered, washed thoroughly with alcohol and water, and dried.

193 parts of violet needle-shaped crystals of naphth-[2,3-b-]indolizine-6,11-dione - 12 - carboxy-(3'-carboxy)anilide were obtained, which could be crystallized if desired from dimethylformamide. The product had melting point above 300° C. and the following elementary analysis by weight:

|  | Found | Calculated ($C_{24}H_{14}N_2O_5$) |
|---|---|---|
| Carbon, percent | 70.1 | 70.2 |
| Hydrogen, percent | 3.6 | 3.4 |
| Nitrogen, percent | 6.7 | 6.8 |

By using equivalent quantities of the other aminobenzoic acids in place of the m-aminobenzoic acid in the above process, the corresponding carboxy derivatives of naphthindolizinedione-12-carboxyanilide can be prepared, as for example

| Ex. | Aminobenzoic Acid | Characteristics of Product |
|---|---|---|
| II | Anthranilic acid | Orange-red needles; melting point above 300° C. |
| III | p-Aminobenzoic acid | Deep red needles; melting point above 300° C. |
| IV | 3,5-dichloroanthranilic acid. | Red needles; melting point above 300° C. |

Their acid chlorides may be prepared as follows:

Example V 95 parts of naphth-[2,3-b-]indolizine-6,11-dione-12-carboxy-(3'-carboxy) anilide were added to a stirred solution of 233 parts of thionyl chloride and 1980 parts of chlorobenzene. The reaction mixture was brought gradually to the boil over one hour, and heated under reflux for a further three hours. After cooling to room temperature, the product was filtered, washed with light petroleum ether, and dried. In this way were obtained 88.8 parts of scarlet needle-shaped crystals of the acid chloride, having melting point above 300° C.

By using equivalent quantities of other naphth-[2,3-b - ]indolizine-6,11-dione-12-carboxy-(carboxy)anilides in this procedure, the corresponding acid chlorides can be prepared as follows:

| Ex. | Naphth-[2,3-b-]indolizine-6,11-dione-12-carboxy-anilide | Characteristics of Acid Chloride |
|---|---|---|
| VI | 2'-carboxy- | Red-brown crystalline powder; melting point above 300° C. |
| VII | 4'-carboxy- | Deep red powder; melting point above 300° C. |
| VIII | 2'-carboxy-4',6'-dichloro- | Red powder; melting point above 300° C. |

EXAMPLE 29

A solution of 60.5 parts phosphorus trichloride in 500 parts toluene was added to a stirred suspension of 29.1 parts naphth - [2,3-b-]indolizine - 6,11 - dione-12-carboxylic acid and 38.5 parts 2',4,4',5',6-pentachloro-3-amino-benzanilide in 1500 parts toluene at 60° C. The mixture was heated under reflux for 4 hours, the toluene removed by steam distillation, the product filtered, thoroughly washed with dilute alkali, water and methanol, and dried.

60 parts of a red powder, having melting point above 300° C. were obtained, recrystallizing from nitrobenzene as red needle-shaped crystals, identical with the product in Example 5 of formula:

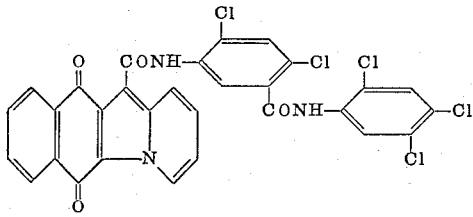

EXAMPLE 30

77.2 parts of 3'-methyl-4,6-dichloro-4'-acetylamino-3-aminobenzanilide, suspended in 5000 parts of o-dichlorobenzene, are added to a stirred solution of 61.9 parts of naphth - [2,3-b-]indolizine-6,11-dione-12-carboxylic acid chloride in 3500 parts of o-dichlorobenzene at 100° C. After heating under reflux for 4 hours, the mixture is cooled to room temperature, filtered, and washed thoroughly with o-dichlorobenzene, alcohol and water before drying.

77.5 parts of bright red, needle-shaped crystals having melting point above 300° C. are obtained, which is recrystallized from nitrobenzene. The product has the following formula

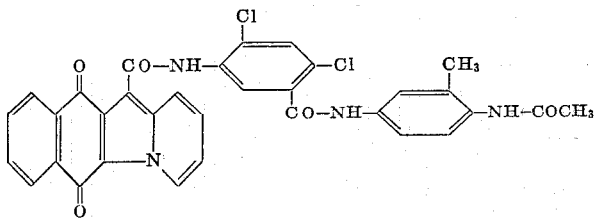

The resulting pigment affords prints of good light fastness when applied as an ink to paper, a red foil of good light fastness when incorporated into polyvinyl chloride, and a red coloration of good light fastness and overlacquering fastness when incorporated into stoving lacquer.

EXAMPLE 31

The procedure described in Example 1 is carried out using 78 parts 3'-methoxycarbonylamino-4,6-dichloro-3-aminobenzanilide in place of the 3',4',5'-trichloro-2-aminobenzanilide there used. 116 parts of bluish-red, needle-shaped crystals having melting point above 300° C. are obtainer, which is recrystallized from nitrobenzene.

The product has the following formula

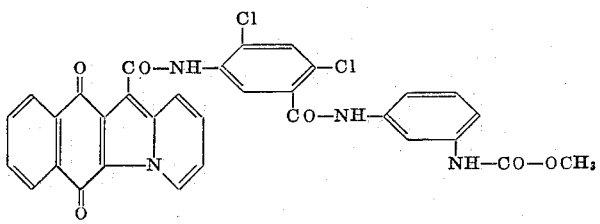

The resulting pigment has good resistance to solvents. The pigment affords red prints when applied as an ink to paper, a red foil when incorporated into polyvinyl chloride, and a red coloration of good overlacquering fastness when incorporated into stoving lacquer.

EXAMPLE 32

The procedure described in Example 1 is carried out using 87 parts 3'-methyl-sulfonylamino-4,6-dichloro-3-aminobenzanilide in place of the 3',4',5'-trichloro-2-aminobenzanilide. 74 parts of red, needle-shaped crystals having melting point above 300° C. are obtained, which are recrystallized from nitrobenzene.

The product has the following formula

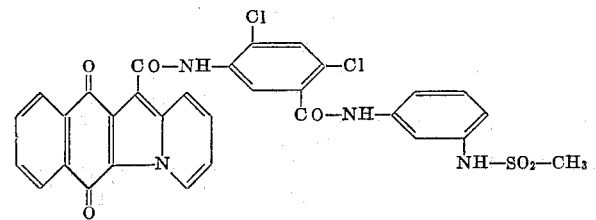

The resulting pigment affords red coloration in printing ink, polyvinyl chloride and stoving lacquer, and shows good fastness to overlacquering.

According to another aspect of the present invention, we have found that naphth-[2,3-b-]indolizine-6,11-dione-12-carboxyarylamides having the formula

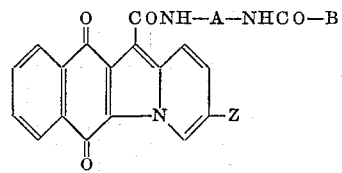

(XI)

wherein A has the same meaning as in Formula I; B is a phenyl, α-naphthyl, or β-naphthyl group unsubstituted or substituted with one or more of the following substituents: halogen atoms, especially chlorine or bromine, or lower alkyl, lower alkoxy, trifluoromethyl, cyano, lower alkanoyl, aroyl, especially benzoyl or naphthoyl, lower alkanoylamino, lower alkoxy-carbonylamino, lower alkyl-substituted carbamyl, lower alkyl-substituted sulfamyl, or lower alkyl-sulfonyl or aryl sulfonyl, especially phenylsulfonyl groups, and Z has the same meaning as in Formula I, are pigments of particularly good light fastness, fastness to cross-lacquering and fastness to solvents, of orange-red to violet shades, and are especially useful in stoving lacquers for automobiles.

Pigments falling under Formula XI are especially distinguished from corresponding pigments of Formula I by deeper shades of red, maroon and violet.

In the compounds of Formula XI in which the phenyl, α-naphthyl or β-naphthyl group B is substituted with one or more of the above substituents, the lower alkyl may be, for example, ethyl, n-propyl or n-butyl, but preferably methyl; the lower alkoxy, methoxy, ethoxy, n-propoxy or isopropoxy; the lower alkanoyl, acetyl; the aroyl, benzoyl; the lower alkyl-substituted carbamyl, N,N-diethyl-carbamyl; the lower alkyl-substituted sulfamyl, N,N-diethyl-sulfamyl and the lower alkyl-sulfonyl, methyl-sulfonyl. When the group Z is a lower alkyl group, this is preferably a methyl group.

The name of the parent compound, naphth[2,3-b-]indolizine and the system of numbering adopted in this specification are those given in Patterson's "Ring Index" (2nd edition, p. 605, No. 4520).

Of the novel pigments falling under Formula XI, especially compounds of the formula

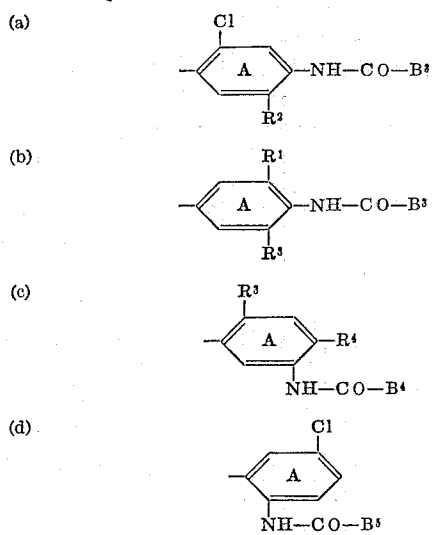

XII wherein Q is one of the radicals (a)

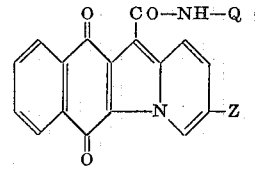

(b)

$R^1$

—A—NH—CO—B³

$R^3$ (c)

$R^3$

—A—R⁴

NH—CO—B⁴

(d)

Cl

—A—

NH—CO—B⁵

$R^1$ represents hydrogen, chlorine or bromine,
$R^2$ represents hydrogen, chlorine or bromine,
$R^3$ represents hydrogen or chlorine,
$R^4$ represents hydrogen or methyl,
$B^3$ represents chlorophenyl, bromophenyl, methylphenyl, naphthyl or bromonaphthyl,
$B^4$ represents chlorophenyl, bromophenyl or methoxyphenyl and
$B^5$ represents chlorophenyl and Z has the same meaning as given hereinbefore, are preferred pigments because of their superior fastness to cross lacquering and good light fastness and fastness to solvents.

Compounds of Formula XII wherein Q is the radical (c) above and $B^4$ is trichlorophenyl, and especially those compounds of this type in which $R^3$ is chlorine, $R^4$ is hydrogen and $B^4$ is trichloro-phenyl are also distinguished by very good fastness to migration.

The present invention also provides a process of producing a compound of Formula XI, which comprises reacting a naphth[2,3-b]indolizine-6-11-dione-12-carboxylic acid halide having formula

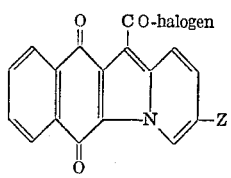

 XIII with a mono-N-aroyl-arylenediamine of the formula

H$_2$N.A.NH.CO.B    XIV wherein A, B and Z have the same significance as in Formula XI.

This process of the invention may conveniently be carried out by heating the reactants together in a substantially anhydrous organic liquid medium substantially inert under the conditions of the reaction, for example, nitrobenzene, monochlorobenzene or o-dichlorobenzene, optionally in the presence of an acid-binding agent, isolating the product by filtration and washing and, if desired, drying the product. The acid-binding agent may be, for example, pyridine, anhydrous sodium acetate or an excess over the stoichiometric equivalent of the mono-N-aroyl-arylenediamine.

Mono-N-aroyl-o-, m- or p-arylenediamines for use in the process of the invention may conveniently be obtained by condensing an appropriately-substituted nitroarylamine with a suitable aroyl halide, the reactants being heated together in a substantially anhydrous organic liquid medium inert under the conditions of the reaction such as nitrobenzene or o-dichlorobenzene, and subsequent reduction of the condensation product, as, for example, under Béchamp conditions.

Examples of mono-N-aroyl-arylenediamines which may be used in the process of the invention include 2,2',4,5'-tetrachloro-4'-aminobenzanilide;
2',5-dichloro-4'-amino-benzanilide;
2',5'-dimethoxy-4'-aminobenzanilide;
2'-aminobenzanilide;
3'-aminobenzanilide;
4'-aminobenzanilide;
2',3,5'-trichloro-4'-aminobenzanilide;
2'-chloro-4'-aminobenzanilide;
2',5'-dichloro-3-methyl-4'-aminobenzanilide;
2,4,4',5-tetrachloro-3'-aminobenzanilide;
N-(3-amino-4-chloro)-phenyl-1-naphthamide;
and 4-bromo-4'-chloro-3'-aminobenzanilide.

The naphthindolizinedione carboxylic acid halides used in the process of the invention may advantageously be prepared from the corresponding carboxylic acid esters by hydrolysis to the free acid, followed by treatment with an acid halogenating agent in known manner, as described, for example, in U.S. patent specification No. 2,877,230. The carboxylic acid esters are themselves the products of the condensation of a 1,4-naphthoquinone, an alkyl acetoacetate, and pyridine or β-picoline, a reaction which is described, for example, by Pratt, Luckenbaugh and Erickson in the Journal of Organic Chemistry, volume 19, pp. 176–82, 1954. 2,3-dichloro-1,4-naphthoquinone is particularly suitable for this condensation.

The present invention also comprises a second process of producing the new coloring matters of Formula XI, which comprises condensing a naphth-[2,3-b]indolizine-6,11-dione-12-carboxylic acid having the formula

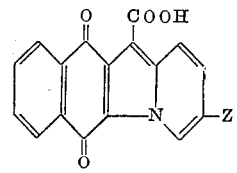

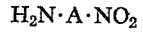 XV with a mono-N-aroyl-phenylenediamine of Formula XIV, wherein Z has its previous significance. The condensation may be carried out by a conventional method, for example, by using phosphorus trichloride as condensing agent.

The invention also comprises a third process of producing the new coloring matters of Formula XI, which comprises reacting a naphth-[2,3-b-]indolizine-6,11-dione-12-carboxylic acid halide of Formula XIII with a nitroarylamine having the formula

H$_2$N·A·NO$_2$    XVI reducing the resulting nitroarylamide having the formula

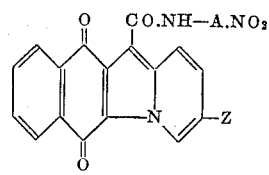

XVII to produce the corresponding amino-arylamide having the formula

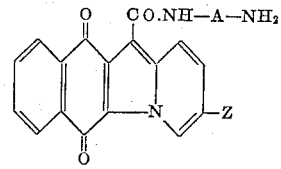

XVIII and aroylating this product with an aroyl halide having the formula halogen—CO—B    XIX to produce the desired naphth-[2,3-b-]indolizine-6,11-dione-12-carboxyarylamide, wherein A, B and Z have the same significance as in Formula XI.

The initial condensation step usually occurs readily on refluxing the nitroarylamine and acid halide together in a substantially anhydrous organic solvent, inert under the conditions of the reaction, such as monochloro- or o-dichlorobenzene, and if desired in the presence of an acid binding agent, for example pyridine, anhydrous sodium acetate or an excess over the stoichiometric equivalent of the nitroarylamine reactant. Examples of nitroarylamines which may be used in this process of the invention include the o-, m- and p-nitranilines and their C-alkyl, C-alkoxy and halogen-substituted derivatives, the alkyl and alkoxy groups each containing up to five carbon atoms.

The reduction of the resulting nitroarylamide is, in general, slow, and may be effected, for example, by heating with an aqueous alkaline solution of sodium hydrosulfite or other alkali metal hydrosulfite, preferably at a temperature in the range from 60° to 80° C. until the reaction is complete, as shown, for instance, by the absence of starting material on developing a thin-layer chromatogram of a specimen with chloroform.

Condensation of the aminoarylamide with the aroyl halide may also be slow and may conveniently be carried out under the same conditions as those indicated for the condensation of the naphth-[2,3-b-]indolizine-6,11-dione-12-carboxylic acid halide with the nitroarylamine, until the product is free from unchanged aminoarylamide, as shown, for instance, by the same type of chromatographic test. Examples of aroyl halides which may be used in the condensation with the aminoarylamide include benzoyl chloride and its alkyl, alkoxy, halogen and nitro-derivatives.

The present invention also comprises a fourth process of producing the new coloring matters of Formula XI, which comprises reacting an acetoacetylaminobenzanilide or acetoacetylamino-N-(1- or 2-naphthyl)benzamide having the formula

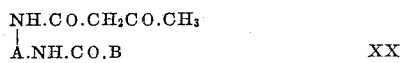

XX with a 1,4-naphthoquinone compound and with pyridine or alkylpyridine having the formula

XXI wherein A, B, and Z have the same significance as in Formula XI.

The 1,4-naphthoquinone compound is preferably a 2,3-dichloro-1,4-naphthoquinone or other 2,3-dihalo-1,4-naphthoquinone, and the pyridine compound may be, for example, pyridine or β-picoline. The reaction may be effected in a solvent which is substantially inert under the conditions of the reaction, such as ethanol, Cellosolve or methyl Cellosolve; alternatively, an excess of the pyridine compound may be used as reaction solvent. The product may be separated by filtration; it is often contaminated with varying amounts of 12-acetylnaphthindolizine-dione, which may be removed by extraction with a solvent, for example, with chloroform.

The N-aroyl-N'-acetoacetyl-arylenediamines used in the reaction may be prepared by known methods, for example, by reacting an appropriate N-aroyl-arylenediamine with an alkyl acetoacetate or with diketene, as described in volume XI, part 2, pages 19–22 of Houben Weyl: "Methoden der Organischen Chemie" (fourth edition).

The pigments of this invention may be processed by known conditioning techniques such as, for example, grinding with an organic or inorganic salt such as calcium chloride or sodium acetate, with or without the addition of an organic solvent such as dimethylaniline or xylene, or by heating with a high boiling solvent such as nitrobenzene or α-chloronaphthalene. They may also be dispersed in water if desired, for example, by means of pebble milling or other known means, in the presence of a dispersing agent which may be of the anionic, cationic or nonionic type.

The pigments made in accordance with this invention vary in shade from orange-red to violet, depending on the nature of the substituents in the molecule and the conditioning technique employed. In general, the pigments of this invention exhibit good fastness properties, especially to light.

The second aspect of the invention is further illustrated by the following non-limitative examples. Parts and percentages shown therein are expressed by weight.

EXAMPLE 33

33.8 parts of 2',5'-dichloro-4-acetylamino-4'-aminobenzanilide are dissolved in 650 parts of o-dichlorobenzene at 100° C. and added to a stirred solution of 27.8 parts of naphth-[2,3-b-]indolizine-6,11-dione-12-carboxylic acid chloride in 2600 parts of o-dichlorobenzene at 100° C. The mixture is refluxed for 4 hours, filtered after cooling to 50° C., and thoroughly washed with o-dichlorobenzene, acetone and water.

The product is dried to yield 46 parts of needle-shaped crystals having melting point above 300° C. The product is recrystallized from nitrobenzene, and has the following formula

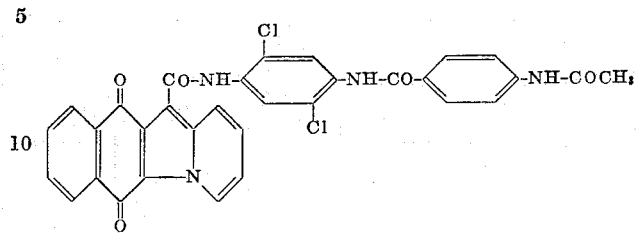

The resulting pigment has excellent solvent resistance, and on incorporation into a printing ink, produces red prints on paper having high fastness to light. Polyvinyl chloride foils are colored red shades having high fastness to light, while incorporation into a stoving lacquer affords a red coloration having high fastness to overlacquering, and to light.

EXAMPLE 34

58 parts of 2,4,4',5-tetrachloro-3'-aminobenzanilide were dissolved in 1300 parts o-dichlorobenzene at 100° C., and added to a stirred solution of 46 parts naphth-[2,3-b-]indolizine-6,11-dione-12-carboxylic acid chloride in 2610 parts o-dichlorobenzene at 100° C. The mixture was refluxed for 17 hours and then cooled to room temperature. After filtration and thorough washing with o-dichlorobenzene, light petroleumether, ethanol and water, the product was dried to yield 75.5 parts red-violet, needle-shaped crystals, having melting point above 300° C. The product could be recrystallized, if desired, from nitrobenzene, and had the following formula:

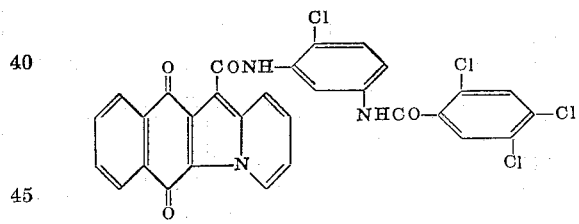

The resulting pigment had excellent solvent resistance, and on incorporation into a printing ink produced red-violet prints on paper having excellent fastness to light. Polyvinyl chloride foils were colored maroon shades having high fastness to light and to pigment migration, while incorporation into a stoving lacquer gave a maroon coloration having high fastness to light and to overlacquering.

EXAMPLE 35

The procedure described in Example 33 was carried out using 34.1 parts of 4'-chloro-4-ethoxycarbonylamino-3'-aminobenzanilide in place of the 2',5'-dichloro-4-acetylamino-4'-aminobenzanilide there used.

23 parts of red-brown, needle-shaped crystals, having melting point above 300° C. are obtained which is recrystallized from nitrobenzene and has the following formula

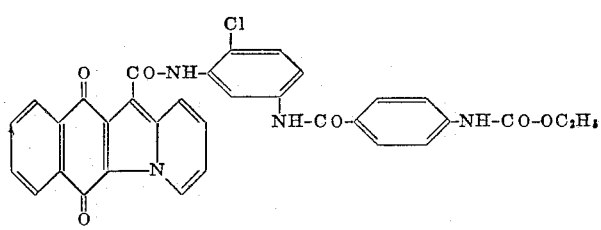

The resulting pigment affords bluish-red prints when applied as an ink to paper, a brownish-red foil when incorporated into polyvinyl chloride, and a maroon coloration of good overlacquering fastness when incorporated into stoving lacquer.

EXAMPLE 36

65 parts of N-(3-amino-4-chloro)-phenyl-1-naphthamide were dissolved in 100 parts of pyridine at 100° C., and added to a stirred solution of 61.9 parts napth-[2,3-b]indolizine-6,11-dione-12-carboxylic acid chloride in 5870 parts o-dichlorobenzene at 100° C. The mixture was refluxed for 4 hours and then cooled to room temperature. After filtration and thorough washing with o-dichlorobenzene, ethanol and water, the product was dried to yield 97 parts orange-red, needle-shaped crystals, having melting point above 300° C. The product could be recrystallized, if desired, from nitrobenzene, and had the following formula:

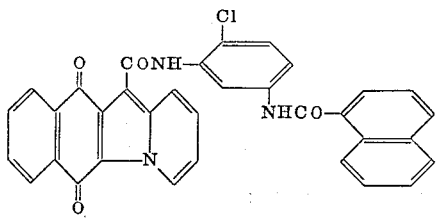

The resulting pigment colored polyvinyl chloride foils scarlet shades of high lightfastness, and on incorporation into stoving lacquer, scarlet colorations of good fastness to light and overlacquering were obtained.

In the following Table III are listed further products having similar tinctorial properties, obtained in the manner described above. The aminophenylnaphthamides used, instead of N-(3-amino-4-chloro)-phenyl-1-naphthamide, are shown in Column I. Column II lists the color of the resulting printing inks, while Columns III and IV show the color in polyvinyl chloride and stoving lacquer respectively. Column V shows the formulas of the pigments.

EXAMPLE 39

The procedure of Example 36 was carried out using 72 parts 4-bromo-4'-chloro-3'-aminobenzanilide in place of the N-(3-amino-4-chloro)-phenyl-1-naphthamide. 95 parts of deep red needle-shaped crystals having melting point above 300° C. were obtained, which could be recrystallized, if desired, from nitrobenzene. The product had the following formula:

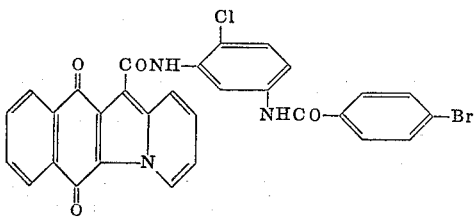

The resulting pigment gave red prints of good lightfastness when applied as an ink to paper, a scarlet foil of good lightfastness when incorporated into polyvinyl chloride, and a scarlet coloration of good lightfastness and overlacquering fastness when incorporated into stoving lacquer.

EXAMPLE 40

92.85 parts of naphth-[2,3-b-]indolizine-6,11-dione-12-carboxylic acid chloride were dissolved in 5200 parts of o-dichlorobenzene at 100° C. with stirring. To this was added 69.63 parts of 2'-aminobenzanilide, and the mixture was refluxed with stirring for 17 hours. After cooling to room temperature, the product was filtered, thoroughly washed with alcohol and water, and dried.

In this way were obtained 121 parts of bronze-red needles, which could be recrystallized, if desired, from

TABLE III

| Ex. No. | I | II | III | IV | V |
|---|---|---|---|---|---|
| 37 | [structure] | Red | Bluish red | Bluish red | [structure] |
| 33 | [structure] | Red | Red | Red | [structure] | nitrobenzene, having melting point above 300° C., and having the following formula:

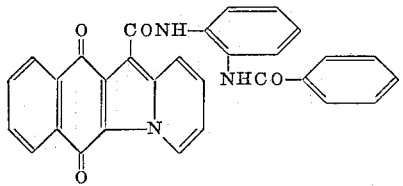

The resulting pigment gave red-violet prints of high lightfastness when applied as an ink to paper. Incorporation into polyvinyl chloride and stoving lacquer gave red colorations of good lightfastness.

By repeating Example 40, but using equivalent amounts of the correspondingly substituted anilides in lieu of 2'-aminobenzanilide, there are obtained the pigments of the formulas (a) 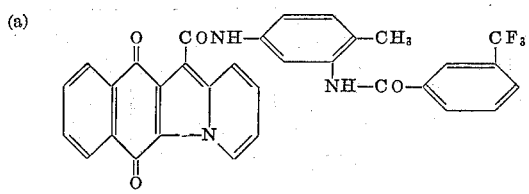

(b) 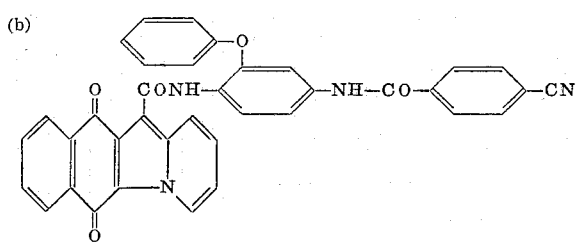

(c) 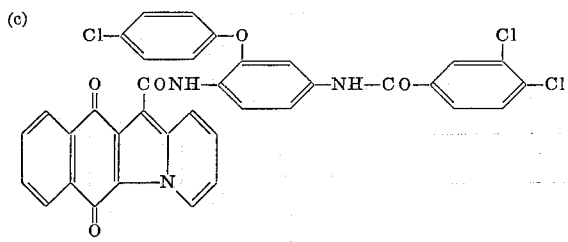

(d) 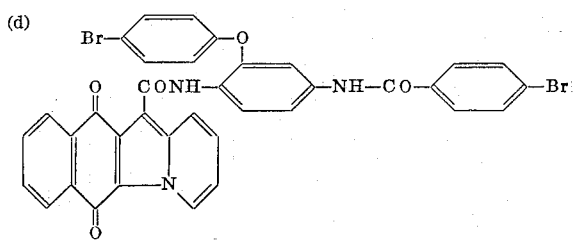

(e) 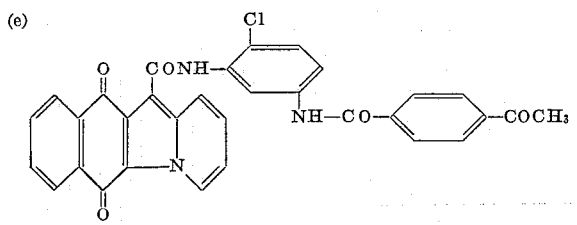

(f) 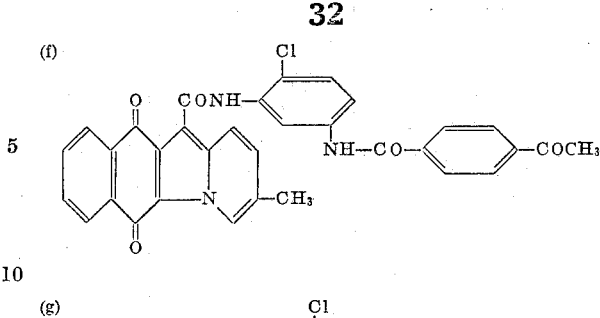

(g) 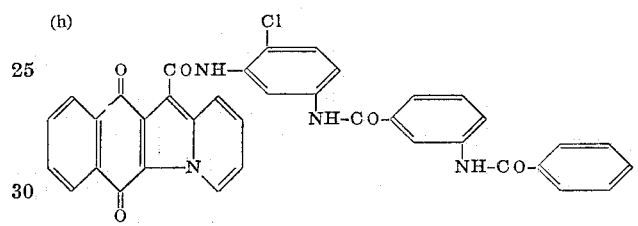

(h) 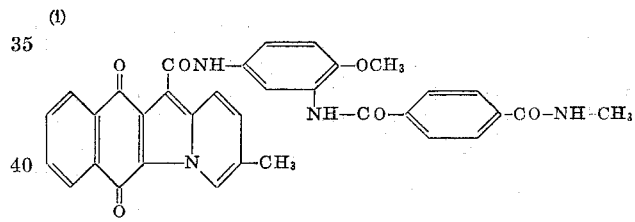

(i) 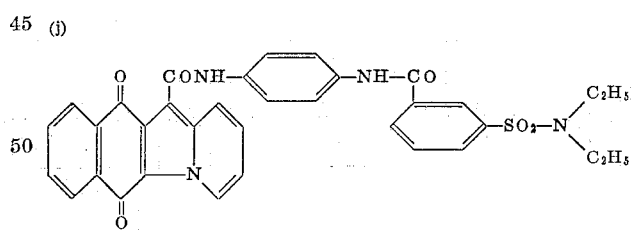

(j) 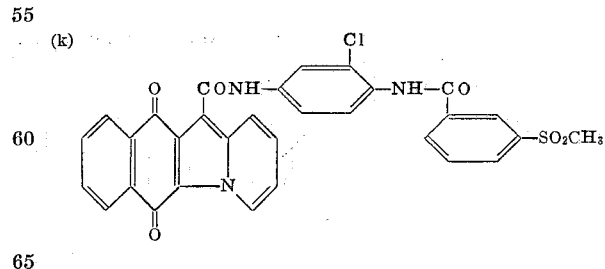

(k) 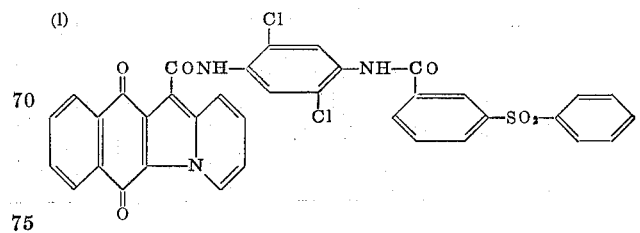

(l)

In the following Table IV are listed further products having similar tinctorial properties, obtained in the manner described in the preceding examples. The aminobenzanilides used, instead of 2'-aminobenzanilide, are shown in Column I. Column II lists the color of the resulting printink ink, while Columns III and IV show the color in polyvinyl chloride and stoving lacquer respectively. Column V shows the formulas of the pigments.

into polyvinyl chloride and stoving lacquer gave red colorations of good lightfastness.

EXAMPLE 44

The procedure of Example 40 was carried out using 84.8 parts of 4'-aminobenzanilide in place of the 2'-aminobenzanilide. 128 parts of red-violet needles, having melting point above 300° C. were obtained, which could be

TABLE IV

| Ex. No. | I | II | III | IV | V |
|---|---|---|---|---|---|
| 41 | 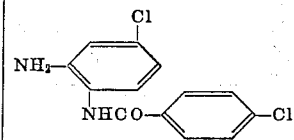 | Orange red | Orange red | Orange red | 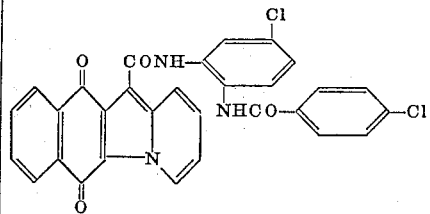 |
| 42 | 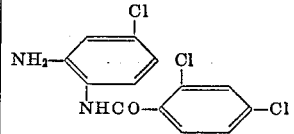 | Red | Red | Red | 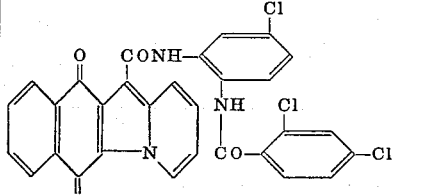 |

EXAMPLE 43

The procedure of Example 40 was carried out, using 69.63 parts of 3'-aminobenzanilide in place of the 2'-aminobenzanilide.

123.4 parts of dark red needles, melting point above 300° C. were obtained, which could be recrystallized, if desired, from nitrobenzene.

The product had the following formula:

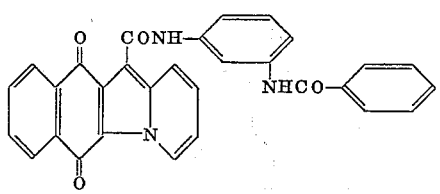

The resulting pigment gave red prints of high light-fastness when applied as an ink to paper. Incorporation recrystallized, if desired, from nitrobenzene. The product had the following formula:

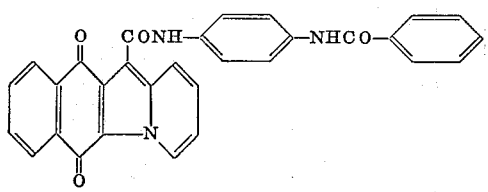

The resulting pigment gave grey-violet prints of high light-fastness when applied as an ink to paper. Polyvinyl chloride foils were colored red-violet shades having a good fastness to light, while incorporation into stoving lacquer gave a red-violet coloration having good fastness to light and overlacquering.

In the following Table V are listed further products, having similar tinctorial properties obtained in the manner described above. The aminobenzanilides used, instead of 4'-aminobenzanilide, are shown in Column I. Column II lists the color of the resulting printing ink, while Columns III and IV show the color in polyvinyl chloride and stoving lacquer, respectively. Column V shows the formulas of the pigments.

TABLE V

| Ex. No. | I | II | III | IV | V |
|---|---|---|---|---|---|
| 45 | [structure: NH2-phenyl-Cl,Cl-NHCO-phenyl-Cl] | Red | Scarlet | Scarlet | [structure: anthraquinone-pyridine-CONH-phenyl-Cl,Cl-NHCO-phenyl-Cl] |
| 46 | [structure: NH2-phenyl-Cl-NHCO-phenyl-Cl] | Red-violet | Red | Red | [structure: anthraquinone-pyridine-CONH-phenyl-Cl-NHCO-phenyl-Cl] |
| 47 | [structure: NH2-phenyl-Cl-NHCO-phenyl-Cl] | Violet | Dark red | Violet | [structure: anthraquinone-pyridine-CONH-phenyl-Cl-NHCO-phenyl-Cl] |
| 48 | [structure: NH2-phenyl-Cl-NHCO-phenyl-Cl,Cl] | Red-violet | Red-violet | Violet | [structure: anthraquinone-pyridine-CONH-phenyl-Cl-NHCO-phenyl-Cl,Cl] |
| 49 | [structure: NH2-phenyl-Cl-NHCO-phenyl-OCH3] | Violet | Dark red | Violet | [structure: anthraquinone-pyridine-CONH-phenyl-Cl-NHCO-phenyl-OCH3] |

EXAMPLE 50

44.5 parts of 2',5'-dichloro-3-methyl-4'-amino-benzanilide were added to a stirred solution of 23.2 parts of naphth - [2,3 - b - ]indolizine - 6,11 - dione - 12 - carboxylic acid chloride in 3900 parts of o-dichlorobenzene at 100° C. The mixture was refluxed for 17 hours and then cooled to room temperature. After filtration and thorough washing with alcohol and water, the product was dried.

In this way were obtained 35 parts of a red powder, having melting point above 300° C. which could be crystallized from o-dichlorobenzene. The product had the following formula:

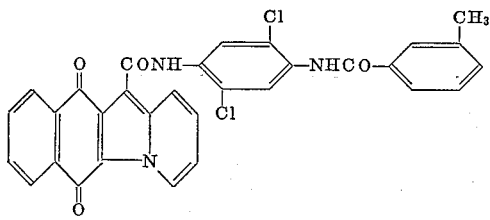

The resulting pigment gave red prints of high light-fastness when applied as an ink to paper. If the pigment is dispersed by known methods until its particle size is 1 micron or less, for example by pebble milling with a dilute solution of sodium dinaphthylmethane sulfonate and the dispersion incorporated into viscose dope, a bright red fiber of good fastness properties results.

EXAMPLE 51

A mixture of 14.34 parts of 2,3-dichloro-1,4-naphthoquinone, 22.74 parts of the acetoacetyl derivative of 2',5'-dichloro-3-methyl-4'-aminobenzanilide, 9.6 parts of pyridine and 30 parts of "Cellosolve" were refluxed for 4 hours, and then cooled to room temperature. After filtration and thorough washing with alcohol and water, the product was dried to yield 7.5 parts of a red crystalline powder.

Solvent extraction of the 12-acetylnaphthindolizinedione thus produced, followed by crystallization of the residue from o-dichlorobenzene, gave red needles, having melting point above 300° C. and identical to the product obtained in Example 50.

EXAMPLE 52

35.7 parts of 2',5'-dichloro-3-methyl-4'-amino-benzanilide were dissolved in 650 parts o-dichlorobenzene at 100° C. and added to a stirred solution of 36.0 parts of 3-methylnaphth - [2,3 - b - ]indolizine - 6,11 - dione - 12 - carboxylic acid chloride in 3250 parts of o-dichlorobenzene at 100° C. The mixture was refluxed for 6 hours and then cooled to room temperature. After filtration and thorough washing with alcohol and water, the product was dried.

In this way were obtained 40.0 parts of red needles, having melting point of 330° to 332° C. and which could be recrystallized, if desired, from nitrobenzene. The product had the following formula:

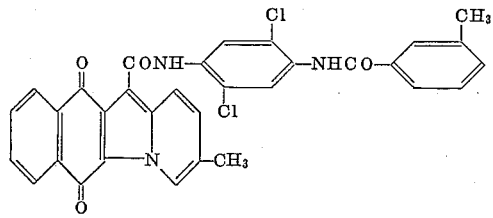

The resulting pigment gave red prints of high light-fastness when applied as an ink to paper.

EXAMPLE 53

The procedure of Example 40 was carried out using 84.8 parts of 2'-chloro-4'-aminobenzanilide in lieu of the 2'-aminobenzanilide.

120 parts of violet, needles, having melting point above 300° C. were obtained, which could be recrystallized, if desired, from nitrobenzene. The product had the following formula:

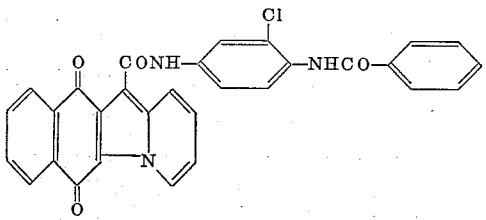

The resulting pigment gave violet prints of high light-fastness when applied as an ink to paper. Polyvinyl chloride foils were colored violet shades having a good fastness to light, while incorporation into stoving lacquer gave a red violet coloration having good fastness to light and overlacquering.

EXAMPLE 54

54 parts of 4-benzoylamino-2,5-dimethoxy-aniline were added to a stirred solution of 31 parts of naphth-[2,3-b-]-indolizine-6,11-dione-12-carboxylic acid chloride in 3900 parts of o-dichlorobenzene at 100° C. After refluxing the mixture for 17 hours, and then cooling to room temperature, the product was filtered and thoroughly washed with o-dichlorobenzene, alcohol, and water and dried.

In this way were obtained 42 parts of violet needles, having melting point above 300° C., which could be recrystallized, if desired, from nitrobenzene. The product had the following formula:

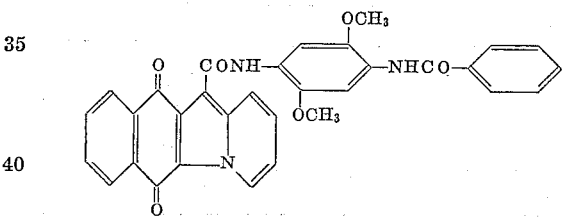

The resulting pigment gave violet prints of good light-fastness when applied as an ink to paper. Incorporation into polyvinyl chloride and stoving lacquer gave violet coloration of good light-fastness.

The preparation of intermediates used in making the compounds according to the invention is illustrated below.

EXAMPLE 55

27.6 parts of o-nitraniline were added to a solution of 30.95 parts of naphth-[2,3-b-]indolizine - 6,11 - dione-12-carboxylic acid chloride in 1500 parts of chlorobenzene at 100° C. The mixture was refluxed with stirring for 17 hours, and was then cooled to room temperature and filtered. The product was thoroughly washed with alcohol and water and dried. In this way were obtained 38.3 parts of orange-red needles, having melting point above 300° C. and having the formula

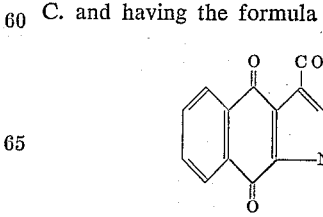

The nitro compound could be recrystallized from nitrobenzene.

EXAMPLE 56

By using equivalent quantities of the other nitroanilines in lieu of the o-nitraniline in the above process, the corresponding nitro derivatives of naphth-[2,3-b-]indolizine- 6,11-dione-12-carboxanilide can be prepared, as for example:

Nitroaniline—Characteristics of naphth-[2,3-b-]indolizine-6,11-dione-12-carboxy-(nitro)anilide m-Nitraniline—Brick red needles, melting point above 300° C.

p-Nitraniline—Dark red needles, melting point above 300° C.

EXAMPLE 57

The reduction to the aminoanilide is effected as follows:

41.1 parts of finely powdered naphth-[2,3-b-]indolizine-6,11-dione-12-carboxy-(2'-nitro)anilide were added in portions to a vigorously stirred aqueous solution of 4000 parts of 5% caustic soda at 70° C. Sodium hydrosulfite was added in portions to the suspension until the reduction was substantially complete, as shown by developing a thin-layer chromatogram of a sample with chloroform. The violet suspension was filtered, thoroughly washed with water and dried. In this way were obtained 38 parts of a violet powder, having melting point above 300° C. and having the formula

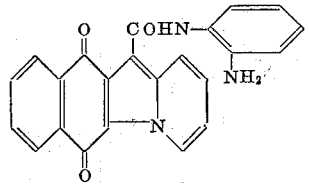

The amine could be crystallized from chlorobenzene to give deep violet plates.

EXAMPLE 58

By using equivalent quantities of other naphth-[2,3-b-]indolizine-6,11-dione-12-carboxy-(nitro)anilides in this procedure, the corresponding naphth-[2,3-b-]-indolizine-6,11-dione-12-carboxy-(amino)anilides can be prepared.

| Naphth-[2,3-b-]indolizine-6,11-dione-12-carboxanilide | Characteristics of Amine |
| --- | --- |
| 3'-nitro | Red-violet crystalline powder, melting point above 300° C. |
| 4'-nitro | Violet crystalline powder, melting point above 300° C. |

EXAMPLE 59

A solution of 60.5 parts phosphorus trichloride in 500 parts toluene was added to a stirred suspension of 29.1 parts napthth-[2,3-b-]indolizine-6,11-dione-12-carboxylic acid and 31.6 parts 2,2',5'-trichloro-4'-aminobenzanilide in 1500 parts toluene at 60° C. The mixture was heated under reflux for 4 hours, the toluene removed by steam distillation, the product filtered, thoroughly washed with dilute alkali, water, and methanol, and dried.

46 parts of a red powder, having melting point above 300° C. was obtained, recrystallizing from nitrobenzene as red needle-shaped crystals, identical with the product of Example 45 in Table V of the formula

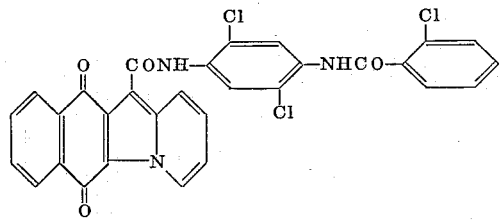

EXAMPLE 60

38.1 parts naphth-[2,3-b-]indolizine-6,11-dione-12-carboxy-(4'-amino)-anilide were added to a solution of 15 parts benzoyl chloride in 440 parts chlorobenzene and 4.4 parts anhydrous pyridine. The mixture was refluxed with stirring until the reaction was substantially complete, and was then cooled to room temperature and filtered.

The product was thoroughly washed with chlorobenzene, acetone and water, and dried. In this way were obtained 40 parts of a violet powder having melting point above 300° C. and recrystallizing from nitrobenzene as violet needle-shaped crystals. The product was identical to the product obtained in Example 44.

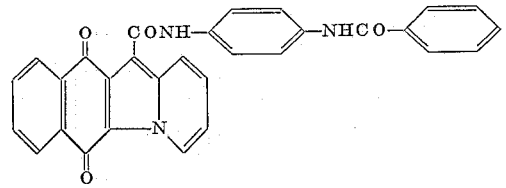

A third aspect of the present invention relates to new water-insoluble naphthindolizinedione-carboxyarylamide coloring matters suitable for the pigmentation of paints, lacquers, printing inks, rubber, synthetic polymeric materials, paper and textile materials, and especially to stoving lacquers for use as automobile paints, on account of their outstanding fastness to light, organic solvents and cross-lacquering.

Several naphthindolizinedione-carboxyarylamides have already been described and their use as pigments and dyestuffs is also known. These compounds may alternatively be described as aromatic amides of 2,3-phthaloyl-pyrrocoline-1-carboxylic acids. In U.S. patent specification No. 2,863,714 are described a number of such compounds including derivatives the molecule of which has the aryl ring in the carboxyarylamide grouping substituted by certain combinations of one or more chloro-, methoxy-, and methyl-substituents.

We have now found that other naphthindolizine-dione-carboxyarylamide compounds of different novel, combinations of substituents, possess unexpectedly superior properties when incorporated, as coloring matters into a wide variety of organic materials, and in particular that the new compounds possess surprisingly superior properties of solvent fastness, resistance to overlacquering in stoving enamel compositions, and/or resistance to migration, especially when incorporated into vinyl chloride polymers as compared with structurally closest known naphthindolizinedione-carboxyarylamides. The new compounds therefore are especially valuable, particularly as they also possess very good brightness and lightfastness, the new compounds providing shades ranging from scarlet to maroon.

According to the present invention, there are provided naphth[2,3-b-]indolizinedione-carboxyarylamides having the formula

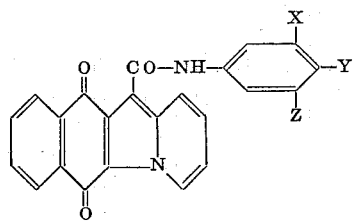

(XXII)

wherein X, Y and Z are halogen of one of the atomic numbers 17 and 35, X and Z being identical halogens, or X and Z are the same or different halogen atoms of one of the atomic numbers 17 and 35, and Y is acetylamino or propionylamino. Optimal fastness properties especially with regard to light, cross-lacquering, migration, and organic solvents are possessed by the pigments of Formula XXII, in which X, Y and Z are all halogen as defined above, or X and Z are chlorine and/or bromine, and Y represents acetylamino or propionylamino.

The name of the parent compound, naphtha-[2,3-b-]indolizine, and the system of numbering adopted in this specification are those given in Patterson's "Ring Index" (2nd edition, page 605, No. 4520).

The present invention also provides a process of producing a naphthindolizinedione-carboxylaryamide having the Formula XXII which comprises reacting a napthindolizinedione-12-carboxylic acid halide having the formula

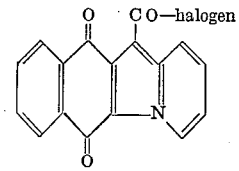

XXIII with an aromatic amine having the formula:

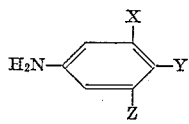

XXIV wherein X, Y and Z have the previous significance.

The process may be carried out by heating the naphthindolizinedione-12-carboxylic acid halide and the aromatic amine together in a substantially anhydrous organic liquid medium inert under the conditions of the reaction, for example, monochlorobenzene, nitrobenzene, o-dichlorobenzene or xylene, optionally in the presence of an acid binding agent. The acid binding agent is advantageously present in a proportion at least stoichiometrically sufficient to neutralize hydrogen halide liberated during the reaction, and may be, for example, pyridine, anhydrous sodium acetate or excess of the aromatic amine used as reactant in the process.

The process is preferably effected at a temperature in the range of from 50° C. to the boiling point of the reaction mixture under reflux conditions, and conveniently at 100° C.

The naphthindolizinedione-12-carboxylic acid halide of Formula XXIII used as reactant is preferably the 12-carboxylic acid chloride. The halides may be prepared in a conventional manner from the corresponding 12-carboxylic acid alkyl esters by hydrolysis to the free acid, followed by treatment with an acid halogenating agent.

The 12-carboxylic acid esters may in turn be prepared by condensing 1,4-naphthoquinone dihalide, an alkyl acetoacetate and pyridine, 2,3-dichloro-1,4-naphthoquinone being particularly suitable as reactant in this condensation.

Examples of aromatic amines of Formula XXIV which may be used in the process include 3,4,5-trichloraniline, 3,4,5-tribromaniline, 3,5-dibromo-4-chloraniline, 3,5-dichloro-4-bromaniline, 4-amino-2,6-dichloroacetanilide, 4-amino - 2,6-dibromacetanilide, 4-amino-2-chloro-6-bromacetanilide.

Preferred pigments falling under Formula XXII, on account of their possessing an optimal combination of the fastness properties mentioned above, are those of the formula

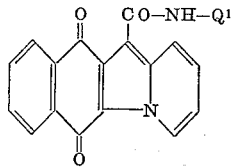

wherein $Q^1$ is a member selected from the group consisting of

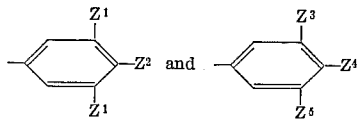

the two substituents $Z^1$ being identical members selected from a group consisting of chlorine and bromine, each of $Z^2$, $Z^3$ and $Z^5$ being a member selected from the group consisting of chlorine and bromine, and $Z^4$ being a member selected from a group consisting of acetylamino and propionylamino.

The present invention also provides another process of producing a naphthindolizinedione - carboxyarylamide having Formula XXII which comprises condensing a naphthindolizinedione-12-carboxylic acid having the formula

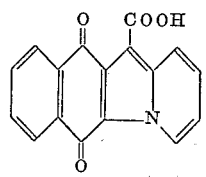

(XXV)

with an aromatic amine of Formula XXIV. The condensation may be carried out by a conventional method, for example, by using phosphorus trichloride as condensing agent.

The present invention also provides a process of producing a naphthindolizinedione-carboxyarylamide having Formula XXII which comprises reacting an acetoacetanilide having the formula:

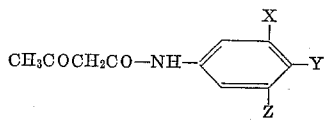

XXVI wherein X, Y and Z have the previous significance, with a 1,4-naphthoquinone compound and with pyridine.

The 1,4-naphthoquinone compound is preferably a 2,3-dihalo-1,4-naphthoquinone, the particularly preferred reactant being 2,3-dichloro-1,4-naphthoquinone. The acetoacetanilide reactant may be prepared by known methods, for example, by reacting the corresponding 3,4,5-trisubstituted aniline with an alkyl acetoacetate or with diketene, as described in volume XI, part 2, pages 19 to 22, of Houben Weyl "Methoden der Organischen Chemie" (fourth edition).

The reaction may be carried out in an organic liquid medium which is inert under the conditions of the reaction, for example nitro-benzene, ethanol, 2-ethoxy ethanol or 2-methoxy ethanol; alternatively an excess of pyridine may be used as reaction solvent. If the desired naphthindolizinedione-carboxyarylamide is contaminated with 12-acetylnaphthindolizinedione, this contaminant may be removed by extraction with chloroform or other conventional solvent extractant.

The naphth-[2,3-b-]indolizinedione-carboxyarylamides of the present invention, produced by any of the processes referred to above, may, if desired, be isolated, purified or partially purified by any conventional procedure, for instance filtration, and fractional crystallization from solvents. If the product is to be used as a pigment, it may be processed by a known conditioning or after-treatment technique, for instance by grinding with calcium chloride or other inorganic salt or with sodium acetate or other organic salt, with or without the addition of dimethylaniline, xylene or other organic solvent, or by heating with nitrobenzene, α-chloronaphthalene or other high-boiling solvent. The product intended for use as a pigment may also, if desired, be dispersed in water, for instance by pebble milling in the presence of an anionic, cationic or non-ionic dispersing agent.

The present invention also provides a composition comprising an organic material and, as coloring matter, a naphth-[2,3-b-]indolizinedione-carboxyarylamide having the Formula XXII. The organic compound to be colored by the process of the invention may be any polymeric or other organic material capable of being pigmented or otherwise colored. The material may be a natural or synthetic polymer or copolymer, a coating composition for application to the surface of an article, colored printing liquid media, or any other organic colorable material. However, the process of the invention is applicable with particular advantage to the pigmentation or other coloration of natural or synthetic polymers or copolymers, in the form of fibers, films or bulk material; to paints, lacquers and other surface coating compositions, or to tinting compositions for use in preparing such coating compositions; and to printing inks. Examples of polymers or copolymers which may be pigmented by the process include vinyl chloride polymers and copolymers, polyethylene and other polyolefins, and natural and synthetic rubbers.

The following examples further illustrate the third aspect of the present invention. Parts and percentages shown therein are expressed by weight unless otherwise stated.

EXAMPLE 61

92.85 parts of naphth-[2,3-b-]indolizine-6,11-dione-12-carboxylic acid chloride were dissolved in 5000 parts monochlorobenzene at 100° C. with stirring. To this was added 64.9 parts of 3,4,5-trichloraniline, and the mixture was boiled under reflux with stirring, for 4 hours.

After cooling to room temperature, the product was filtered, thoroughly washed with alcohol and water, and dried. In this way were obtained 120 parts of red, needle-shaped crystals, having melting point above 300° C., and having the following formula:

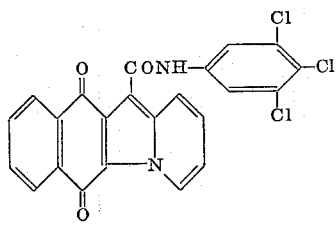

The naphth-[2,3-b-]indolizine-6,11-dione-12-carboxy-3,4,5-trichloranilide produced could be recrystallized from nitrobenzene.

EXAMPLE 62

47.8 parts of 2,3-dichloronaphthoquinone, 56.1 parts of acetoacet-3,4,5-trichloranilide and 31.6 parts of pyridine were heated together for 2 hours at 100° C. with stirring. 400 parts of nitrobenzene were added and the mixture boiled for 1 hour.

After cooling, the product was filtered, thoroughly washed with alcohol and water, and dried. In this way were obtained 22.1 parts of the 3,4,5-trichloranilide as a red powder, having melting point above 300° C., and recrystallizing from nitrobenzene as red, needle-shaped crystals, identical with the product of Example 61.

EXAMPLE 63

61.9 parts of naphth-[2,3-b-]indolizine-6,11-dione-12-carboxylic acid chloride were dissolved in 4400 parts of monochlorobenzene at 100° C. with stirring. To this were added 134 parts of 30% 4-amino-2,6-dichloroacetanilide, dissolved in 100 parts of pyridine, and the mixture was refluxed with stirring for 4 hours. After cooling to room temperature, the product was filtered, thoroughly washed with alcohol and water, and dried.

In this was, were obtained 47.0 parts of bronze, needle-shaped crystals, having melting point above 300° C. and having the following formula:

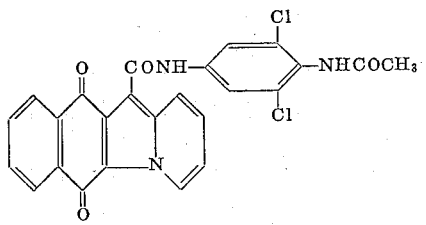

The 4-acetylamino-3,5-dichloranilide could be recrystallized from nitrobenzene.

EXAMPLE 64

61.9 parts of naphth-[2,3-b-]-indolizine-6,11-dione-12, carboxylic acid chloride were dissolved in 4400 parts of monochlorobenzene at 100° C., with stirring. To this were added 57.9 parts of 4-amino-2-chloro-6-bromoacetanilide, dissolved in 100 parts of pyridine, and the mixture was refluxed with stirring for 4 hours. After cooling to room temperature, the product was filtered, thoroughly washed with alcohol and water, and dried.

In this way were obtained 76.5 parts of violet, needle-shaped crystals, having melting point above 300° C. and having the following formula:

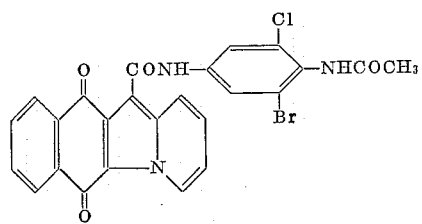

The 4-acetylamino-3-chloro-5-bromoanilide could be recrystallized from nitrobenzene.

In a similar manner as described in Example 64 the following pigment is produced using 4-amino-2-chloro-6-bromo-propionanilide; the new pigment falls under Formula XXII and has the following substituent in the 12-position;

(a)

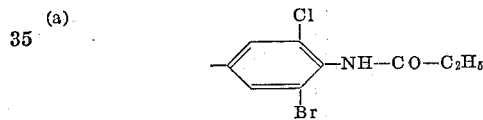

EXAMPLE 65

61.9 parts of naphth-[2,3-b-]-indolizine-6,11-dione-12-carboxylic acid chloride were dissolved in 5850 parts of o-dichlorobenzene at 100° C. with stirring. To this were added 68 parts of 4-amino-2,6-dibromacetanilide, dissolved in 100 parts of pyridine, and the mixture was refluxed with stirring for 4 hours. After cooling to room temperature, the product was filtered, thoroughly washed with alcohol and water, and dried.

In this way were obtained 86 parts of red-violet, needle-shaped crystals, having melting point above 300° C. and having the following formula:

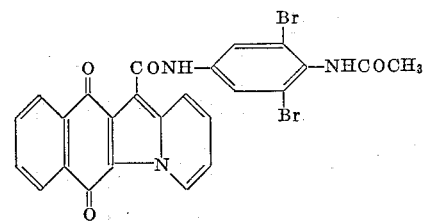

The 4-acetylamino-3,5-dibromanilide could be recrystallized from nitrobenzene.

EXAMPLE 66

61.9 parts of naphth-[2,3-b-]-indolizine-6,11-dione-12-carboxylic acid chloride were dissolved in 4400 parts of monochlorobenzene at 100° C. with stirring. To this were added 62.8 parts of 3,5-dibromo-4-chloraniline, dissolved in 1100 parts of monochlorobenzene, and the mixture was refluxed with stirring for 4 hours. After cooling to room temperature, the product was filtered, thoroughly washed with alcohol and water, and dried.

In this way were obtained 97 parts of red, needle-shaped crystals having melting point above 300° C. and having the following formula:

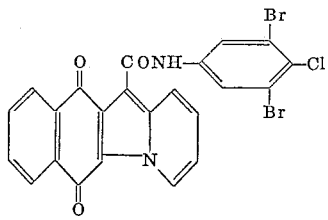

The 3,5-dibromo-4-chloranilide could be recrystallized from nitrobenzene.

EXAMPLE 67

61.9 parts of naphth-[2,3-b-]-indolizine-6,11-dione-12-carboxylic acid chloride were dissolved in 4000 parts of xylene at 100° C. with stirring. To this were added 72.6 parts of 3,4,5-tribromaniline, dissolved in 100 parts pyridine, and the mixture was refluxed with stirring for 7 hours. After cooling to room temperature, the product was filtered, thoroughly washed with alcohol and water, and dried.

In this way were obtained 90 parts of brick-red needle-shaped crystals, having melting point above 300° C. and having the following formula:

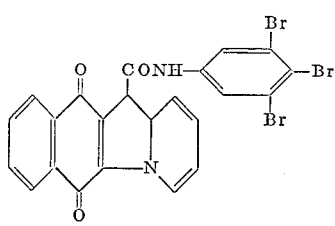

The 3,4,5-tribromanilide could be recrystallized from nitrobenzene.

EXAMPLE 68

The naphth-[2,3-b-]-indolizine-6,11-dione-12-carboxy-3,4,5-trisubstituted anilides, produced by the processes described in Examples 61 to 67 were prepared in a finely divided state by milling with anhydrous sodium acetate in the presence of small amounts of xylene, and tested against other naphth-indolizinedione-12-carboxanilides other than those of the present invention.

The various naphthindolizinedione-carboxyarylamides were incorporated as pigments, after preparation in a finely divided state by milling with anhydrous sodium acetate in the presence of xylene, into polyvinyl chloride films of the following formulation:

100 parts of "Geon 121" polyvinyl chloride
60 parts of dialphanyl phthalate
3 parts of "Ferroclere 1820"
1 part of "Ferroclere 900"

("Geon" is a registered trade mark. The "dialphanyl phthalate" is the diester prepared from phthalic acid and the commercially available mixture of alcohols known as "Alphanol.")

The pigmentation of each formulation was made as a full-shade pigmentation using 1% of the naphthindolizine-dione-carboxyarylamide pigment based on the polyvinyl chloride content of the formulation, and the other being a shade reduction pigmentation using 0.1% of the pigment together with 1% of titanium dioxide both percentages being based on the polyvinyl content of the formulation. The films were prepared and cured in the conventional way, the nominal film thickness in each case being 1/50 of an inch and curing being carried out at 170° C. for 15 minutes.

The films were then assessed for lightfastness and migration resistance, and the results are given in Table VI.

TABLE VI.—COMPARISON IN POLYVINYL CHLORIDE FILM

| Anilide | Shade in PVC | Migration Resistance | |
| --- | --- | --- | --- |
| | | Full Shade | Reduction |
| 3,4,5-trichloroanilide | Scarlet | Very good | Good. |
| 4-acetylamino-3,5-dichloranilide | Maroon | Excellent | Very good. |
| 4-acetylamino-3-chloro-5-bromanilide | Deep red | do | Excellent. |
| 4-acetylamino-3,5-dibromanilide | Maroon | do | Do. |
| 4-chloro-3,5-dibromanilide | Red | Good | Good. |
| 3,4,5-tribromanilide | Red | do | Do. |
| Anilide | Red | Bad | Rather poor. |
| 2,4,5-trichloranilide | Scarlet | Rather poor | Poor. |
| 2,4,6-trichloranilide | Orange red | Bad | Do. |
| 2,3,4,5,6-pentafluoranilide | Scarlet | Bad | Do. |
| 4-nitro-2-anisidide | Red | Poor | Do. |
| 4-nitro-2-chloranilide | Scarlet | Rather poor | Do. |

Lightfastness was measured by exposure of each film to light, e.g. in a Fadeometer (Kelvin & Hughes Ltd.) or an Xeno-test lamp. Migration resistance was measured by subjecting each film to 1 lb. pressure against a white-pigmented polyvinyl chloride film at 75° C. for 24 hours, the resulting staining of the white film then being assessed.

Each of the different naphthindolizinedione-carboxyarylamide pigments used had the formula

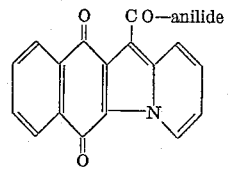

where the anilide group is as shown in the table.

All the 3,4,5-trisubstituted anilides mentioned above had excellent lightfastness in polyvinyl chloride film, and were in no way inferior in this respect to naphthindolizine-dione-12-carboxyarylamides other than those of the present invention.

These results show the superior properties of the 3,4,5-trisubstituted anilides when incorporated into polyvinyl chloride, and that this superiority is surprising in view of the comparatively poor properties of the other anilides which are chemically closely related.

EXAMPLE 69

The napthindolizinedione-carboxyarylamides prepared as described in Examples 61 to 67 together with a variety of other naphthindolizinedione-carboxyarylamides, were incorporated into stoving lacquer.

In each case, a paste was formulated consisting of 1 part of the pigment and 3 parts of "Uresine B." The medium in each case was prepared by mixing 50 parts of a 60% solution of "Beckosol 3246" in xylene, 30 parts of "Super Beckamine 1517," 10 parts of xylene and 10 parts of 2-methoxy ethanol. The lacquers were then prepared in the conventional manner, and a film of each sample was applied to cardboard. The stoving time was 30 minutes at 120° C.

The pigmentations made were: a 3% mixture comprising 0.3 parts of the pigment in 10 parts of the total mixture. The results are shown in Table VII. The lightfastness was assessed as in Example 68. The overlacquering fastness was measured by overlacquering the film on cardboard with 20% titanium dioxide and re-stoving at 120° C. for 30 minutes and the resultant staining of the white film was then assessed.

TABLE VII.—COMPARISON IN STOVING LACQUER

| Anilide | Shade in Stoving Lacquer | Overlacquering Fastness |
|---|---|---|
| 3,4,5-trichloranilide | Red | Excellent. |
| 4-acetylamino-3,5-dichloranilide | Bordeaux | Very good. |
| 4-acetylamino-3-chloro-5-bromanilide | do | Do. |
| 4-acetylamino-3,5-dibromanilide | do | Do. |
| 4-chloro-3,5-dibromanilide | Red | Do. |
| 3,4,5-tribromanilide | Red | Excellent. |
| Anilide | Maroon | Bad. |
| 2,4,6-trichloranilide | Red | Bad. |
| 3,4-dichloranilide | Red | Poor. |
| 2,3,4,5,6-pentafluoranilide | Red | Very poor. |
| 4-nitroanilide | Red | Poor. |
| 4-anisidide | Maroon | Bad. |

All the 3,4,5-trisubstituted anilides mentioned above had excellent lightfastness in stoving lacquer, and were in no way inferior in this respect to the naphthindolizine-dione-12-carboxyarylamides other than those of the present invention.

These results demonstrate the superior properties of the 3,4,5-trisubstituted anilides when incorporated into stoving lacquer. This superiority is surprising in view of the comparatively poor properties of the other anilides which are chemically closely related.

EXAMPLE 70

The naphthindolizinedione - carboxyarylamides, produced as described in Examples 61 to 67, were tested for resistance to the solvents, trichloroethylene, toluene, 2-ethoxyethanol and methyl ethyl ketone, as were a variety of other naphthindolizinedione-carboxyarylamides other than those of the present invention. The results obtained are given in Table VIII. The tests were carried out by enclosing a small sample (conveniently 0.2 gram) of the pigment in a circle of Whatman No. 5 filter paper, and immersing in a test-tube of solvent for at least 24 hours to enable equilibrium to be reached.

TABLE VIII.—COMPARISON OF SOLVENT RESISTANCE

| Anilide | Solvent Resistance | | | |
|---|---|---|---|---|
| | Trichlorethylene | Toluene | 2-ethoxy Ethanol | Methyl Ethyl Ketone |
| 3,4,5-trichloranilide | Very good | Good | Excellent | Excellent. |
| 4-acetylamino-3,5-dichloranilide | do | Very good | Very good | Very good. |
| 4-acetylamino-3-chloro-5-bromanilide | do | do | do | Do. |
| 4-acetylamino-3,5-dibromanilide | do | do | Excellent | Do. |
| 4-chloro-3,5-dibromanilide | do | do | do | Excellent. |
| 3,4,5-tribromanilide | Excellent | Excellent | do | Do. |
| Anilide | Poor | Poor | Moderate | Moderate. |
| 2,4,6-trichloranilide | do | Very poor | Rather poor | Poor. |
| 2,3,4,5,6-pentafluoranilide | Bad | Bad | Moderate | Do. |
| 4-toluidide | Bad | Bad | do | Do. |
| 4-nitro-2-anisidide | Poor | Poor | Good | Moderate. |
| 3,4-dichloranilide | Rather poor | Rather poor | do | Do. |

These results show the superior solvent-resisting properties of a pigment of this aspect of the present invention, as compared with those of other chemically closely-related compounds, when tested in a variety of commonly used organic solvents.

EXAMPLE 71

A solution of 51 parts of 2,6-dichloro-4-aminopropionanilide in 500 parts of chlorobenzene were added to a solution of 61.9 parts naphth-[2,3-b-]indolizine-6,11-dione-12-carboxylic acid chloride in 3500 parts of o-dichlorobenzene at 100° C. After heating under reflux for 2 hours, the mixture was cooled to room temperature, filtered, and thoroughly washed with chlorobenzene, alcohol, and water before drying.

82.5 parts of a red-violet powder, having melting point above 300° C. were obtained, which could be crystallized to red-violet needle-shaped crystals from nitrobenzene if desired. The product had the following formula:

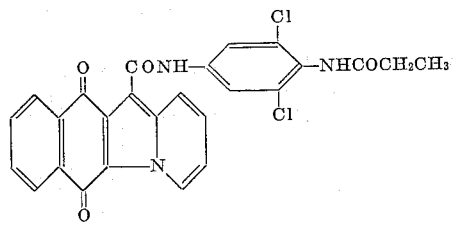

The resulting pigment gave red-violet prints of good lightfastness when applied as an ink to paper, a maroon foil of good lightfastness when incorporated into polyvinyl chloride, and a maroon coloration of good light fastness and over-lacquering fastness when incorporated into stoving lacquer.

EXAMPLE 72

A solution of 60.5 parts phosphorus trichloride in 1000 parts toluene was added to a stirred suspension of 58.2 parts naphth[2,3 - b]indolizine - 6,11 - dione - 12 - carboxylic acid and 39.3 parts 3,4,5-trichloroaniline in 3000 parts toluene at 60° C. The mixture was heated under reflux for 4 hours, the toluene removed by steam distillation, the product filtered, thoroughly washed with dilute alkali, water and methanol, and dried.

80 parts of a red crystalline product, having melting point above 300° C. were obtained, recrystallizing from nitrobenzene as red needle-shaped crystals, identical with the product of Example 61.

The following four aspects of the invention relate to compounds which contain as the trunk structure a benzo[g]naphth - [2,3 - b] - indolizine - 8,13 - dione system which bears in 14-position an N-aryl-substituted, and more particularly an N-phenyl-substituted carbamyl group.

Compounds of the above structure are new, and it is particularly surprising that they are pigments of excellent all-round fastness properties. For, the hitherto known derivatives containing an isomeric benzo[f] naphthindolizinedione trunk structure have been described in U.S. Patent 2,863,714 to Long et al. as disperse dyes for the dyeing of polyester and cellulose acetate fibers from a long bath (exhaustion process).

While the aforesaid trunk structure of the known disperse dyes contains a quinoline ring system fused into the said trunk, the novel compounds according to our invention contain an isoquinoline system.

A fourth aspect of the present invention relates to water-insoluble new benzo-[g]-naphth[2,3-b]indolizine-8,13-dione-14-carboxyarylamide coloring matters suitable for the pigmentation of paints, lacquers, printing inks, rubber, artificial polymeric materials, paper and textile materials, and to processes of producing these substances.

According to this aspect of the invention, there are provided new coloring matters that are free from substituents which confer solubility in water and are of the formula

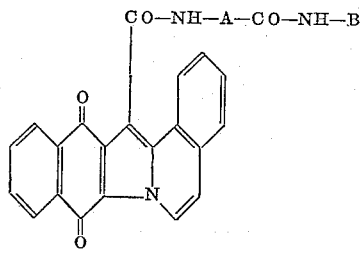

XXVII wherein

A is an arylene, and more particularly a phenylene residue unsubstituted or substituted with one or several, preferably not more than 2 halogen atoms, or with lower alkyl, lower alkoxy, aryloxy, especially phenoxy, or halogen-substituted aryloxy, especially chloro- or bromo-phenoxy groups;

B is a phenyl group unsubstituted or substituted with one or several, preferably not more than three, of the following substituents, or an α-naphthyl or β-naphthyl group unsubstituted or substituted with one or more of the following substituents, namely: halogen, especially chlorine or bromine, lower alkyl, lower alkoxy, trifluoromethyl, cyano lower alkanoyl, aroyl, especially benzoyl or naphthoyl, lower alkanoylamino, lower alkoxy carbonylamino, lower alkyl-substituted carbamyl, lower alkyl-sulfonyl-amino, lower alkyl-substituted sulfamyl, lower alkyl-sulfonyl or aryl-sulfonyl, especially phenylsulfonyl group.

These pigments are distinguished from those described under the preceding aspects of this invention, by an unexpectedly different range of shades extending from yellow to red. Optimal fastness properties are possessed by those compounds of Formula XXVII wherein A is a phenylene substituted with chlorine or bromine, and B is phenyl substituted with chlorine and/or methyl.

Again throughout the specification the term "lower" signifies a substituent group containing not more than five carbon atoms.

Where the groups A and/or B are substituted with one or more of the above substituents, the halogen is preferably chlorine or bromine; the lower alkyl group may be, for example, ethyl, n-propyl or n-butyl but is preferably methyl; the lower alkoxy group, methoxy, ethoxy, n-propoxy or isopropoxy; the aryloxy group, phenoxy; the halogen substituted aryloxy group, halogen substituted phenoxy; the lower acyl group, acetyl; the aroyl group, benzoyl; the lower alkyl substituted carbamyl group, N,N-diethyl carbamyl; the lower alkyl substituted sulfamyl group, N,N-diethylsulfamyl; the lower alkyl sulfonyl group, methyl sulfonyl; the aryl sulfone, phenyl sulfone.

The name benzo[g]-naphth-[2,3,-b] indolizine is preferred for the parent compound to the alternative benz-[5,6] indolo [2,1-a] isoquinoline given in the first supplement to Patterson's "Ring Index" (page 222, No. 9287) for reasons of euphony and to clearly show the relationship to the derivatives of naphth-[2,3-b] indolizine.

The numbering is as recommended by Patterson.

The present invention also provides a process of preparing a compound of Formula XXVII, which comprises reacting a benzo[g]-naphth-[2,3-b] indolizine-8,13-dione-14-carboxylic acid halide having the formula

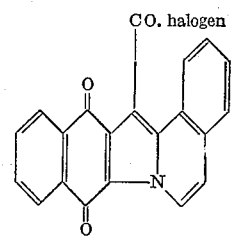

XXVIII with a substituted or unsubstituted o-, m- or p-aminobenzanilide or a substituted or unsubstituted 2-, 3- or 4-amino-N-(1- or 2-naphthyl) benzamide having the formula $$H_2N—A—CO—NH—B$$ XXIX wherein A and B have the previous significance.

If the compound of Formula XXIX used in the process is an o-, m- or p-aminobenzanilide, the product is a benzo [g]-naphth-[2,3-b] indolizine-8,13-dione - 14-carboxyarylamide having the Formula XXVII, wherein A and B have the previous significance, B representing a substituted or unsubstituted phenyl group. If the compound of Formula XXIX used in the process is a 2-, 3- or 4-amino-N(1- or 2-naphthyl) benzamide, the product is a compound having the Formula XXVII wherein A and B have the previous significance, B representing an α- or β-naphthyl residue.

The above process of the invention may conveniently be carried out by heating the reactants together in a substantially anhydrous organic liquid essentially inert under the conditions of the reaction, for example, nitrobenzene, monochlorobenzene or o-dichlorobenzene, optionally in the presence of an acid-binding agent. The product may be conveniently isolated by filtration and washing and may subsequently be dried, if desired.

Aminobenzanilides or amino-N(1- or 2-naphthyl)benzamides for use in the above process of the invention may conveniently be obtained by condensing an appropriately substituted nitrobenzoic acid with a suitable arylamine or naphthylamine. The reactants may be heated together in a substantially anhydrous organic liquid medium essentially inert under the conditions of the reaction, for example, nitrobenzene, monochlorobenzene or o-dichlorobenzene, and in the presence of a conventional condensing agent, followed by reduction of the condensation product. The condensing agent may be, for example, phosphorus trichloride, and the subsequent reduction may be effected under Béchamp conditions. The present aspect of the invention also provides a second process of producing a compound of Formula XXVII, which comprises condensing a benzo[g]-naphth-[2,3-b] indolizine-8,13-dione-14-carboxylic acid having the formula

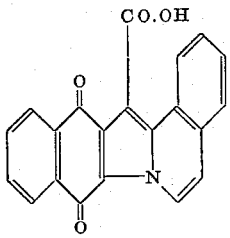

XXX with a substituted o-, m- or p-aminobenzanilide or substituted 2-, 3- or 4-amino-N(1- or 2-naphthyl) benzamide of Formula XXIX. The condensation may be carried out by a conventional method, for example by using phosphorus trichloride as a condensing agent.

Examples of aminobenzanilides which may be used in the first and second processes of this aspect of the invention include 3'-chloro-2-aminobenzanilide,
4'-methyl-2-aminobenzanilide,
3',4',5'-trichloro-2-aminobenzanilide,
4'-chloro-3'-trifluoromethyl-2-aminobenzanilide,
4,4'-dichloro-3-aminobenzanilide,
2',4,4',5',6-pentachloro-3-aminobenzanilide,
4-bromo-3',4'-dichloro-3-aminobenzanilide,
4'-iodo-4-chloro-3-aminobenzanilide,
3',4,4',5',6-pentachloro-3-aminobenzanilide,
4-chloro-4'-methyl-3-aminobenzanilide,
4-chloro-4'-methoxy-3-aminobenzanilide,
4-chloro-2',5'-dimethoxy-3-aminobenzanilide,
4-chloro-2',4'-dimethyl-3-aminobenzanilide,
2'-methoxy-5'-(N,N-diethyl) sulphonamido-3-amino-
   benzanilide,
4'-fluoro-4-methoxy-3-aminobenzanilide,
2',4-dimethyl-4'-trifluoromethyl-3-aminobenzanilide,
4-bromo-3',4',5'-trichloro-3-aminobenzanilide,
2',5'-dichloro-4,6-diphenoxy-3-aminobenzanilide,
2',4',5'-trichloro-4-methoxy-3-aminobenzanilide,
4,5'-dichloro-2'-methoxy-3-aminobenzanilide,
4-chloro-2'-methoxy-5'-methyl-3-aminobenzanilide,
2',4'-dibromo-4-methoxy-3-aminobenzanilide,
2',4,5'-triethoxy-4'-chloro-3-aminobenzanilide,
4,4'-dichloro-2'-methyl-3-aminobenzanilide,
4,4',6-trichloro-2'-methyl-3-aminobenzanilide,
2',4-dimethoxy-5'-ethylsulphonyl-3-aminobenzanilide,
2',3,5'-trichloro-4-aminobenzanilide,
2',5'-dimethoxy-4'-cyano-4-aminobenzanilide,
3'-acetyl-4-aminobenzanilide and
3'-chloro-4-aminobenzanilide.

Examples of amino-N(1- or 2-naphthyl) benzamides which may be used in the first and second processes of the present aspect of the invention include 3-amino-4-chloro-(N1-naphthyl) benzamide,
3-amino-4-chloro-N(2-naphthyl) benzamide,
3-amino-4-chloro-N[1-(5,8-dichloro) naphthyl] benzamide,
2-amino-N(1-naphthyl) benzamide,
4-amino-N(1-naphthyl) benzamide and
3-amino-4-methoxy-N[1-(5,8-dichloro) naphthyl]benzamide.

The benzo[g]-naphth-[2,3-b] indolizine-8,13-dione-14-carboxylic acid used in the second process of the invention may advantageously be prepared from the corresponding carboxylic acid esters by hydrolysis to the free acid. The corresponding 14-carboxylic acid halide used in the first process of the invention, may be prepared by treating the 14-carboxylic acid with an acid halogenating agent, for instance, thionyl chloride. The carboxylic acid esters are themselves the products of the condensation of a 2,3-dihalo-1,4-naphthoquinone, an alkyl acetoacetate and isoquinoline, a reaction which is described for example, by Pratt, Rice and Luckenbaugh in the Journal of the American Chemical Society, volume 79, pages 1212 to 1217, 1957. The 2,3-dihalo-1,4-naphthoquinone is preferably 2,3-dichloro-1,4-naphthoquinone and the alkyl acetoacetate, methyl or ethyl acetoacetate. Isoquinoline may be replaced by a technical quinoline/isoquinoline mixture provided that at least one molecule of isoquinoline per molecule of the quinone is present.

The carboxylic acid esters may also be prepared by reaction of a 2,3-dihalo-1,4-naphthoquinone with an N-carbalkoxymethyl) isoquinolinium salt as described by Jonny in Oesterreichischer Chem. Zeitung, 1963, 64, page 295, or by reaction of an alkyl acetoacetate with 2-methoxy-1,4-naphthoquinone - 3 - isoquinolinium methosulphate as described by VanAllan and Reynolds in the Journal of Organic Chemistry, 1963, 28, pages 1022 to 1025.

The present aspect of the invention also comprises a third process of producing the new colouring matters hereinbefore defined, which comprises reacting an acetoacetylaminobenzanilide or acetoacetylamino-N-(1- or 2-naphthyl) benzamide having the formula:

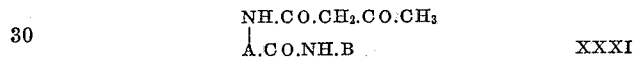

XXXI wherein A and B have the previous significance, with a 1:4 naphthoquinone and with iso-quinoline.

The 1:4 naphthoquinone is preferably a 2:3-dihalo-1:4-naphthoquinone. The iso-quinoline may, if desired, be in the form of a mixture containing quinoline, such as the commercially available "technical" quinoline containing approximately 25% by weight of iso-quinoline. The condensation may be effected in a solvent which is essentially inert under the conditions of the reaction, for instance, nitrobenzene, cellosolve or methyl cellosolve; alternatively an excess of iso-quinoline may be used as the reaction solvent. The compounds of Formula XXXI may be prepared by known methods for example by reacting the corresponding aminobenzanilide or amino N(1- or 2-naphthyl) benzamide with an alkyl acetoacetate or with diketene.

The present aspect of the invention further provides a process of producing a pigment which comprises conditioning a benzo[g]-naphth-[2,3-b] indolizine-8,13-diene-14-carboxyarylamide compound of Formula XXVII. A known conditioning technique may be used, for example, grinding with calcium chloride, sodium chloride or other organic or inorganic salt, with or without the addition of dimethylaniline, xylene or other organic solvent; or heating with a high-boiling organic solvent, for instance, nitrobenzene or α-chloronaphthalene. The compounds of Formula XXVII may also be dispersed in water if desired, for example, by means of pebble milling in the presence of a dispersing agent which may be of the anionic, cationic or non-ionic type.

The pigments produced in accordance with this aspect of the invention may be of a shade ranging from yellow to red depending on the nature of the benzo[g]-naphth-[2,3-b] indolizine-8,13-dione-14-carboxyarylamide molecule and on the conditioning technique employed. The pigments of this invention are suitable, for example, for use in the pigmentation by known methods of paints, lacquers, printing inks, rubber, synthetic polymeric materials, paper and textile materials. In general the pigments of this invention exhibit good fastness properties especially to light, heat and solvents.

The fourth aspect of the invention is further illustrated by the following examples. Parts and percentages shown therein are expressed by weight.

EXAMPLE 73

(A) *Preparation of benzo[g]-naphth-[2,3-b] indolizine-8,13-dione-14-carboxylic acid.*—A solution of 90 parts of sodium hydroxide in 600 parts of water was added to 178 parts of 14-carbomethoxybenzo[g]-naphth-[2,3-b] indolizine-8,13-dione (melting point 243° to 245° C.) and 1600 parts of industrial methylated spirits, and the mixture was stirred and heated under reflux conditions for 36 hours. The product, in the form of its sodium salt, was filtered off, washed with 600 parts of industrial methylated spirits and converted to the free acid by stirring for 2 hours at room temperature with a mixture of 4000 parts of water and 236 parts of concentrated hydrochloric acid.

After washing free of hydrochloric acid with cold water and drying, 160 parts of benzo[g]-naphth-[2,3-b] indolizine-8,13-dione-14-carboxylic acid were obtained as a red powder melting at 269° to 270° C.

(B) *Preparation of benzo[g]-naphth-[2,3-b] indolizine-8,13-dione-14-carboxylic acid chloride.*—170 parts of benzo[g]-naphth-[2,3-b] indolizine-8,13-dione-14 carboxylic acid were suspended in a solution of 1200 parts of thionyl chloride in 3820 parts of chlorobenzene and the mixture stirred and heated under reflux conditions for 4 hours. After cooling, the solid product was filtered off, washed free of thionyl chloride with light petroleum ether (boiling point 60° to 80° C.), and dried.

In this way 140 parts of benzo[g]-naphth-[2,3-b] indolizine-8,13-dione-14-carboxylic acid chloride were obtained as an orange crystalline powder having melting point in the range 305° to 310° C.

(C) 36 parts of benzo[g]-naphth-[2,3-b] indolizine-8,13-dione-14-carboxylic acid chloride prepared as described under (B), supra, and 35 parts of 3',4',5'-trichloro-2-aminobenzanilide were reacted together in 200 parts of o-dichlorobenzene solvent under reflux conditions for 6 hours. After cooling, the solid product was filtered off, washed with a little o-dichlorobenzene, then ethanol, and dried.

In this way 50 parts of red crystals were obtained having the formula:

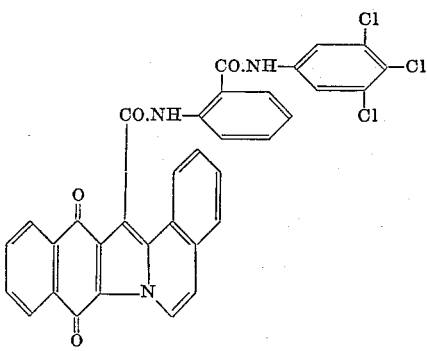

After recrystallization from 600 parts of nitrobenzene, the product was ball milled with nine times its weight of a mixture of sodium acetate and sodium sulfate. In this way the product was converted into a bright orange pigment which colored polyvinyl chloride a brilliant orange with very good fastness to light and resistance to migration. On incorporation into a stoving lacquer the product also showed very good fastness to overlacquering.

EXAMPLE 74

Using the procedure described in Example 73(C), 44 parts of 4 - bromo - 3',4',5'-trichloro-3-aminobenzanilide were substituted for 3',4',5'-trichloro-2-aminobenzanilide. The product was an orange yellow pigment possessing the same high fastness properties and having the formula:

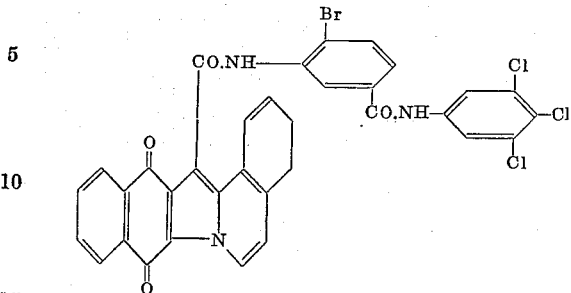

EXAMPLE 75

Using the procedure described in Example 73(C), 36 parts of 4,5',6 - trichloro - 2'-methyl-3-aminobenzanilide were substituted for 3',4',5'-trichloro-2-aminobenzanilide. The product was a yellow pigment possessing the same high fastness properties and having the formula:

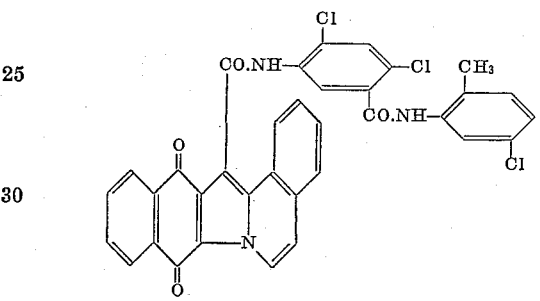

EXAMPLE 76

Using the procedure described in Example 73(C), 35 parts of 2',3,5' - trichloro-4-aminobenzanilide were substituted for 3',4',5'-trichloro-2-aminobenzanilide. The product was a reddish yellow pigment with good fastness properties and having the formula

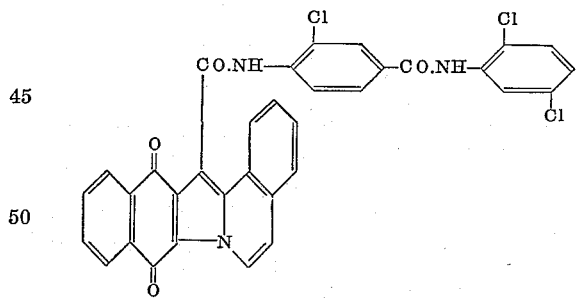

EXAMPLE 77

The procedure described in Example 73(C) is carried out using 37.4 parts of 4,6-dichloro-3'-methyl-sulfonylamino-3-aminobenzanilide instead of the 3',4',5'-trichloro-2-aminobenzanilide there used, the reaction conditions and purification procedure being otherwise the same.

The product is a red pigment with very good fastness properties, having the formula

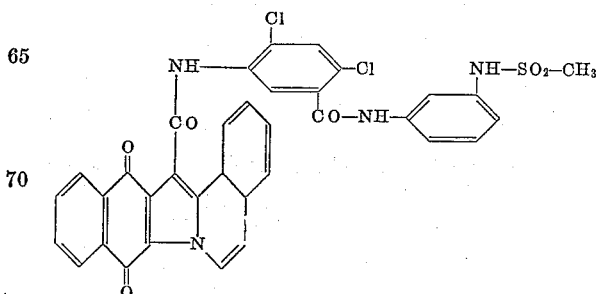

EXAMPLE 78

The procedure described in Example 77 is carried out using 39 parts of 4,6-dichloro-3'-methoxycarbonylamino-3-aminobenzanilide instead of the 4,6-dichloro-3'-methylsulfonylamino-3-aminobenzanilide there used, the reaction conditions and recovery procedure being otherwise the same. The product is an orange-yellow pigment with very good fastness properties, having the formula

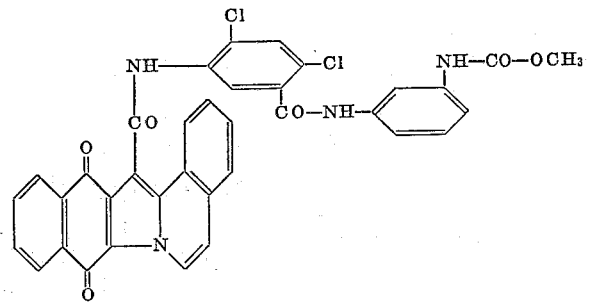

EXAMPLE 79

The procedure described in Example 77 is carried out using 38.75 parts of 4,6-dichloro-3'-methyl-4'-acetylamino-3-aminobenzanilide instead of the 4,6-dichloro-3'-methylsulfonylamino-3-aminobenzanilide there used, the reaction conditions and recovery procedure being otherwise the same.

The product is an orange-yellow pigment with very good fastness properties, having the formula

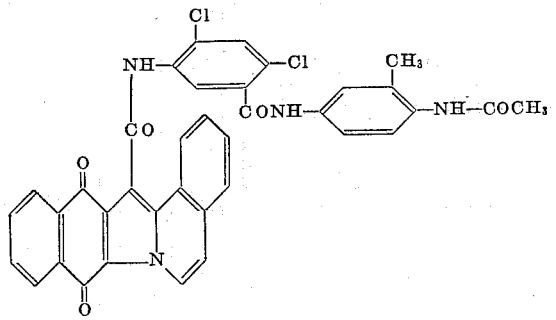

A fifth aspect of the present invention relates to heterocyclic organic coloring matters and in particular to water-insoluble new benzo[g]-naphth-[2,3-b] indolizine-8,13-dione-14-carboxyarylamide coloring matters suitable for the pigmentation of paints, lacquers, printing inks, rubber, artificial polymeric materials, paper and textile materials, and to processes of producing these substances.

According to the present invention there are provided new coloring matters that are free from substituents which confer solubility in water and are of the formula

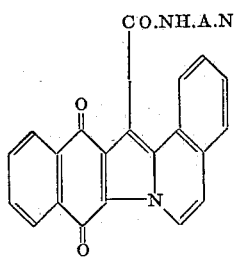

XXXII wherein A and B have the same meanings as in Formula XXVII.

The pigments falling under Formula XXXII are distinguished from those of the first, second and third aspects of this invention by an unexpected range of shade from yellow to red.

The present invention also provides a process of producing the coloring matters having the Formula XXXII, which comprises reacting a benzo [g]-naphth-[2,3-b] indolizine-8,13-dione-14-carboxylic acid halide having the formula:

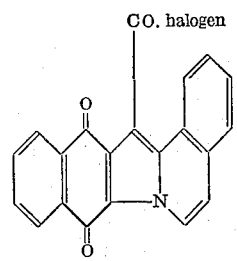

XXXIII with a substituted or unsubstituted mono-N-aroyl or mono-N (1-or 2-naphthoyl)-arylene diamine of the formula $$H_2N.A.NH.CO.B \qquad XXXIV$$

wherein A and B have the previous significance.

If the compound of Formula XXXIV used in the process is a mono-N-benzoyl-arylene diamine, the product is a benzo [g]-naphth-[2,3-b] indolizine-8,13-dione-14-carboxyarylamide having the Formula XXXII, wherein A and B have the previous significance, B representing a substituted or unsubstituted phenyl group. If the compound of Formula XXXIV used in the process is a mono-N(1-or 2-naphthoyl)-arylenediamine, the product is a compound having the formula XXXII wherein A and B have the previous significance, B representing an α- or β-naphthyl residue.

The above process of the invention may conveniently be carried out by heating the reactants together in a substantially anhydrous organic liquid essentially inert under the conditions of the reaction, for example, nitro-benzene, monochlorobenzene or o-dichlorobenzene, optionally in the presence of an acid-binding agent. The product may be conveniently isolated by filtration and washing, and may subsequently be dried, if desired.

Mono-N-aroyl or mono-N-(1-or 2-naphthoyl)-o-, -m- or p-arylene diamines for use in the above process of the invention may conveniently be obtained by condensing an appropriately substituted nitroarylamine with a suitable benzoic or α- or β-naphthoic acid halide. The reactants may be heated together in a substantially anhydrous organic liquid medium essentially inert under the conditions of the reaction, for example, nitrobenzene, monochlorobenzene or o-dichloro-benzene, followed by reduction of the condensation product, for instance under Béchamp conditions.

The present aspect of the invention also provides a second process of producing a compound of Formula XXXII, which comprises condensing a benzo[g]-naphth-[2,3-b] indolizine-8, 13-dione-14-carboxylic acid having the formula:

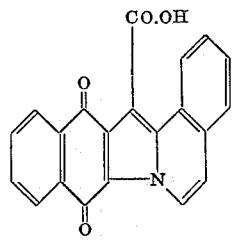

XXXV with a mono-N-aroyl or mono-N-(1- or 2-naphthoyl)-arylene diamine of the Formula XXXIV. The condensation may be carried out by a conventional method, for example, by using phosphorus trichloride as condensing agent.

Examples of mono-N-aroyl-phenylenediamines which may be used in the first and second processes of the invention include 2,2',4,5'-tetrachloro-4'-aminobenzanilide; 2',5 - dichloro - 4'-aminobenzanilide; 2',5'-dimethoxy-4'-aminobenzanilide; 2' - aminobenzanilide; and 2',3,5'-trichloro-4'-aminobenzanilide.

Examples of mono-N (1- or 2-naphthoyl)-phenylenediamines which may be used in the first and second processes of this aspect of the invention include 4'-amino-1-naphthanilide, 4'-amino-2-naphthanilide and 4'-amino-2',5'-diethoxy-1-naphthanilide.

The benzo[g]-naphth-[2,3-b] indolizine-8,13-dione-14-carboxylic acid used in the second process of this aspect of the invention may advantageously be prepared from the corresponding carboxylic acid esters by hydrolysis to the free acid. The corresponding 14-carboxylic acid halide, used in the first process of the invention, may be prepared by treating the 14-carboxylic acid with an acid halogenating agent, for instance, thionyl chloride. The carboxylic acid esters are themselves the products of the condensation of a 2,3-dihalo-1,4-naphthoquinone, an alkyl acetoacetate and isoquinoline, a reaction which is described for example, by Pratt, Rice and Luckenbaugh in the Journal of the American Chemical Society, volume 79, pages 1212 to 1217, 1957. The 2,3-dihalo-1,4-naphthoquinone is preferably 2,3-dichloro-1,4-naphthoquinone and the alkyl acetoacetate, methyl or ethyl acetoacetate. Isoquinoline may be replaced by a technical quinoline/isoquinoline mixture provided that at least one molecule of isoquinoline per molecule of the quinone is present.

The carboxylic acid esters may also be prepared by reaction of a 2,3-dihalo-1,4-naphthoquinone with an N-(carbalkoxymethyl) isoquinolinium salt as described by Jenny in Oesterreichischer Chem. Zeitung, 1963, 64, page 295, or by reaction of an alkyl acetoacetate with 2-methoxy - 1,4 - naphthoquinone-3-isoquinolinium methosulphate as described by Van Allan and Reynolds in the Journal of Organic Chemistry, 1963, 28, pages 1022 to 1025.

The present aspect of the invention also comprises a third process of producing new coloring matters hereinbefore defined, which comprises reacting an acetoacetyl-aminobenzanilide or acetoacetyl-aminonaphthanilide having the formula:

$$CH_3.CO.CH_2.CO.NH.A.NH.CO.B \quad XXXVI$$

wherein A and B have the previous significance, with a 1,4-naphthoquinone and with iso-quinoline.

The 1,4-naphthoquinone is preferably a 2,3-dihalo-1,4-naphthoquinone. The iso-quinoline may, if desired, be in the form of a mixture, containing quinoline, such as the commercially available "technical" quinoline containing approximately 25% by weight of iso-quinoline. The condensation may be effected in a solvent which is essentially inert under the conditions of the reaction, for example, nitrobenzene, Cellosolve or methyl Cellosolve; alternatively an excess of iso-quinoline may be used as the reaction solvent. The compounds of Formula XXXVI may be prepared by known methods, for example by reacting the corresponding aminobenzanilide or aminonaphthanilide with an alkyl acetoacetate or with diketene.

The present invention further provides a process of producing a pigment which comprises conditioning a benzo [g]-naphth-[2,3-b] indolizine-8,13-dione-14 - carboxyarylamide compound of Formula XXXII. A known conditioning technique may be used, for example, grinding with calcium chloride, sodium chloride or other organic or inorganic salt, with or without the addition of dimethylaniline, xylene, or other organic solvent; or heating with a high-boiling organic solvent, for instance, nitrobenzene or α-chloronaphthalene. The compounds of Formula XXXII may also be dispersed in water, if desired, for example, by means of pebble milling in the presence of a dispersing agent which may be of the anionic, cationic or non-ionic type.

The pigments produced in accordance with this invention may be of a shade ranging from yellow to red depending on the nature of the benzo[g]-naphth-[2,3-b] indolizine-8,13-dione-14-carboxyarylamide molecule and on the conditioning technique employed. The pigments of this invention are suitable, for example, for use in the pigmentation by known methods of paints, lacquers, printing inks, rubber, synthetic polymeric materials, paper and textile materials. In general, the pigments of this invention exhibit good fastness properties especially to light, heat and solvents.

This 5th aspect of the invention is further illustrated by the following examples. Parts and percentages shown therein are expressed by weight.

EXAMPLE 80

(A) *Preparation of benzo [g]-naphth-[2,3-b] indolizine-8,13-dione-14-carboxylic acid.*—A solution of 90 parts of sodium hydroxide in 600 parts of water was added to 178 parts of 14-carbomethoxybenzo [g]-naphth-[2,3-b]indolizine-8,13 (melting point 243° to 245° C.) and 1600 parts of industrial methylated spirits, and the mixture was stirred and heated under reflux conditions for 36 hours. The product, in the form of its sodium salt, was filtered off, washed with 600 parts of industrial methylated spirits and converted to the free acid by stirring for 2 hours at room temperature with a mixture of 4000 parts of water and 236 parts of concentrated hydrochloric acid.

After washing free of hydrochloric acid with cold water and drying, 160 parts of benzo [g]-naphth-[2,3-b] indolizine-8,13-dione-14-carboxylic acid were obtained as a red powder melting at 269° to 270° C.

(B) *Preparation of benzo [g]-naphth-[2,3-b] indolizine-8,13-dione-14-carboxylic acid chloride.*—170 parts of benzo [g]-naphth-[2,3-b] indolizine-8,13-dione-14-carboxylic acid were suspended in a solution of 1200 parts of thionyl chloride in 3820 parts of chlorobenzene and the mixture stirred and heated under reflux conditions for 4 hours. After cooling, the solid product was filtered off, washed free of thionyl chloride with light petroleum ether (boiling point 60° to 80° C.), and dried.

In this way 140 parts of benzo [g]-naphth-[2,3-b] indolizine-8,13-dione-14-carboxylic acid chloride were obtained as an orange crystalline powder having melting point in the range 305° to 310° C.

(C) 36 parts of benzo (g)naphth-[2,3-b]indolizine-8,13-dione-14-carboxylic acid chloride prepared as described in B, supra, and 35 parts of 2,2',5'-trichloro-4'-aminobenzanilide were heated together under reflux conditions in 200 parts of o-dichlorobenzene for 6 hours. After cooling, the solid product was filtered off, washed with a little o-dichlorobenzene, then ethanol, and dried. After recrystallization from 600 parts of nitrobenzene, 50 parts of product were obtained which was ball milled with nine times its weight of a mixture of sodium acetate and sodium sulphate, forming a bright reddish yellow pigment. The pigment colors stoving lacquer, printing ink and polyvinyl chloride bright reddish yellow shades with very good fastness properties. The pigment has the structure:

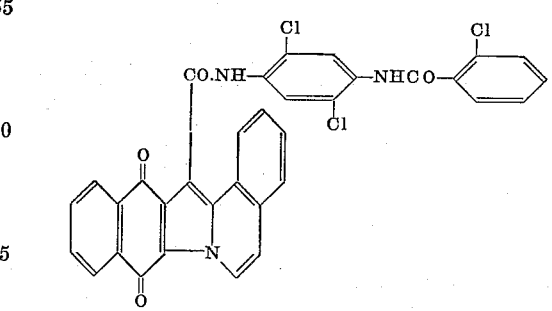

EXAMPLE 81

Using the procedure described in Example 80C, 39 parts of 2,4,4',5-tetrachloro - 3' - aminobenzanilide were substituted for 2,2',5'-trichloro-4'-aminobenzanilide. In this way, 45 parts of a yellow pigment were obtained having similar high fastness properties. The pigment has the structure:

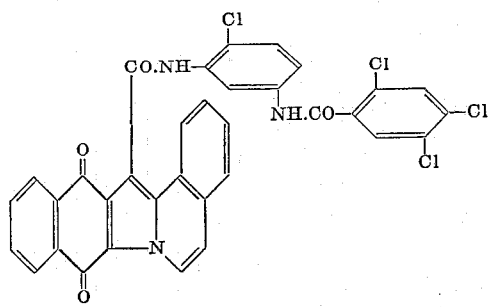

EXAMPLE 82

Using the procedure described in Example 80C, 34 parts of 2',5'-dichloro-2-methoxy-4'-aminobenzanilide were substituted for 2,2',5'-trichloro-4'-aminobenzanilide. In this way, 45 parts of an orange yellow pigment were obtained having similar fastness properties. The pigment has the structure:

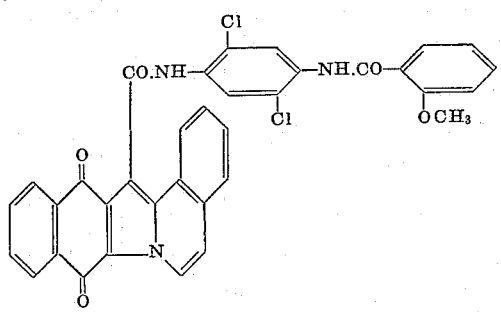

EXAMPLE 83

Using the procedure described in Example 80C, 29 parts of 2'-chloro-3-methyl-4'-aminobenzanilide were substituted for 2,2',5'-trichloro-4'-aminobenzanilide. In this way, 46 parts of an orange red pigment were obtained possessing high fastness properties and having the structure:

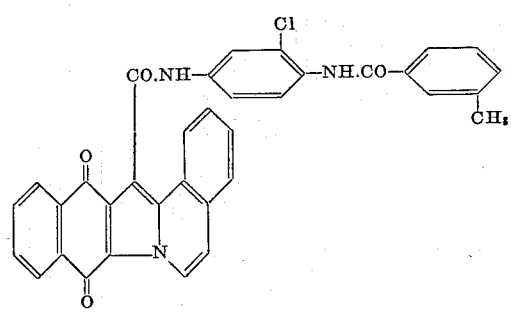

EXAMPLE 84

Using the procedure described in Example 80C, 38.5 parts of 2',3,4,5'-tetrachloro-4'-aminobenzanilide were substituted for 2,2',5'-trichloro-4'-aminobenzanilide. In this way 55 parts of a yellow pigment were obtained having the same fastness properties. The pigment has the structure:

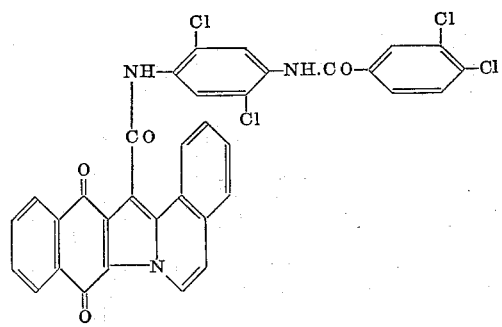

EXAMPLE 85

(a) Using the procedure described in Example 80C, 28.6 parts of 4-chloro-6'-methyl-3'-aminobenzanilide were substituted for 2,2,5'-trichloro-4'-aminobenzanilide. In this way 39 parts of a yellow pigment were obtained having similar very high fastness properties. This pigment has the structure:

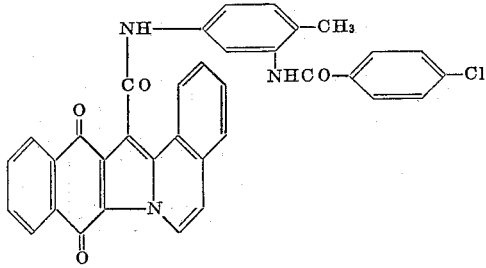

(b) In an analogous manner there is obtained from the corresponding aminobenzanilide the pigment having the formula

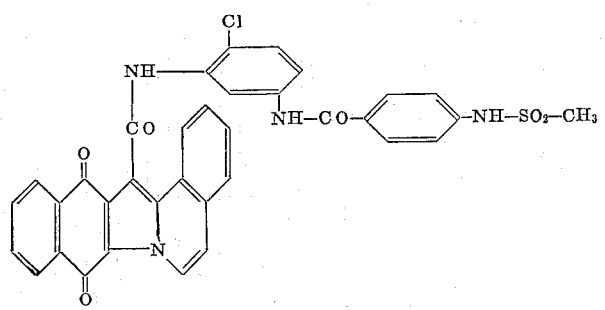

EXAMPLE 86

The procedure described in Example 80 C is carried out using 37.9 parts of 2',5'-dichloro-4-acetylamino-4'-aminobenzanilide instead of the 2,2',5'-trichloro-4'-aminobenzanilide there used, the reaction conditions and recovery procedure being otherwise the same.

In this way, 50 parts of an orange pigment having excellent fastness properties were obtained. This pigment has the structure

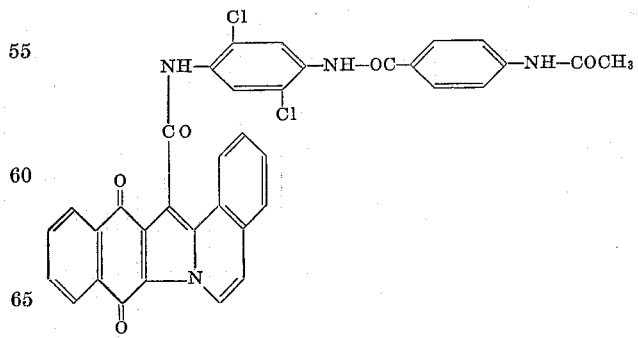

EXAMPLE 87

The procedure described in Example 85 is carried out using 33.4 parts of 4'-chloro-4-ethoxycarbonylamino-3'-aminobenzanilide instead of the 2',5'-dichloro-4-acetylamino-4'-aminobenzanilide there used, the reaction conditions and recovery procedure being otherwise the same.

The product is an orange-yellow pigments with very good fastness properties, having the formula

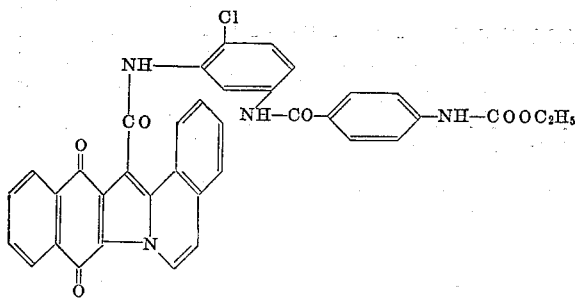

A sixth aspect of the present invention relates to new water-insoluble benzonapthindolizine-dione-carboxyarylamide coloring substances suitable for the pigmentation of paints, lacquers, printing inks, rubber, synthetic polymeric materials, paper and textile materials, and to processes of producing these substances, which latter are benzonaphthindolizine-dione - carboxarylamides falling under the formula

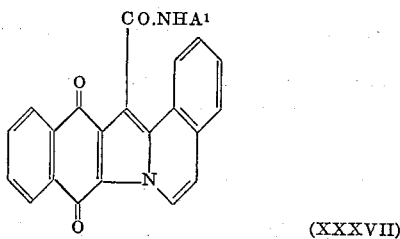

(XXXVII)

wherein $A^1$ is a phenyl group, unsubstituted or substituted by one or more of the following: an alkyl group containing from one to five carbon atoms; a halogen atom; a carbamyl group; an alkaryl group; an alkoxy group, cyano group, alkanoylamino group, or an alkoxyaryl group. The compounds of the invention may be described as benzo-[g]-naphth-[2,3-b]indolizine - 8,13 - dione-14-carboxyarylamides, and are numbered in accordance with the recommendations of the International Union of Pure & Applied Chemistry (1957).

The present invention also relates to a process of producing the compounds of the above formula, which comprises reacting a benzo[g-]naphth[2,3-b]indolizine-8,13-dione-14-carboxylic acid halide having the formula

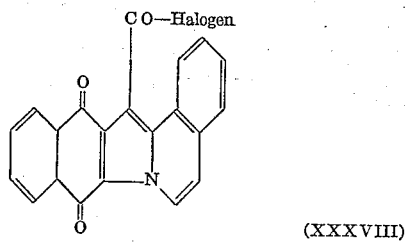

(XXXVIII)

with an arylamine having the formula $H_2N-A^1$, wherein $A^1$ has the same significance as in Formula XXXVII.

The process of this aspect of the invention is preferably carried out by heating the reactants together in a substantially anhydrous organic liquid medium inert under the conditions of the reaction of such process step, such as, for example, nitrobenzene, monochlorobenzene or o-dichloro-benzene, optionally in the presence of an acid-binding agent such as pyridine or anhydrous sodium acetate, isolating the coloring substance by filtration and washing and, if desired, drying the product.

Arylamines which may be used in the process of the invention are, for example: m- and p-bromoaniline; 2,5-dibromoaniline; 2,3-dichloroaniline; 2,4-dichloroaniline; 2,5-dichloroaniline; 3,4-dichloroaniline; 2,4,5-trichloroaniline; 3,4,5-trichloroaniline; 3-chloro-4-acetylamino-aniline; 3-methyl-4-acetylamino-aniline; 3-chloro-4-cyano-aniline and many others.

The benzonaphthindolizinedione carboxylic acid halides used in the process of the invention may be prepared, for example, from the corresponding carboxylic acid alkyl esters by hydrolysis to the free acid, followed by treatment with an acid halogenating agent such as thionyl chloride. Preferably the hydrolysis is carried out in the presence of a solvent, for example methyl cellosolve or ethanol.

This aspect of the present invention also relates to a second process of producing the new coloring substances hereinbefore defined, which comprises reacting an aceto-acetanilide having the formula

$A^1-NH.CO.CH_2CO.CH_3$     (XXXIX)

wherein $A^1$ has the same meaning as in Formula XXXVII, with a 1:4-naphthoquinone and with iso-quinoline.

The 1,4-naphthoquinone compound is preferably 2,3-dichloro-1,4-naphthoquinone or other 2,3-dihalo-1,4-naphthoquinone. The isoquinoline, may, if desired, be in the form of a mixture containing quinoline, such as the commercially available "technical" quinoline containing approximately 25% by weight of isoquinoline.

The condensation may be effected in an organic solvent which is substantially inert under the conditions of the reaction, such as ethanol, Cellosolve or methyl Cellosolve; alternatively, the reaction solvent may be an excess over the stoichiometric equivalent of the isoquinoline used as reactant. The acetoacetanilides of Formula XXXIX may be prepared by known methods, for example by reacting the corresponding arylamine with an alkyl acetoacetate or with diketene.

This aspect also provides a third process of producing a compound of Formula XXXVII, which comprises condensing benzo-[g]-naphth-[2,3-b-]indolizine-8,13 - dione-14-carboxylic acid with an arylamine of the formula $H_2N-A^1$, supra. The condensation may be carried out by a conventional method, for example by using phosphorus trichloride as a condensing agent.

The present invention further provides a process of producing a pigment which comprises conditioning a benzo-[g]-naphth-[2,3-b-]indolizine-8,13-dione-14 - carboxyarylamide compound of Formula XXXVII. A known conditioning technique may be used, for example grinding with calcium chloride, sodium chloride, acetate, or other organic or inorganic salt, with or without the addition of dimethylaniline, xylene or other organic solvent, or heating with a high-boiling organic solvent, for instance, nitrobenzene or α-chloronaphthalene. The compounds of Formula XXXVII may also be dispersed in water if desired, for example, by means of pebble-milling in the presence of a dispersing agent which may be of the anionic, cationic or nonionic type.

The pigments produced in accordance with this invention may be of a shade ranging from yellow to red depending on the nature of the benzo-[g]-naphth-[2,3-b-]indolizine-8,13-dione-14-carboxarylamide molecule and on the conditioning technique employed. The pigments of this invention are suitable, for example, for use in the pigmentation by known methods of paints, lacquers, printing inks, rubber, synthetic polymeric materials, paper and textile materials. In general, the pigments of this invention exhibit good fastness properties especially to light, heat and solvents.

On account of their particularly good fastness properties, those of the pigment compounds falling under Formula XXXVII are preferred in which $A^1$ represents one of the following substituted phenyl radicals:

(a) Halogen-substituted p-lower alkanoylamino-phenyl, wherein the halogen is chlorine or bromine, (b) Methyl-substituted p-lower alkanoylamino-phenyl, (c) Methoxy - substituted p - lower alkanoylamino-phenyl, (d) Cyano-phenyl, (e) Halogen-substituted cyano-phenyl, (f) Phenyl substituted with at least two halogen atoms selected from the group consisting of chlorine and bromine atoms, at least one position ortho to the free linkage in the phenyl radical being unsubstituted and the total number of bromine atoms preferably ranging from 0 to not more than 3.

Optimal pigments with regard to all-round satisfactory properties among those of (a) to (c) inclusive, supra, are those in which A¹ represents one of the following substituted phenyl radicals:

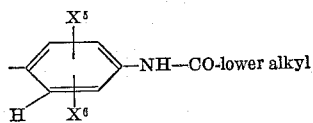

wherein $X^5$ represents from one to two chlorine, bromine, methyl or methoxy substituents, and $X^6$ represents a hydrogen, chlorine or bromine atom.

This aspect of the invention is further illustrated by the following examples, wherein the parts shown are parts by weight.

EXAMPLE 88

To 180.5 parts of the ethyl ester of benzo-[g]-naphth-[2,3-b-]indolizine-8,13-dione-14-carboxylic acid, dissolved in 2420 parts of methyl Cellosolve, were added 40 parts of sodium hydroxide dissolved in 1160 parts of methyl Cellosolve, and the mixture was refluxed with stirring for 75 minutes.

The precipitated sodium salt of the benzonaphthindolizine-dione-carboxylic acid was filtered off while hot and extracted with boiling methyl Cellosolve in order to remove the methyl Cellosolve ester of the benzonaphthindolizine-dione-carboxylic acid which is formed as a byproduct and which hydrolyzes more slowly than the corresponding ethyl ester. The resulting sodium salt, after being washed with ethanol, was stirred with 4000 parts of 30% acetic acid at room temperature for 3 hours. The solid was then filtered off, washed with 3000 parts of water and dried, yielding 126.3 parts of free benzo-[g-]naphth-[2,3-b-]indolizine-8,13-dione-14-carboxylic acid as a red-brown powder having melting point 270° C. (with decomposition) and the formula

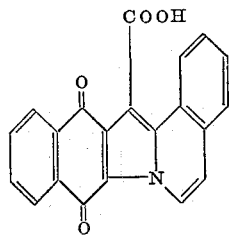

To 10.23 parts of this acid in 250 parts of chlorobenzene were added 68.7 parts of freshly distilled thionyl chloride and the mixture was heated to boiling point over 1 hour. After refluxing with stirring for 135 minutes, the solution was cooled, and the acid chloride which crystallized, was filtered off and washed with petroleum ether.

8.63 parts of benzo-[g-]naphth-[2,3b-]indolizine-8,13-dione-14-carboxylic acid chloride were thus obtained, having melting point 303° to 305° C. (with decomposition) being of the formula

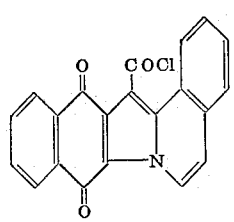

To a solution of 14.36 parts of the acid chloride prepared in the above manner in 785 parts of o-dichlorobenzene was added a solution of 5.00 parts of p-chloroaniline in 26 parts of o-dichlorobenzene and the mixture was refluxed with stirring for 6 hours, by which time evolution of hydrogen chloride was complete.

After cooling, the 16.29 parts of the benzo-[g-]naphth-[2,3-b-]indolizine - 8,13 - dione - 14 - carboxyarylamide produced was filtered off and washed with benzene. By crystallization from 720 parts of nitrobenzene, the compound could be obtained as orange-red felted needle-shaped crystals having melting point above 300° C. The product is a pigment of the formula

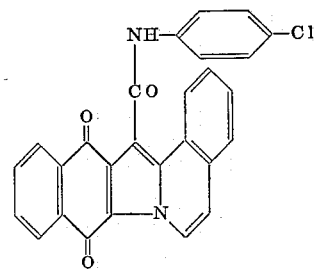

This pigment is surprisingly fast to light, while the o-chloroderivative is not suitable as a pigment, in particular in stoving lacquers for painting automobiles on account of its lack of light fastness.

EXAMPLE 89

The procedure described in Example 88, is carried out, except that the benzo-[g-]naphth-[2,3-b-]indolizine-8,13-dione-14-carboxylic acid was produced by hydrolysis of the methyl ester, which was prepared by the method described by Pratt, Rice & Luckenbaugh in the Journal of the American Chemical Society, volume 79 (1957) at pages 1212 to 1217. A mixture of 345 parts of the methyl ester, 2720 parts of ethanol and 575 parts of 5 N-sodium hydroxide solution was refluxed with stirring for 24 hours.

The precipitated sodium salt was filtered off and washed free of any unhydrolyzed ester with warm chloroform. By stirring in 8000 parts of 30% acetic acid, 284 parts of the free carboxylic acid were produced, having melting point 270° C. The yield was 86% theoretical.

EXAMPLE 90

The procedure described in Example 88 is carried out using m-chloroaniline instead of the p-chloroaniline.

The benzonaphthindolizinedione-14-carboxyarylamide obtained was in the form of red, needle-shaped crystals having melting point above 300° C. and having the formula

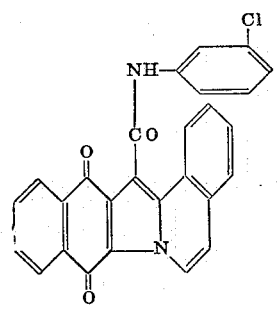

The yield was 94% theoretical. This compound is a red pigment of good fastness to cross lacquering, good light fastness, and very good solvent resistance.

EXAMPLE 91

The procedure described in Example 88 is carried out using 3,4-dichloroaniline instead of the p-chloroaniline.

The benzonaphthindolizinedione - 14 - carboxyarylamide obtained was in the form of orange, needle-shaped crystals having melting point above 300° C. and having the formula

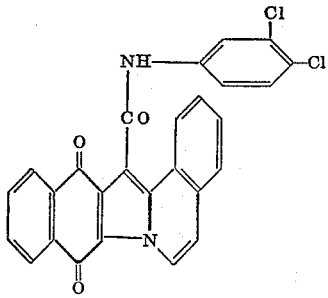

The yield was theoretical.

This orange pigment is fast to light, overlacquering and migration.

EXAMPLE 92

The procedure described in Example 88 is carried out using 2,5-dichloroaniline instead of the p-chloroaniline.

The benzonaphthindolizinedione-14-carboxyarylamide obtained was in the form of yellow, needle-shaped crystals having melting point above 300° C. and having the formula

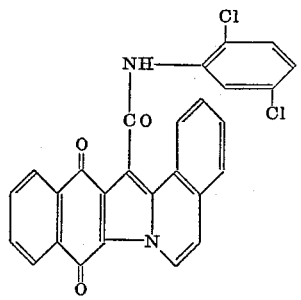

The yield was 94% theoretical.

This yellow pigment is distinguished by its light fastness.

EXAMPLE 93

The procedure described in Example 88, is carried out using 2,4,5-trichloroaniline instead of the p-chloroaniline.

The benzonaphthindolizinedione-14-carboxyarylamide obtained was in the form of orange, needle-shaped crystals having melting point above 300° C. and having the formula

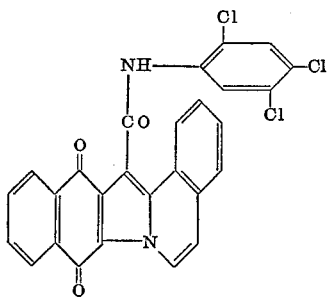

The yield was 73% theoretical.

This orange pigment is fast to light, cross lacquering and migration. In contrast thereto the corresponding 2,4,6-trichloro analogue lacks these fastnesses so that it is not suitable, e.g. as a pigment in stoving lacquers for automobile paints.

EXAMPLE 94

The procedure described in Example 88 is carried out using 3,4,5-trichloraniline instead of the p-chloroaniline.

The benzonaphthindolizinedione-14-carboxyarylamide obtained was in the form of orange-red, needle-shaped crystals having melting point above 300° C. and having the formula

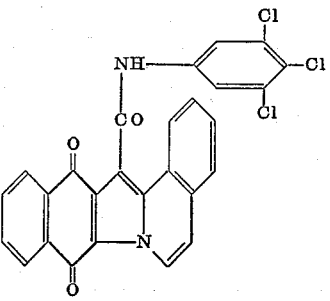

The yield was 91% theoretical.

This orange-red pigment is of similar good fastness properties as the pigment of Example 93 and even better solvent resistance.

EXAMPLE 95

The procedure described in Example 88 is carried out using 3-chloro-4-acetylamino-aniline instead of the p-chloroaniline.

The benzonaphthindolizinedione-14-carboxyarylamide obtained was in the form of orange-yellow, needle-shaped crystals having melting point above 300° C. and having the formula

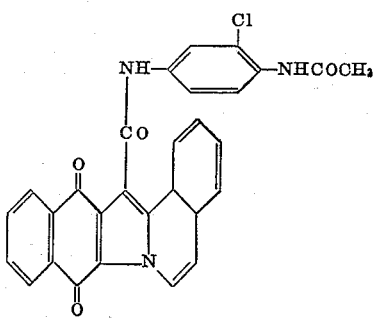

This orange yellow pigment is of very good light fastness and fastness to migration while unchlorinated acetyl-aminophenyl-derivative fails in these fastnesses and is therefore, not suitable as a pigment for commercial purposes especially as automobile paint.

The same compound is also obtained by the following procedure:

199.5 parts of 2,3-dichloro-1,4-naphthoquinone (at 95% purity), 47.5 parts of "technical quinoline" (containing 25% isoquinoline) and 134.3 parts of 3-chloro-4-acetylaminoacetanilide were stirred together and heated slowly to about 60° C. At this temperature the reaction became vigorous and the temperature rose rapidly to about 150° C. 1100 parts of nitrobenzene were then added and the mixture boiled for 5 minutes.

The product was isolated by filtration of the cooled mixture and washing the residue. If desired the pigment could be further purified by crystallisation from, for example, nitrobenzene.

In this way were obtained 132 parts of a bright orange-yellow pigment identical with that obtained in Example 95.

EXAMPLE 96

The procedure described in Example 88, is carried out using 3 - methyl - 4 - acetylamino - aniline instead of the p-chloroaniline.

The benzonaphthindolizinedione - 14 - carboxyaryl-amide produced was in the form of orange-yellow, needle-shaped crystals having melting point above 300° C. and having the formula

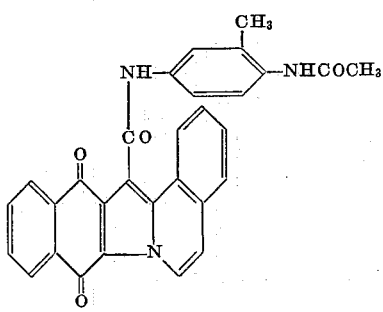

The yield was 99% theoretical.

This orange-yellow pigment shows good fastness to light, migration and cross-lacquering.

The same compound is also obtained by the following procedure:

51.1 parts of benzonaphthindolizine-dione - 14 - carboxylic acid, 24.5 parts of 3-methyl-4-acetylamino-aniline and 20.9 parts of phosphorus trichloride were refluxed for 16 hours in 3900 parts of dry toluene.

After cooling the mixture 63 parts of a reddish yellow product were isolated by filtration and washing. This was found to be identical with the product of Example 96, the yield being 86%.

In a similar manner as in Example 88, there are obtained by using the correspondingly substituted aniline in lieu of p-chloroaniline the following pigments wherein radical $A^1$ is that given in column 2 and which pigments have the shades given in column 3 and the outstanding fastness properties in stoving lacquers given in column 4 of the following table:

EXAMPLE 103

The procedure described in Example 88 was carried out using 3-methoxy-4-acetylamino aniline instead of the p-chloroaniline.

The benbonaphthindolizine - dione - 14 - carboxyarylamide obtained was in the form of orange-yellow, needle-shaped crystals having a melting point above 300° C. and having the formula:

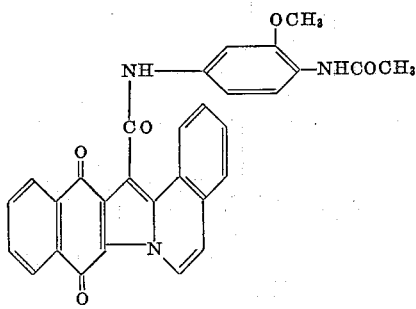

The yield was 83.5% theoretical.

The pigment thus prepared had a golden yellow shade when incorporated into polyvinyl chloride, and showed excellent lightfastness, migration resistance and heat stability. The pigment also showed excellent lightfastness in printing inks and excellent fastness in solvents.

EXAMPLE 104

The procedure described in Example 88 was carried out using 3,5-dichloro-4-cyanoaniline instead of p-chloroaniline.

The benzonaphthindolizine-dione-14-carboxyarylamide obtained was in the form of orange, needle-shaped crystals

| Ex. | $A^1$ | Shade | Fastness properties |
|---|---|---|---|
| 97 | phenyl with Cl, Cl | Orange | Light, cross-lacquering. |
| 98 | phenyl with Cl, Cl | do | Light. |
| 99 | phenyl with Cl, Cl | Orange to scarlet. | Light, cross-lacquering, migration, organic solvents. |
| 100 | phenyl with Cl, NH—CO—CH₃ | Orange | Overlacquering migration light. |
| 101 | phenyl with CONH₂, Cl | do | Light. |
| 102 | phenyl with CONH₂, Cl, Cl | Yellow | Solvents. | having a melting point above 300° C. and having the formula:

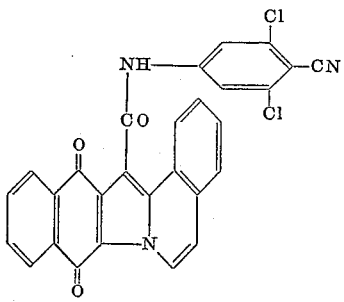

The yield was 71% of theory.

The pigment thus prepared had an orange shade when incorporated into a stoving lacquer and showed excellent lightfastness, overlacquering fastness and heat stability. The pigment also showed excellent lightfastness in printing ink and excellent fastness to solvents. The pigment had an orange shade when incorporated into polyvinyl chloride and showed excellent lightfastness, heat stability and very good migration resistance.

EXAMPLE 105

Using the procedure described in Example 88, 3,5-dibromoaniline was substituted for the p-chloraniline there used.

The benzonaphthindolizine-dione-14-carboxyarylamide obtained was in the form of orange-red, needle-shaped crystals having a melting point above 300° C. and having the formula:

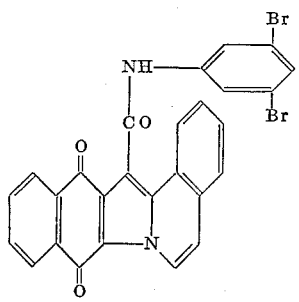

The yield was 71.5% theoretical.

The pigment thus prepared had an orange-red shade when incorporated into a stoving lacquer and showed excellent lightfastness, overlacquering fastness and heat stability. The pigment also showed excellent lightfastness in printing ink and very good fastness to solvents.

EXAMPLE 106

Using the procedure described in Example 88, 3,4-dibromo-5-chloraniline was substituted for the p-chloraniline there used.

The benzonaphthindolizine-dione-14-carboxyarylamide obtained was in the form of orange-red, needle-shaped crystals having a melting point above 300° C. and having the formula:

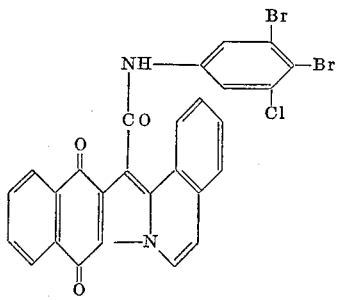

The yield was 80% theoretical.

The pigment thus prepared had an orange shade when incorporated into a stoving lacquer and showed excellent lightfastness, overlacquering fastness and heat stability. The pigment also showed excellent lightfastness in printing ink.

EXAMPLE 107

The procedure described in Example 88 was carried out using 3,5-dichloro-4-bromoaniline in place of the p-chloraniline.

The benzonaphthindolizine-dione-14-carboxyarylamide obtained was in the form of orange-red, needle-shaped crystals having a melting point above 300° C. and having the formula:

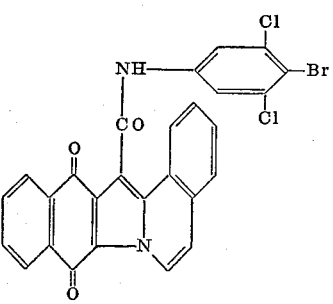

The yield was 73.5% theoretical.

The pigment thus produced showed excellent lightfastness in printing ink and very good fastness to solvents.

EXAMPLE 108

The procedure described in Example 88 was carried out using 3-bromo-4-acetylamino instead of the p-chloraniline.

The benzonaphthindolizine-dione-14-carboxyarylamide obtained was in the form of orange-yellow, needle-shaped crystals having a melting point above 300° C. and having the formula:

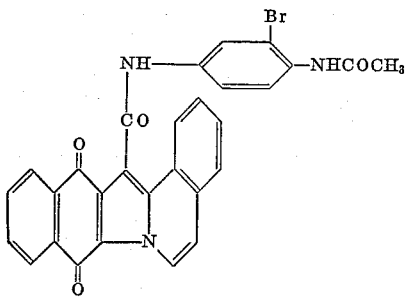

The yield was 68% theoretical.

The pigment thus produced had a reddish-yellow shade when incorporated into polyvinyl chloride and showed excellent lightfastness, migration resistance and heat resistance. The pigment had an orange-yellow shade when incorporated into a stoving lacquer and showed excellent lightfastness, overlacquering fastness and heat stability. The pigment also showed excellent lightfastness in printing ink and very good or excellent solvent fastness.

EXAMPLE 109

Using the procedure described in Example 88, 3-chloro-4-acetylamino-5-bromoaniline was substituted for the p-chloraniline there used.

The benzonaphthindolizine-dione-14-carboxyarylamide obtained was in the form of orange, needle-shaped crystals having a melting point above 300° C. and having the formula:

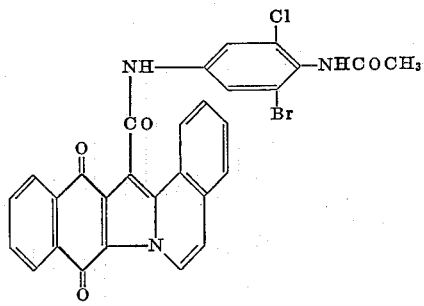

The yield was 77% theoretical.

The pigment thus produced had an orange shade when incorporated into a stoving lacquer and showed excellent lightfastness, overlacquering fastness and heat stability. The pigment also showed excellent lightfastness in printing ink and excellent solvent fastness.

EXAMPLE 110

Using the procedure described in Example 88, 2,5-dichloro-4-acetylamino aniline was substituted for the p-chloraniline there used.

The benzonaphthindolizine - dione - 14 - carboxyarylamide obtained was in the form of yellow, needle-shaped crystals having a melting point above 300° C. and having the formula:

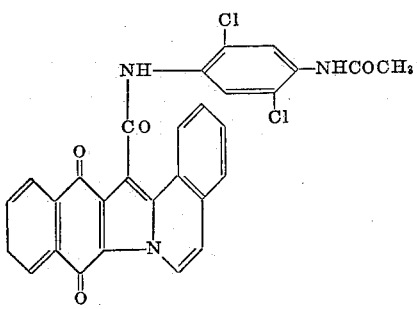

The yield was 67% theoretical.

The pigment thus produced had a yellow shade when incorporated into polyvinyl chloride and showed excellent lightfastness, migration resistance and heat stability. The pigment also showed excellent light fastness in printing ink and very good to excellent solvent fastness.

According to a seventh aspect, this invention relates to 14 - substituted - amino - benzo - [g] - naphth[2,3-b-] indolizine-8,13 - diones and process for obtaining them from the corresponding unsubstituted 14-amino compounds.

The process, according to this aspect of the invention of producing 14 - substituted - amino - benzo - [g]-naphth- [2,3-b-]indolizine-8,13-diones of the formula

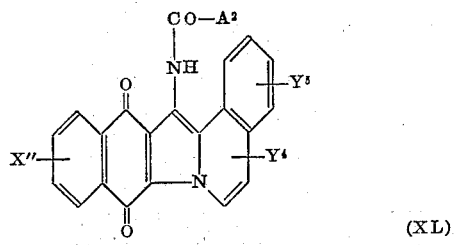

wherein $A^2$, $X''$, $Y^4$ and $Y^5$ have the meanings given hereinafter, comprises reacting the corresponding 14- amino-benzo - [g] - naphth - [2,3-b-]indolizine - 8,13- dione of the formula

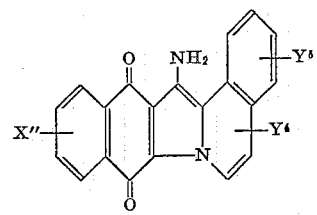

wherein $X''$, $Y^4$ and $Y^5$ are the same or different and each represents one or more hydrogen or halogen atoms or one or more lower alkyl or lower alkoxy groups, with an aliphatic or aromatic monocarboxylic acid halide having the formula

wherein A is an aliphatic or aromatic hydrocarbon residue unsubstituted or substituted with one or more halogen atoms or one or more lower alkyl, lower alkoxy, trifluoromethyl, cyano, lower alkanoyl, aroyl, aryloxy, halogen-substituted aryloxy, nitro, lower alkanoylamino, lower alkyl-substituted carbamyl, lower alkyl-substituted sulfamyl, or lower alkyl sulfonyl or aryl sulfonyl groups, or an aroylamino or arylcarbamyl group unsubstituted or substituted by one or more halogen atoms or one or more lower alkyl, lower alkoxy, trifluoromethyl, cyano, lower alkanoyl, aroyl, nitro, lower alkyl-substituted carbamyl, lower-substituted sulfamyl, or lower alkyl or aryl sulfone or lower alkanoylamino groups, or an acid anhydride or other derivative thereof capable of reacting with the 14-amino compound of Formula XLI to produce the desired 14-substituted-amino compound of Formula XL.

The 14-amino-substituted amino-compounds of Formula XLI are produced by heating the corresponding 14 - nitro-substituted-benzo-naphthindolizinediones with a relatively moderate reducing agent, namely acid stannous chloride; hydrogen in statu nascendi produced from iron powder under Béchamp conditions from zinc and glacial acetic acid, from zinc and dilute aqueous sodium hydroxide or from a zinc dust/ethanol mixture; alkaline ferrous hydroxide; alkaline glucose; aqueous sodium hydrosulfite; aqueous sodium or potassium sulfide or ammonium sulfide.

Preferably, a mild reducing agent is used, on account of the tendency shown by the resulting amino-substituted-benzo-naphthindolizinedione to deaminate to the corresponding benzo-naphthindolizinedione when the conditions of reduction prove to be too drastic. Depending upon the reducing agent selected, the time of heating may vary from a few minutes to approximately 12 hours.

When reduction has taken place, the desired 12-amino-benzo-naphthindolizinedione is isolated from the reaction product, preferably by filtration and washing and it is then purified by recrystallization from a suitable inert solvent, such as o-dichlorobenzene, monochlorobenzene or nitrobenzene.

The 12-nitro-benzo-naphthindolizinediones used as starting material for the reduction step are obtained by stirring a recrystallized benzo-naphthindolizinedione of the formula

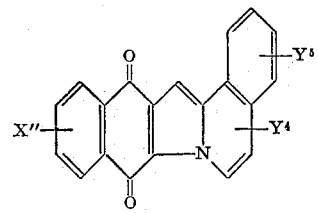

wherein $X''$, $Y^4$ and $Y^5$ have the aforesaid meanings, at a temperature of above 0°, preferably in the cold (10° to 15° C.) with concentrated nitric acid, and separating the product, for example, by filtration. Alternatively, this product can be prepared from the corresponding acetyl-substituted - benzo - naphthindolizinedione under similar conditions, in which case the acetyl group is displaced by the nitro group.

A preferred starting material of Formula XLI is 14-amino-benzonaphthindolizinedione, but other starting materials include, for instance its halogen-substituted analogues having X" representing one or more chlorine or bromine atoms.

The aliphatic or aromatic monocarboxylic acid halides of the Formula XLII, with which the unsubstituted 14-amino-benzo-naphthindolizinedione is reacted, may be any of a wide range of acids in which the hydrocarbon residue $A^2$ is as hereinbefore defined. If the hydrocarbon residue is aliphatic this may be a straight- or branched-chain alkyl group, for example methyl, ethyl, isopropyl or n-propyl. If the hydrocarbon chain is aromatic, this may be a phenyl, α-naphthyl or β-naphthyl group.

Where the aromatic hydrocarbon residue $A^2$, or an aroylamino or arylcarbamyl substituent in the residue $A^2$ is substituted by halogen, the halogen is preferably chlorine or bromine; if the substitutent is lower alkyl, it may be ethyl, n-propyl or n-butyl but is preferably methyl; and if the substitutent is lower alkoxy, it may be methoxy, ethoxy, n-propoxy or isopropoxy. Where the aromatic hydrocarbon residue $A^2$, or an aroylamino or arylcarbamyl substitutent in the residue $A^2$, is substituted by lower alkanoylamino, the substitutent is preferably acetylamino or propionylamino; if the substituent is aroyl, aryloxy, halogen-substituted aryloxy, lower alkyl-substituted carbamyl, lower alkyl-substituted sulfamyl, lower alkyl sulfonyl or aryl sulfonyl, it is preferably benzoyl, phenoxy, chloro- or bromo-substituted phenoxy, N,N-diethyl carbamyl, N,N-diethyl sulfamyl, methyl sulfonyl or phenyl sulfonyl, respectively.

Instead of using an aliphatic or aromatic monocarboxylic acid halide, the corresponding free carboxylic acid or other acid halide, the corresponding acid anhydride or mixed anhydride, or other derivative of the monocarboxylic acid may be used which is capable of reacting with the 14-amino compound of Formula XLI to produce the desired product.

The nomenclature benzo-[g]-naphth-[2,3-b-]indolizine is preferred for the ring system, common to the products produced by the process of the invention, to the alternative benz-[5,6]-indolo-[2,1-a-]isoquinoline given in the first supplement to Patterson's "Ring Index" (page 222, No. 9287) for reasons of euphony and to show clearly the relationship to the derivatives of naphth-[2,3-b-]indolizine which may be of chemically similar structure. The numbering is as recommended by Patterson.

The process of this aspect of the invention may be carried out, for example, by mixing the reactants together in a solvent substantially inert under the conditions of the reaction, for instance, o-dichloro-benzene, and heating the reaction mixture at a temperature in the range of from 50° C. to the boiling point of the mixture under reflux, either in the presence or absence of a conventional acid binding agent, such as sodium acetate.

The reaction may be effected by heating the acid reactant of Formula XLII, or its equivalent derivative, with substantially stoichiometric proportions of the 14-amino-benzonaphthindolizinedione of Formula XLI.

By carrying out the process of this aspect of the invention, substituted 14-substituted amino-benzo-[g]-naphth-[2,3-b-]indolizine-8,13-dione compounds are produced which are valuable pigments, suitable for instance, optionally after conditioning, for the pigmentation of paints, lacquers, printing inks, rubber, synthetic polymeric materials, paper and textile materials. The conditioning may be conducted in a conventional manner, for instance by grinding with calcium chloride, sodium acetate or other organic or inorganic salt, with or without the addition of dimethyl-aniline, xylene or other organic solvent; or by heating with a high-boiling organic solvent, for instance nitrobenzene or α-chloronaphthalene. The products of the process of this aspect of the invention may also be dispersed in water, if desired, for example by means of pebble milling in the presence of a dispersing agent, which may be of the anionic, cationic or non-ionic type.

Preferred pigments on account of their particularly good fastness properties falling under this aspect of the invention are those of the formula

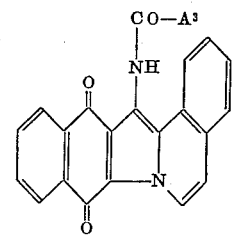

XLIV wherein $A^3$ is a member selected from the group consisting of lower alkyl, phenyl, lower alkylphenyl, chlorophenyl, lower alkoxyphenyl, nitrophenyl, chlorobenzoylamino or chlorophenylaminocarbonyl.

This aspect of the invention is further illustrated by the following examples. Parts and percentages shown therein are expressed by weight.

EXAMPLE 111

To a solution of 31.2 parts of 14-aminobenzonaphthindolizinedione in 309 parts of o-dichlorobenzene are added 19.3 parts of o-chlorobenzoyl-chloride and the mixture refluxed with stirring for 1 hour.

After cooling, the 43 parts of 14(o-chlorobenzoylamino)benzonaphthindolizinedione produced are filtered off and washed with o-dichlorobenzene and acetone. By crystallization from 3090 parts of o-dichlorobenzene the compound is obtained as bronze-red needles having a melting point above 300° C. The product has the formula

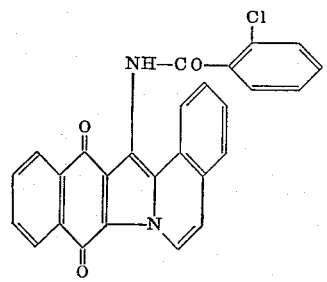

The yield is 95.3%.

The product is ball milled with nine times its weight of a mixture of sodium acetate and sodium sulfate. In this way it is converted into a bright red pigment which colors polyvinyl chloride a bright red with very good resistance to migration. On incorporation into a stoving lacquer, the product also shows very good fastness to light and to overlacquering.

EXAMPLES 111A–119

In the same manner to that described in Example 111, by substituting an equivalent quantity of the corresponding acid chloride for the o-chlorobenzoyl chloride are obtained the following pigments possessing the same high fastness properties.

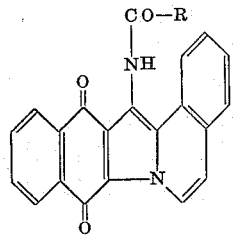

| Example No. | Acid Chloride | R | Color of Pigment | Yield, Percent |
|---|---|---|---|---|
| 111A | m-Chlorobenzoyl chloride | (3-Cl-C6H4) | Red | 85 |
| 112 | p-Chlorobenzoyl chloride | (4-Cl-C6H4) | Red | 85 |
| 113 | 2,4-dichlorobenzoyl chloride | (2,4-Cl2-C6H3) | Orange/Red | 65 |
| 114 | 3,4-dichlorobenzoyl chloride | (3,4-Cl2-C6H3) | Red | 81 |
| 115 | 3,5-dinitrobenzoyl chloride | (3,5-(NO2)2-C6H3) | Orange | 76 |
| 116 | o-Toluyl chloride | (2-CH3-C6H4) | Red | 86 |
| 117 | p-Methoxybenzoyl chloride | (4-OCH3-C6H4) | Red | 76 |
| 118 | Acetyl chloride | —CH3 | Red | 94 |
| 119 | Benzoyl chloride | (C6H5) | Red | 85 |

EXAMPLE 120

The acid chloride obtained by reacting 90 parts of 3,4,4'-trichlorobenz-anilide-3'-carboxylic acid with thionyl chloride in the presence of pyridine is refluxed with stirring for 2 hours with 78 parts of 14-aminobenzonaphthindolizinedione in 1150 parts of o-dichlorobenzene. When cold, the product is filtered off, washed with o-dichlorobenzene and acetone and dried. This is then purified by extraction with methyl cellosolve and crystallization of the residue from nitrobenzene giving a bright orange micro crystalline powder with a melting point above 360° C. The product has the structure

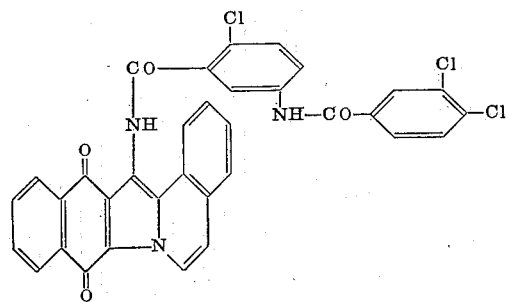

After ball milling as in Example 111 the pigment colors polyvinyl chloride and stoving lacquers bright orange shades having the same high fastness properties as the products of Example 111.

EXAMPLE 121

47.4 parts of terephthaloyl chloride (at 82% purity) are stirred in 38.5 parts of o-dichlorobenzene at 100° C. 39.3 parts of 2,4,5-trichloraniline, dissolved in 770 parts of o-dichlorobenzene, are dropped in over 30 minutes and the solution is stirred for a further 5 minutes at reflux.

60.4 parts of 14-aminobenzonaphthindolizinedione dissolved in 2300 parts of hot o-dichlorobenzene, are added over 45 minutes and the mixture is stirred at reflux for 4 hours.

When cold the product is filtered off and washed with o-dichlorobenzene and benzine. In this way 93 parts of a red powder are obtained which is purified by crystalization from nitrobenzene.

The product is of the formula

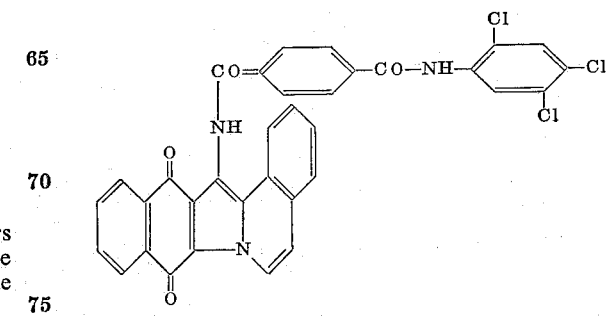

Its melting point is above 300° C. and it has a measured chlorine content of 16.3% (calculated 16.6%). Ball milling with nine times its weight of a mixture of sodium acetate and sodium sulfate converts the product into a red pigment which colors stoving lacquers bright red with excellent fastness to heat and overlacquering. On incorporating into polyvinyl chloride the product also shows very good fastness to migration.

EXAMPLE 122

The product of Example 88 was obtained in a finely divided state by ball-milling with nine times its weight of a mixture of sodium acetate and sodium sulphate in the presence of xylene and then incorporated into polyvinyl chloride films of the following formulation:

100 parts of "Geon 121" polyvinyl chloride
60 parts of dialphanyl phthalate
3 parts of "Ferroclere 1820"
1 part of "Ferroclere 900"

("Geon" is a registered trade mark. The "dialphanyl phthalate" is the diester prepared from phthalic acid and the commercially available mixture of alcohols known as "Alphanol").

Two pigmentations were made one being a full-shade pigmentation using 1% of the benzonaphthindolizine-dione-carboxyarylamide pigment based on the polyvinyl chloride content of the formulation and the other being a shade reduction pigmentation using 0.1% of the pigment together with 1% of titanium dioxide, both percentages being based on the polyvinyl chloride content of the formulation. The films were prepared and cured in the conventional way, the nominal film thickness in each case being $\frac{1}{60}$ of an inch and curing being carried out at 170° C. for 15 minutes.

The films were then assessed for lightfastness, heat stability and migration resistance. Lightfastness was measured by exposure of each film in a Fadometer and assessed against the Blue Wool Scale (1 to 8) according to British Standard 1006 (1961). Heat stability was measured by heating each film at 170° C. for 30 minutes and at 180° C. to 15 minutes. Migration resistance was measured by subjecting each film at 75° C. for 24 hours.

The results are shown in the following table in which are also included the results of similar tests carried out on a number of other benzonaphthindolizine-dione-carboxyarylamides of the present invention.

| Product of Example— | Shade | Light Fastness | | Migration Resistance | |
|---|---|---|---|---|---|
| | | Full Shade | Reduced Shade | Full Shade | Reduced Shade |
| 88 | Orange | >7 | 6-7 | Good | Very good. |
| 91 | ____do____ | >7 | 7 | ____do____ | Good. |
| 93 | Orange-yellow | >7 | 7 | Excellent | Excellent. |
| 94 | Red | >7 | >7 | ____do____ | Do. |
| 95 | Yellow | >7 | >7 | ____do____ | Do. |
| 96 | ____do____ | >7 | >7 | Very good | Do. |
| 103 | Golden yellow | >7 | >7 | Excellent | Do. |
| 104 | Orange | >7 | >7 | Very good | Very good. |
| 108 | Reddish yellow | >7 | >7 | Excellent | Excellent. |
| 110 | Yellow | >7 | >7 | ____do____ | Do. |

In each case the heat stability was assessed as being from very good to excellent.

EXAMPLE 123

Benzonaphthindolizine - dione - 14-carboxyarylamides, prepared in a finely divided state as described in Example 122, were incorporated into a stoving lacquer.

In each example, a paste was formulated consisting of 1 part of the pigment and 3 parts of "Uresin B." The medium in each case was prepared by mixing 50 parts of a 60% solution of "Beckosol 3246" in xylene, 30 parts of "Super Beckamine 1517," 10 parts of xylene and 10 parts of methyl cellosolve. The lacquers were then prepared in the conventional manner, and a film of each sample was applied to card and to aluminum foil. The stoving time was 30 minutes at 120° C.

Again, two pigmentations were made: a 3% mixture comprising 0.3 parts of the pigment in 10 parts of the total mixture and a 0.2% mixture representing a 1:100 reduction with titanium dioxide.

The lightfastness was assessed as in Examples 88 to 93. The heat stability was measured by heating the films at 120° C. for 1 hour, and 180° C. for 15 minutes and then assessed as in Examples 88 to 93. The overlacquering fastness was measured by overlacquering the film on card with 20% titanium dioxide and re-stoving at 120° C. for 30 minutes.

The results of the tests are given in the following table.

| Product of Example— | Shade | Light Fastness | | Fastness to Overlacquering |
|---|---|---|---|---|
| | | Full Shade | Reduced Shade | |
| 88 | Orange | >7 | >7 | Very good. |
| 90 | Red | >7 | >7 | Do. |
| 91 | Orange | >7 | 7 | Excellent. |
| 94 | Red | 7 | 7 | Do. |
| 95 | Orange yellow | >7 | >7 | Very good. |
| 96 | Yellow | >7 | >7 | Do. |
| 104 | Orange | >7 | 7 | Excellent. |
| 105 | Orange red | 7 | 7 | Very good. |
| 106 | Orange | >7 | 7 | Excellent. |
| 108 | Orange yellow | >7 | >7 | Do. |
| 109 | Orange | 7 | 7 | Do. |

In every case the heat stability was assessed as being from very good to excellent.

EXAMPLE 124

Benzonaphthindolizine-dione-carboxyarylamides of the present invention, conditioned as in Example 122, were incorporated into samples of a printing ink. 1 part of each of the pigments was mulled into 40 parts of "Veloset C 1216" letter press printing ink (Mander Kidd Ltd.).

The printing ink was used to produce prints in yellow to red shades on paper and the resulting prints were found to have excellent fastness to light, as assessed by the procedure in Example 122.

The resistance to solvents was also determined, by the following method, and the results obtained with trichlorethylene, toluene and 2-ethoxyethanol are given in the following table. The test was carried out by enclosing a small sample (conveniently 0.2 gram) of the pigment in a piece of Whatman No. 5 filter paper and immersing it in a test tube of solvent for at least 24 hours for it to come into equilibrium.

| Product of Example— | Solvent Fastness | | |
|---|---|---|---|
| | Trichlorethylene | Toluene | 2-ethoxyethanol |
| 88 | Very good | Excellent | Excellent. |
| 90 | ____do____ | Very good | Do. |
| 94 | ____do____ | Excellent | Very good. |
| 95 | Excellent | ____do____ | Do. |
| 96 | ____do____ | ____do____ | Do. |
| 103 | ____do____ | ____do____ | Do. |
| 104 | ____do____ | ____do____ | Excellent. |
| 105 | Very good | Very good | Very good. |
| 106 | ____do____ | ____do____ | Do. |
| 107 | Excellent | Excellent | Excellent. |
| 108 | Very good | ____do____ | Do. |
| 109 | ____do____ | ____do____ | Very good. |

We claim:
1. A pigment the chemical structure of which falls under the formula

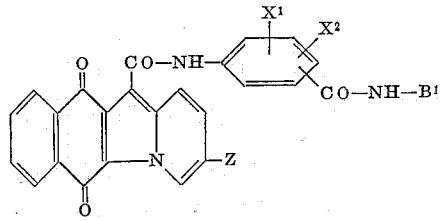

wherein $B^1$ represents a member selected from the group consisting of a grouping of the formula

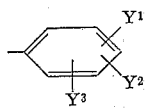

unsubstituted naphthyl, and naphthyl substituted with from one to three substituents Q, and wherein
  each of $X^1$ and $X^2$ represents a member selected from the group consisting of hydrogen, chlorine, bromine, fluorine, lower alkyl, lower alkoxy, phenoxy, chlorophenoxy and bromophenoxy;
  $Y^1$ represents a member selected from the group consisting of halogen, lower alkyl, lower alkoxy, trifluoromethyl, cyano, lower alkanoyl, benzoyl, naphthoyl, lower alkanoylamino, lower alkoxy-carbonyl amino, lower alkyl-substituted carbamyl, lower alkyl-sulfonylamino, lower alkyl-substituted sulfamyl, lower alkyl-sulfonyl and phenyl sulfonyl;
  $Y^2$ represents a member selected from the group consisting of hydrogen, halogen and lower alkyl;
  $Y^3$ represents a member selected from the group consisting of hydrogen, halogen, lower alkyl, lower alkoxy and trifluoromethyl;
  each of Q represents a member selected from the group consisting of hydrogen, halogen, lower alkoxy and lower alkyl; and
  Z represents a member selected from the group consisting of hydrogen and methyl.

2. The pigment having the formula:

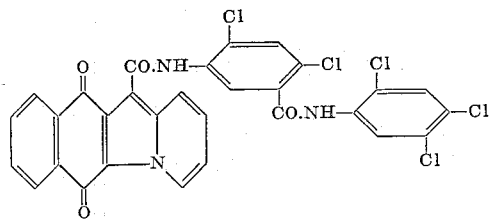

3. The pigment having the formula:

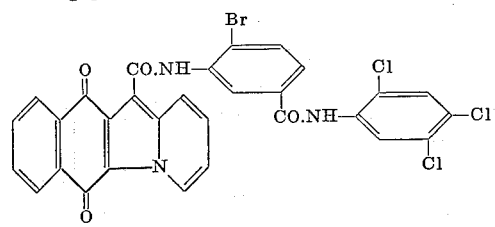

4. The pigment having the formula:

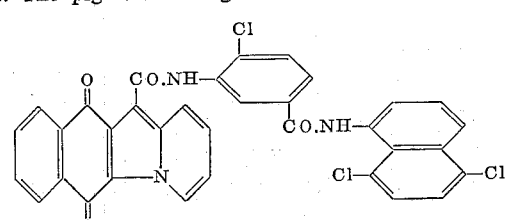

5. The pigment having the formula:

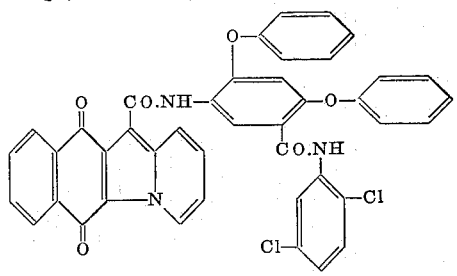

6. The pigment having the formula:

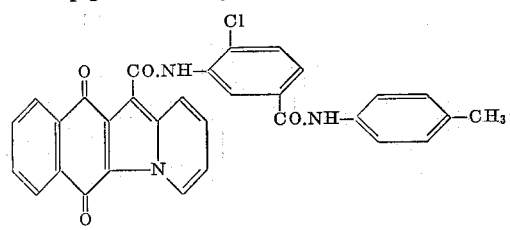

7. The pigment having the formula:

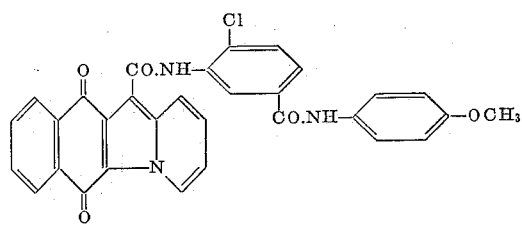

8. The pigment having the formula:

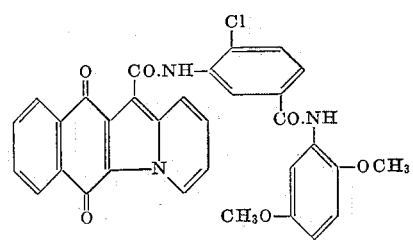

9. The pigment having the formula:

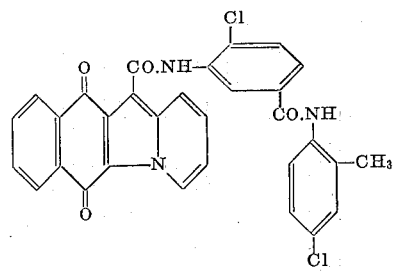

10. The pigment of the formula:

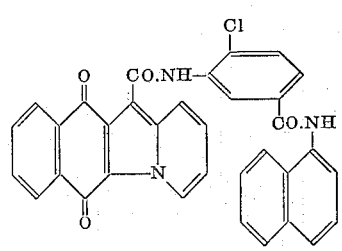

11. The pigment of the formula:
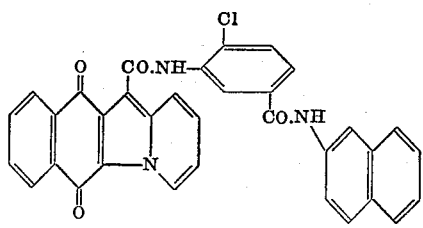
12. The pigment of the formula:
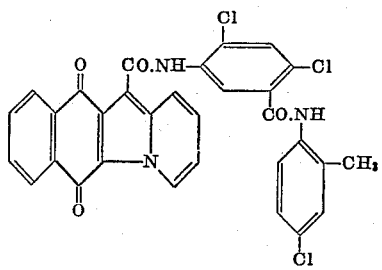
13. The pigment of the formula:
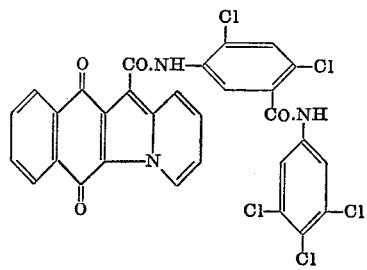
14. The pigment of the formula:
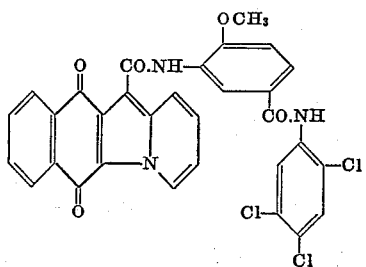
15. The pigment of the formula:
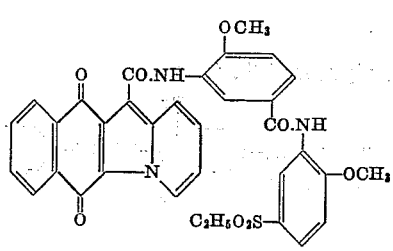
16. The pigment of the formula:
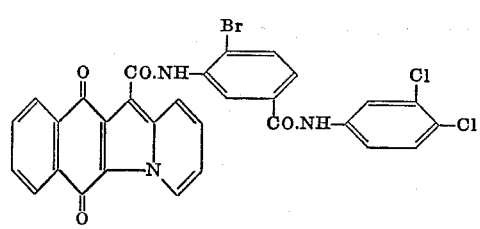
17. The pigment of the formula:
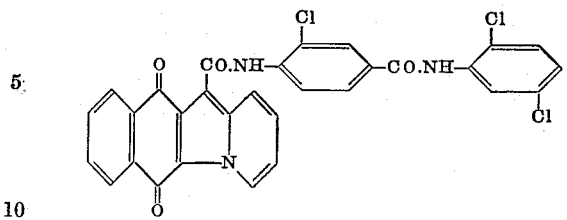
18. The pigment of the formula:
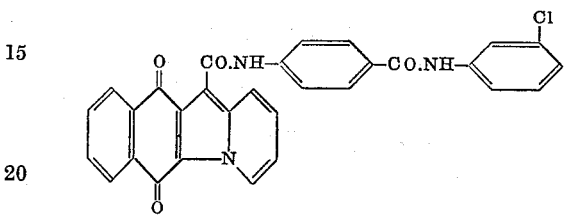
19. The pigment of the formula
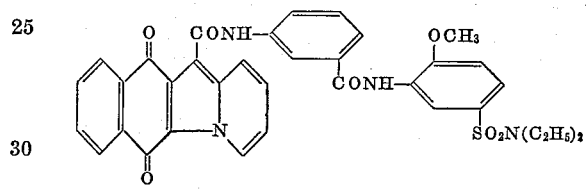
20. The pigment of the formula
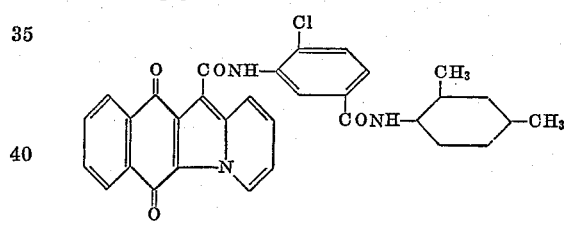
21. The pigment of the formula
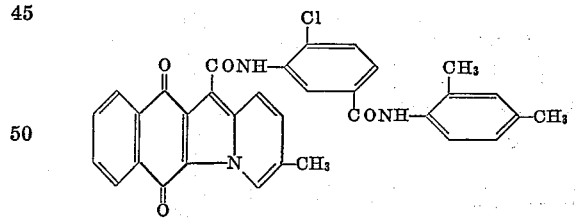
22. The pigment of the formula:
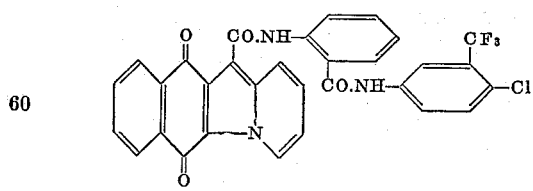
23. The pigment of the formula:
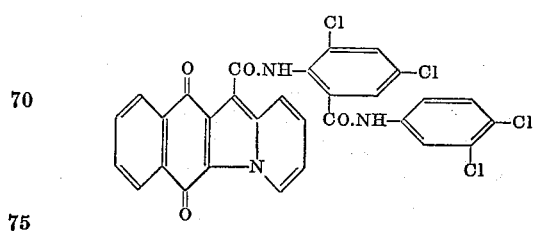

24. The pigment of the formula:

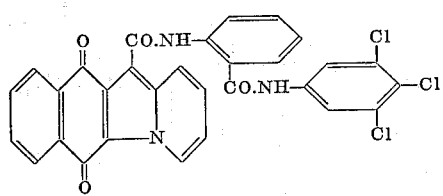

25. A pigment of the formula

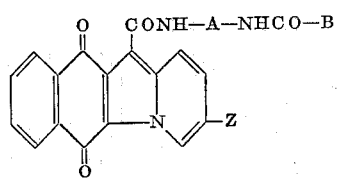

wherein

A represents a divalent member selected from the group consisting of phenylene, halogenophenylene, lower alkyl phenylene, lower alkoxyphenylene, phenoxyphenylene, chlorophenoxyphenylene and bromophenoxyphenylene;

B represents a member selected from the group consisting of phenyl, halogenophenyl, lower alkylphenyl, lower alkoxyphenyl, trifluoromethylphenyl, cyanophenyl, lower alkanoylphenyl, lower alkanoylaminophenyl, lower alkoxycarbonylamino-phenyl, benzoyl phenyl, benzoylaminophenyl, lower alkyl-substituted carbamylphenyl, lower alkyl-substituted sulfamylphenyl, lower alkyl sulfonylphenyl and phenylsulfonylphenyl, naphthyl, bromonaphthyl; and Z is a member selected from the group consisting of hydrogen and lower alkyl.

26. The pigment of the formula:

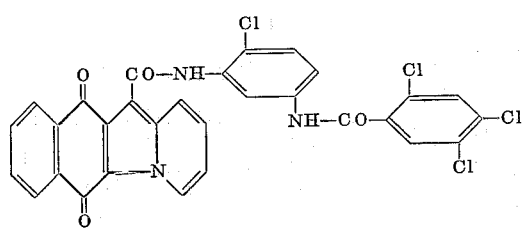

27. The pigment of the formula:

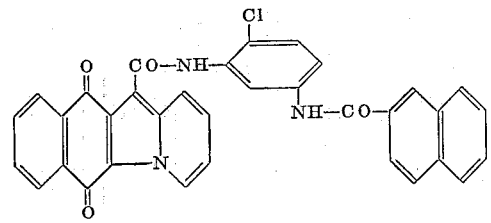

28. The pigment of the formula:

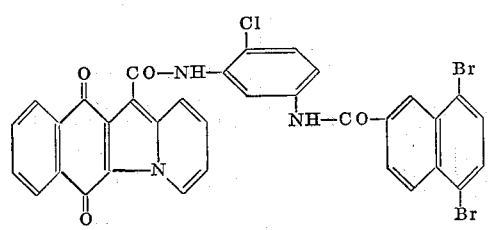

29. The pigment of the formula:

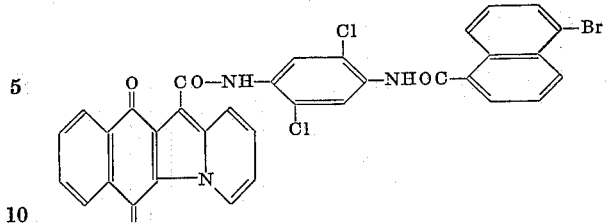

30. The pigment of the formula:

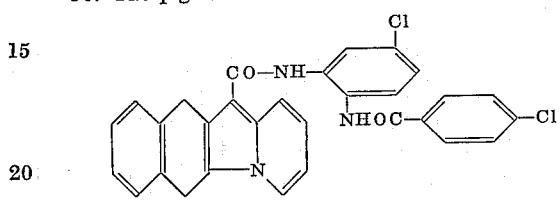

31. The pigment of the formula:

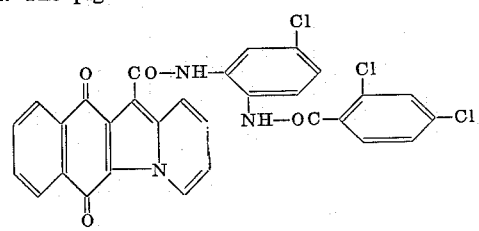

32. The pigment of the formula

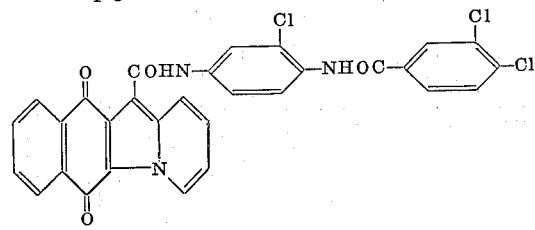

33. The pigment of the formula

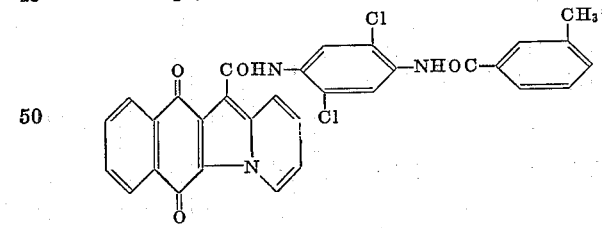

34. The pigment of the formula

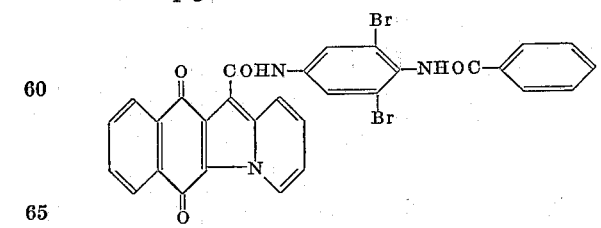

35. The pigment of the formula

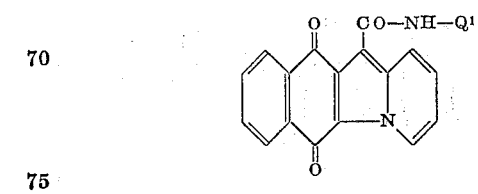

wherein $Q^1$ is a member selected from the group consisting of

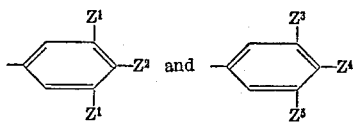

the two substituents $Z^1$ being identical members selected from a group consisting of chlorine and bromine, each of $Z^2$, $Z^3$ and $Z^5$ being a member selected from the group consisting of chlorine and bromine, and $Z^4$ being a member selected from a group consisting of acetylamino and propionylamino.

36. A pigment compound of the formula:

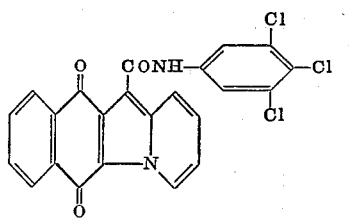

37. A pigment compound of the formula:

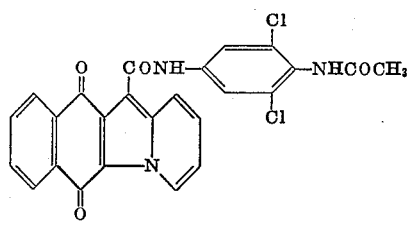

38. A pigment compound of the formula:

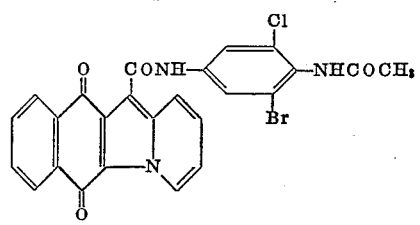

39. A pigment compound of the formula:

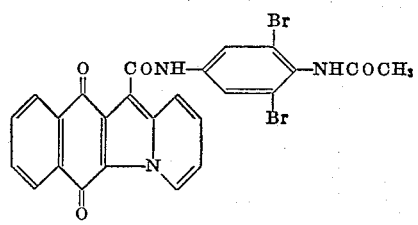

40. A pigment compound of the formula:

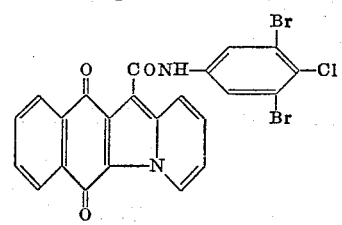

41. A pigment compound of the formula:

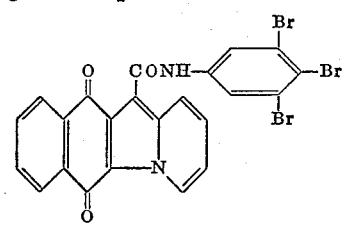

42. A pigment compound of the formula:

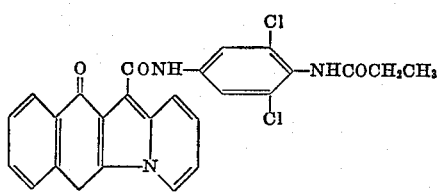

43. A pigment compound of the formula

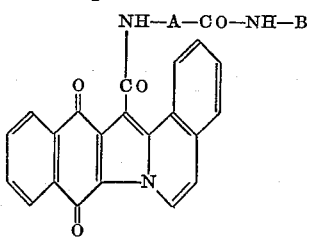

wherein
A is a divalent member selected from the group consisting of phenylene, bromophenylene and chlorophenylene, and
B is a member selected from the group consisting of lower alkylphenyl, chlorophenyl, lower alkanoylaminophenyl, lower alkoxycarbonylamino-phenyl and lower alkylsulfonylamino-phenyl.

44. The pigment compound of the formula

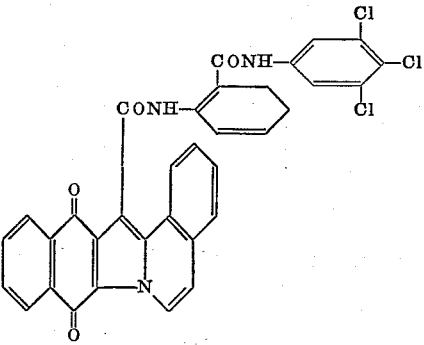

45. The pigment compound of the formula

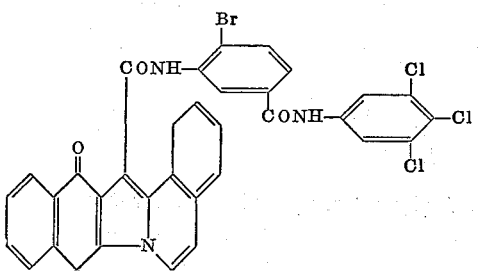

46. The pigment compound of the formula

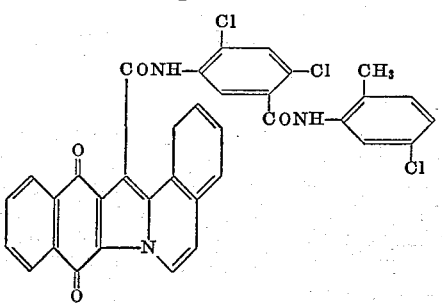

47. The pigment compound of the formula

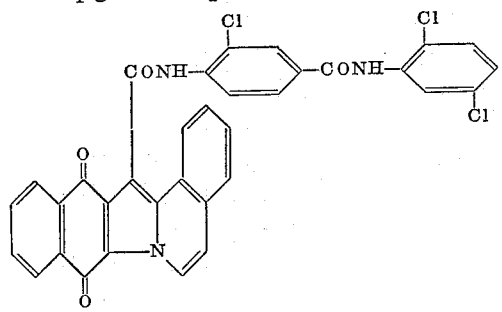

48. The pigment compound of the formula

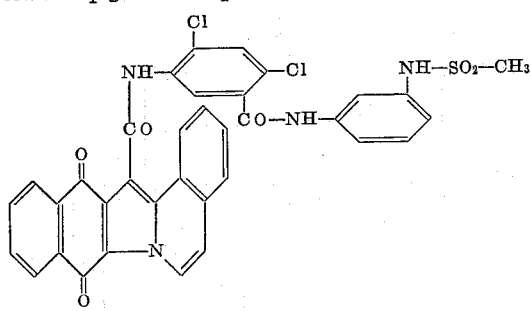

49. The pigment compound of the formula

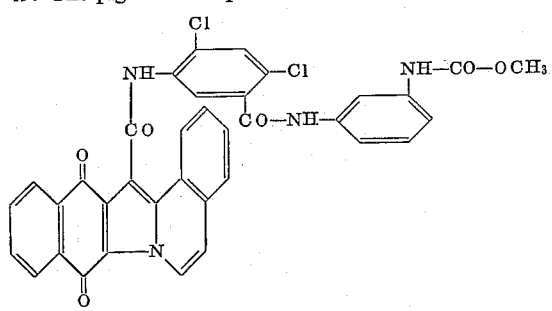

50. The pigment compound of the formula

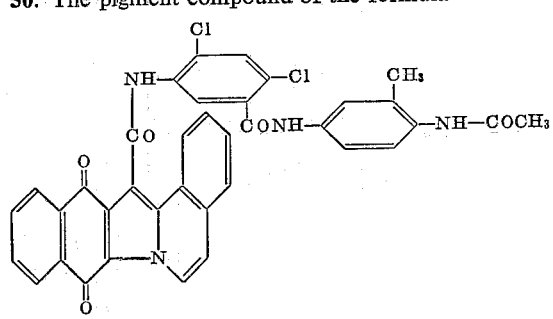

51. A pigment compound of the formula

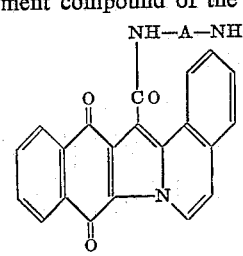

wherein
  A represents a member selected from the group consisting of lower alkylphenyl and chlorophenyl, and
  B represents a member selected from the group consisting of chlorophenyl, lower alkyl-phenyl, lower alkoxy-phenyl, lower alkanoylamino-phenyl, lower alkoxycarbonylamino-phenyl and lower alkylsulfonyl-amino-phenyl.

52. A pigment compound of the formula

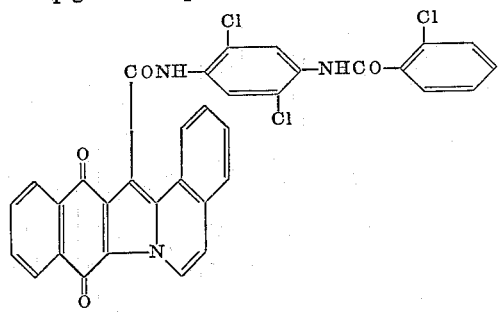

53. A pigment compound of the formula

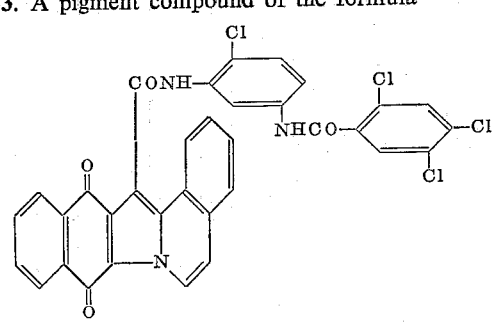

54. A pigment compound of the formula

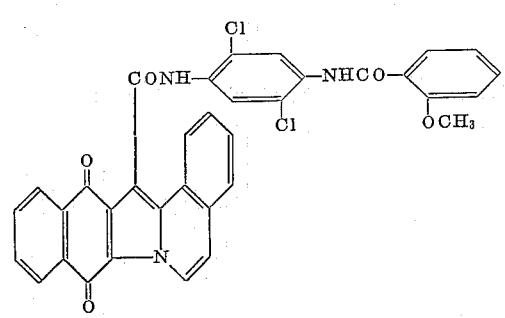

55. A pigment compound of the formula

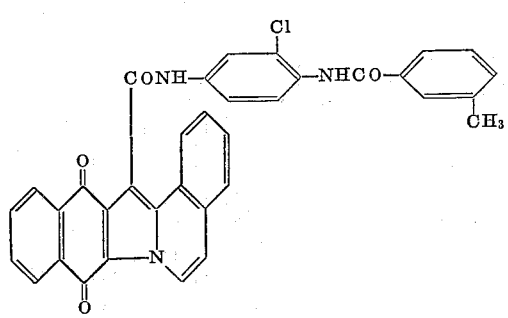

56. A pigment compound of the formula

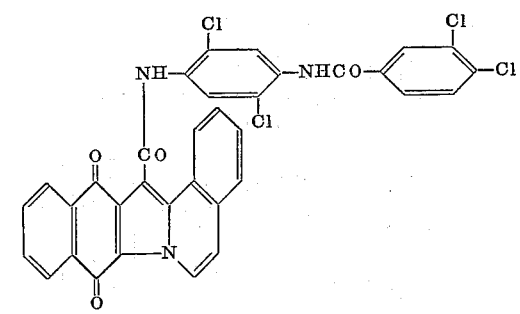

57. A pigment compound of the formula

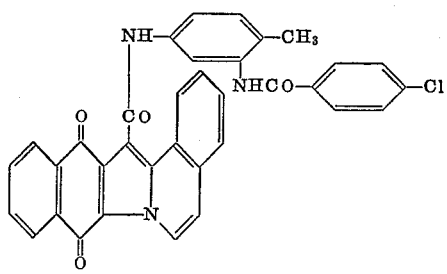

58. A pigment compound of the formula

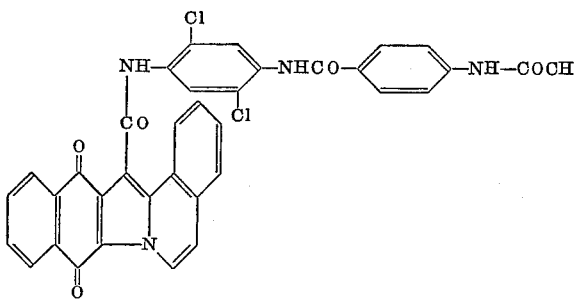

59. A pigment compound of the formula

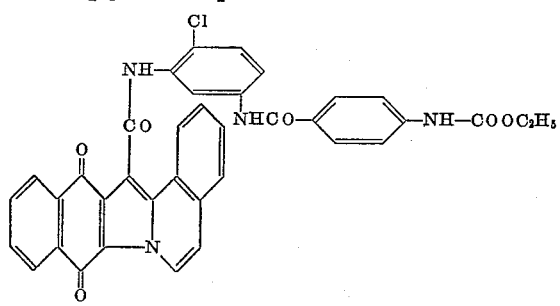

60. A pigment compound of the formula

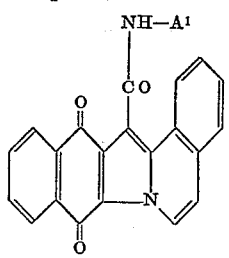

wherein $A^1$ is a member selected from the group consisting of halogen-substituted p-lower alkanoylamino-phenyl, methyl-substituted p-lower alkanoylamino-phenyl, methoxy - substituted p - lower alkanoylamino - phenyl, cyano-phenyl, halogen-substituted cyano-phenyl, and phenyl substituted with at least two halogen atoms, one position ortho to the free linkage of the last-mentioned phenyl being unsubstituted, "halogen" representing a member selected from the group consisting of chlorine and bromine.

61. A pigment compound of the formula

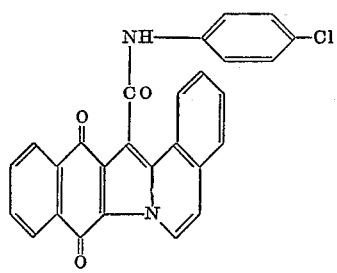

62. A pigment compound of the formula

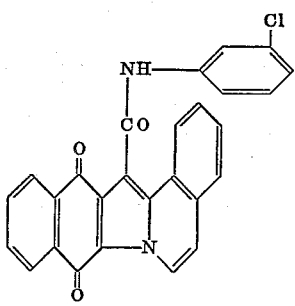

63. A pigment compound of the formula

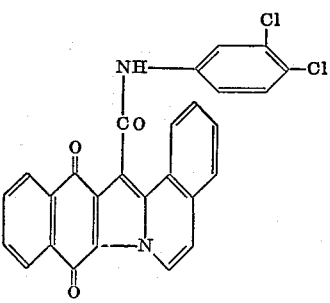

64. A pigment compound of the formula

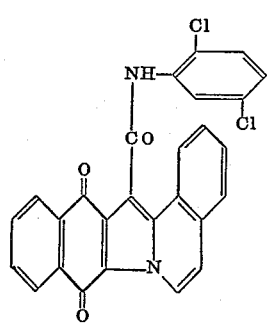

65. A pigment compound of the formula

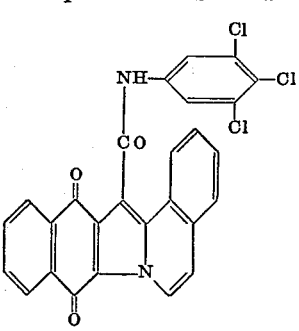

66. A pigment compound of the formula

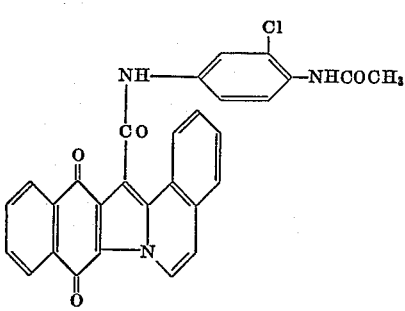

67. A pigment compound of the formula

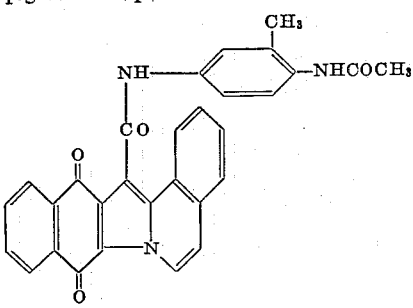

68. A pigment compound of the formula

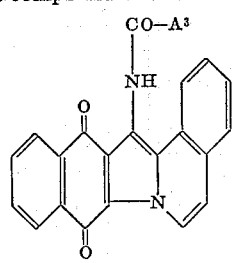

wherein $A^3$ is a member selected from the group consisting of lower alkyl, phenyl, lower alkylphenyl, chlorophenyl, lower alkoxyphenyl, nitrophenyl, chlorobenzoylamino and chlorophenylaminocarbonyl.

69. A pigment compound of the formula

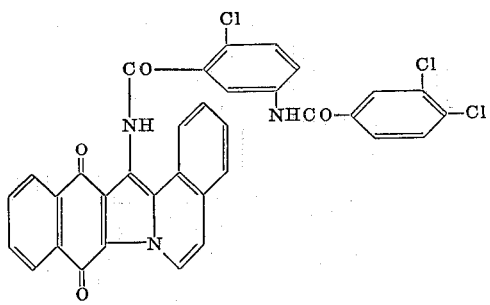

70. A pigment compound of the formula

71. A pigment compound of the formula

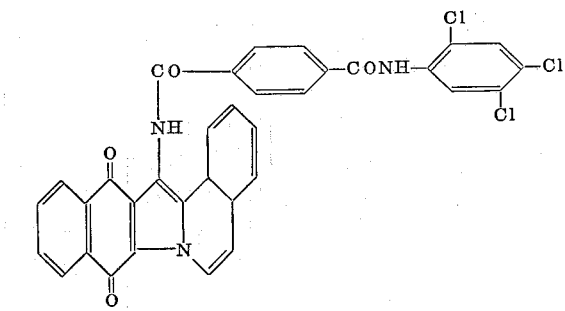

No references cited.

ALEX MAZEL, *Primary Examiner.*
DONALD C. DAUS, *Assistant Examiner.*